United States Patent [19]

Kawai et al.

[11] Patent Number: 6,037,952

[45] Date of Patent: Mar. 14, 2000

[54] IMAGE DISPLAYING APPARATUS

[75] Inventors: Yoshio Kawai, Higashiyamato; Shinichiro Sato, Fussa; Yuichi Kobayashi, Hamura; Jun Oshima, Akigawa, all of Japan

[73] Assignee: Casio Computer Co., Ltd., Tokyo, Japan

[21] Appl. No.: 09/067,826

[22] Filed: Apr. 28, 1998

Related U.S. Application Data

[62] Division of application No. 08/681,702, Jul. 29, 1996, which is a division of application No. 08/287,850, Aug. 9, 1994, Pat. No. 5,572,646.

[30] Foreign Application Priority Data

| Aug. 25, 1993 | [JP] | Japan | 5-210406 |
| Nov. 25, 1993 | [JP] | Japan | 5-295072 |
| Dec. 13, 1993 | [JP] | Japan | 5-312091 |

[51] Int. Cl.[7] .................................................. G06T 13/00
[52] U.S. Cl. ........................................................... 345/473
[58] Field of Search ................................... 345/433, 435, 345/441, 473, 1, 475, 326, 327

[56] References Cited

U.S. PATENT DOCUMENTS

| 4,181,971 | 1/1980 | Frey et al. ........................... 708/3 |
| 4,649,504 | 3/1987 | Krouglicof et al. ............... 702/153 |
| 5,261,041 | 11/1993 | Susman ............................... 345/473 |
| 5,267,154 | 11/1993 | Takeuchi et al. .................. 345/473 |
| 5,267,734 | 12/1993 | Stamper et al. ...................... 463/23 |

FOREIGN PATENT DOCUMENTS

| 0378385 A2 | 7/1990 | European Pat. Off. . |
| 3123238 A1 | 9/1982 | Germany . |
| 60-140473 | 7/1985 | Japan . |
| 63-251828 | 10/1988 | Japan . |
| 63-282569 | 11/1988 | Japan . |
| 1300830 | 12/1989 | Japan . |
| 2093861 | 4/1990 | Japan . |
| 5073531 | 3/1993 | Japan . |
| 5-189403 | 7/1993 | Japan . |
| 58-153985 | 9/1993 | Japan . |
| 6-277365 | 10/1994 | Japan . |
| 7-160459 | 6/1995 | Japan . |
| 7-98104 | 10/1995 | Japan . |
| 7-98105 | 10/1995 | Japan . |
| 7-98106 | 10/1995 | Japan . |
| 2529573 | 6/1996 | Japan . |
| 2122855 | 1/1984 | United Kingdom . |
| 93/15456 | 8/1993 | WIPO . |

OTHER PUBLICATIONS

User's Guide for "AQUAZONE Desktop Virtual Reality for Windows" with English translation of pertinent portions of document (Note: publication date is uncertain).

IEEE Computer Graphics and Applications, vol. 7, No. 6, Jun. 1987, New York, pp. 39–51, Girard et al, "Interactive Design of 3D Computer–Animated Legged Animal Motion".

Proceedings of the Fall Joint Computer Conference, Dec. 1968, San Francisco, Calif., pp. 1317–1320, Weiner et al., "A Computer Animation Movie Language for Educational Motion Pictures".

(List continued on next page.)

*Primary Examiner*—Almis R. Jankus
*Attorney, Agent, or Firm*—Frishauf, Holtz, Goodman, Langer & Chick, P.C.

[57] ABSTRACT

An image displaying apparatus stores plural image data and displays one of the image data, which image data represent a growing plant (animal) or represent a series of motions of an animal. The apparatus further stores plural element data for growing the plant (animal). When one of the element data is selected, another image data of the plant (animal) is displayed in place of the previously displayed imaged data to show how the plant (animal) grew up responsive to the selected element data. The apparatus is provided with a sensor for detecting motion of a user. Detecting the motion of the user, the apparatus displays new image data representing a motion of the animal in place of the previously displayed image data to show how the animal reacts to the user's motion.

37 Claims, 33 Drawing Sheets

OTHER PUBLICATIONS

User's Manual for "SimLife" Software Program, Copyright 1992 including Introduction, Reference and Tutorial.

User's Manual for "AQUAZONE Desktop Virtual Reality" with English translation of pertinent portions of document (Note: publication date is uncertain).

"You can raise tropical fish in your Mac–AQUAZONE", published in *Asahi PasoCom*, May 15, 1993 with English translation of document.

"DTVR Software–AQUAZONE", published in *My Computer*, Jul. 1992, with English translation of document.

"Princess Maker" Manual, GAINAX, May 1991, pp. 2–10 with partial English translation.

"MSX–FAN", Tokuma Shoten Intermedia, May 1992, Issue, pp. 6–7 with partial English translation.

"MSX–FAN", Tokuma Shoten Intermedia, Jul. 1992, pp. 4–11 with partial English translation.

"In the Beginning, There was the GullyWhumpus", article in the Washington Post, Aug. 30, 1992 by Mark Potts.

"Computer Games Filling Screens with a Spate of Adventures", Article in The Plain Dealer, Cleveland, Ohio, Nov. 22, 1992.

Creation and Other Recreations article by Michael Goodwin, PC World Magazine, Apr. 1993.

"SimLife 1.0" Article in MACWORLD Magazine, Feb. 1993.

"Electronic Universe", article by Gregg Keizer, in Omni Magazine, Jan. 1993.

"Genetic Playground", article by L.R. Shannon, New York Times, Dec. 22, 1992.

"This is your A–Life" article by John Schwartz, Newsweek Magazine, pp. 76–78, Oct. 5, 1992.

"Simulating Life", article by Peter H. Lewis, The New York Times, Section 4A, Nov. 1, 1992.

"Joy of Childcare", Princess Maker Guide Book, Gainax 1991 with partial English translation.

"Computer Evolution" article, Fortune Magazine, p. 124, Nov. 16, 1992.

FIG.2
| ELEMENTS / AMOUNTS | WATER | LIGHT | MANURE |
|---|---|---|---|
| (1) NO | 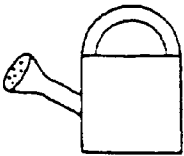 |  |  |
| (2) A LITTLE | 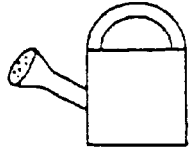 |  | 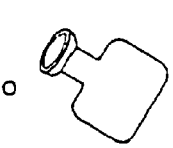 |
| (3) AVERAGE | 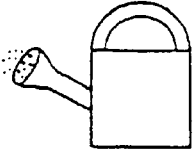 |  | 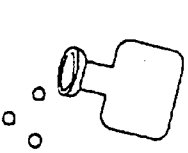 |
| (4) MUCH | 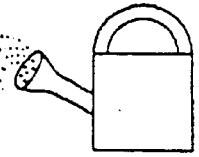 | 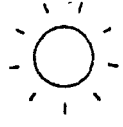 | 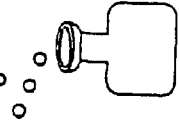 |
13 ROM (ELEMENTS)

FIG.10

| T \ M | TULIP (0) | WHEAT (1) |
|---|---|---|
| 1 | | |
| 2 | | |
| 3 | | |
| ≈ | ≈ | ≈ |
| 18 | | |
| 19 | | |
| 20 | | |
| 21 | | |

23 ROM (PLANT)

FIG.15
| M | INDICATIONS | | EFFECT-SOUNDS |
|---|---|---|---|
| | (1) | (2) | |
| M=0 |  |  | |
| | (1) | (2) | |
| M=1 |  |  | UUH |
| | (1) | (2) | |
| M=2 |  |  | BOWWOW BOWWOW |
| | (1) | (2) | |
| M=3 |  |  | KUH |
| | (1) | (2) | |
| M=4 |  |  | BOWWOW |
| | (1) | (2) | |
| M=5 |  |  | KUWN |
← 33 ROM

FIG.23

| M | NON-CONTACTING OPERATIONS | ORDERS (USER'S INTENTION) | MOTIONS/ SOUNDS |
|---|---|---|---|
| 1 | ON/OFF, T1 = 10~300mS, T0, 1S | HIT ON HEAD | SHOW DISHEARTENMENT, SOUND "UUH" |
| 2 | ON/OFF, T1 = 300mS~1S, T0, 1S | HAND | GIVE HAND, SOUND "BOWWOW BOWWOW" |
| 3 | ON/OFF, T1 NOT LESS THAN 1 SEC, T0, 1S | WAIT/LIE DOWN | WAIT OR LIE DOWN, SOUND "KUH" |
| 4 | ON/OFF, TWICE IN 2 SECONDS, T0 | SIT DOWN | SIT DOWN, SOUND "BOWWOW" |
| 5 | ON/OFF, 1S, MORE THAN 3 TIMES IN 2 SECONDS, T0 | GOOD | SHOW PLEASURE, SOUND "KUWN" |

FIG.26
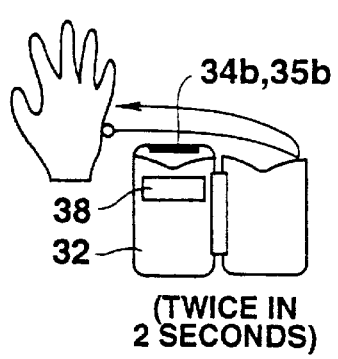
(TWICE IN 2 SECONDS)
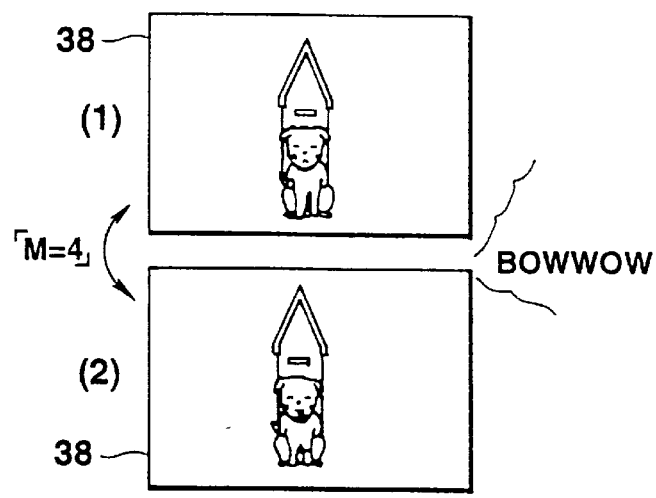
BOWWOW

FIG.28
| M | INDICATIONS | | EFFECT-SOUNDS |
|---|---|---|---|
| | (1) | (2) | |
| M=0 |  |  | |
| | (1) | (2) | |
| M=1 |  |  | UUH |
| | (1) | (2) | |
| M=2 |  |  | BOWWOW |
| | (1) | (2) | |
| M=3 |  |  | KUH |
← 43 ROM

FIG.32
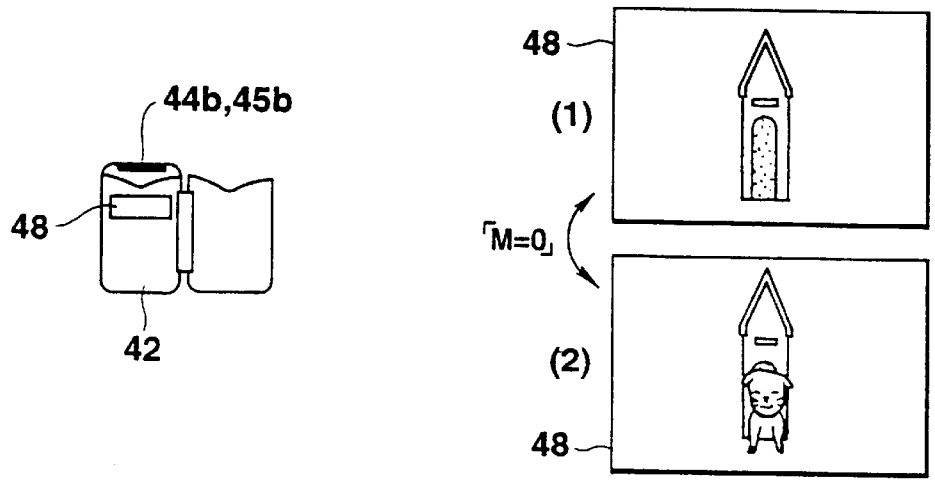
FIG.33
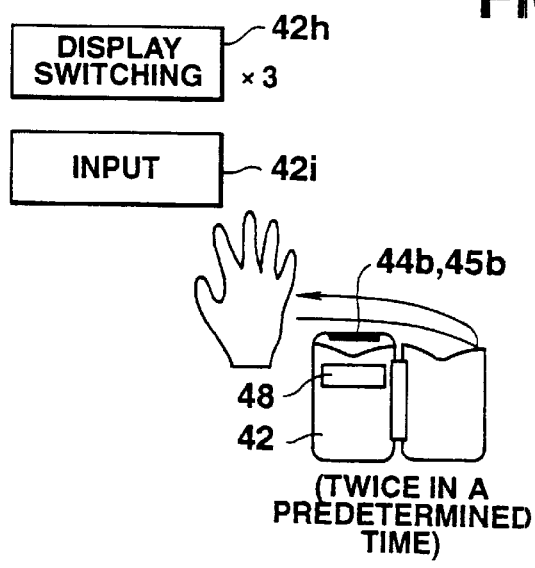
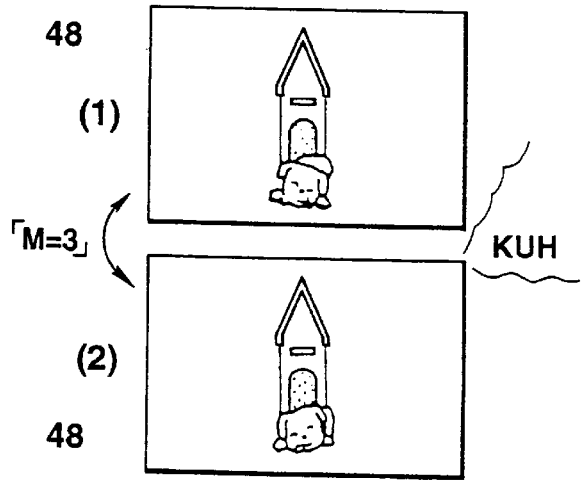

IMAGE DISPLAYING APPARATUS

This is a division of application Ser. No. 08/681,702 filed Jul. 29, 1996, which is a divisional of application Ser. No. 08/287,850 filed Aug. 9, 1994, now U.S. Pat. No. 5,572,646.

BACKGROUND OF THE INVENTION

1. Field of the Invention

The present invention relates to an image displaying apparatus used in an electronic appliance which displays previously stored image data in response to operation of a key switch or operation of a non-contact switch.

2. Description of the Related Art

In an image displaying apparatus of a conventional electronic appliance for displaying an image of a character such as, for example, an animal, the displayed character image is modified or moved on the image displaying apparatus in response to an operation of a particular key.

For example, images of a dog that wags its head may be selectively displayed on the image displaying apparatus by selectively operating cursor keys (up, down, left and right keys).

However, in the conventional image displaying apparatus, an instruction based on particular mechanical operation is required to modify or move the displayed character image. Therefore, the conventional image displaying apparatus inherently has a drawback that the character image displayed thereon can not be moved or modified in accordance with an instruction given by an user's sense.

SUMMARY OF THE INVENTION

The present invention has been made to overcome the above mentioned drawback, and has an object to provide an image displaying apparatus, an image of an object displayed on which can be freely modified or moved in accordance with the user's sense.

According to one aspect of the present invention, there is provided an image displaying apparatus which comprises:

image-data storing means for storing a plurality of image data;

displaying means for displaying at least one of the plurality of image data stored in said image-data storing means;

switching means; and display controlling means for selecting image data other than the image data displayed on said displaying means among from the plurality of image data stored in said image-data storing means when said switching means is operated, and for displaying the selected image data on said displaying means in place of the previously displayed image data On the image displaying apparatus with the above mentioned structure, for example, an image of an animal displayed thereon can be moved or changed by the user with sense as if he is with his pet such as a dog.

It would be apparent to those skilled in the art from the following description of preferred embodiments that the present invention may be modified in various manners and may be applicable to other apparatus.

BRIEF DESCRIPTION OF THE DRAWINGS

Other objects and structures of the present invention will be more fully understood from the description, when taken in conjunction with the accompanying drawings, in which:

FIG. 2 is a view showing image data of elements previously stored in a read only memory (ROM) of the first electronic notebook;

FIGS. 8A–8C are views showing indications displayed in the image-display mode process, in which FIG. 8A is a view showing a displayed indication illustrating a plant corresponding to a plant address M=1 in the image-display mode process;

FIG. 8B is a view showing a displayed indication illustrating water-elements for selecting a water-element;

FIG. 8C is a view showing a displayed indication illustrating a plant corresponding to a plant address M=2 when a water-element is selected in the image-display mode process;

FIG. 10 is a view showing image data of plants previously stored in ROM of the second electronic notebook;

FIG. 15 is a view showing image data of an object and effect-sound data previously stored in ROM of the third electronic notebook;

FIG. 23 is a view showing relationship between non-contact operation patterns and orders (a user's intention), and motions in the image-display mode process;

FIG. 26 is a view illustrating motions of the character (dog) shown when non-contact operation of the user is performed twice within a predetermined period in the image-display mode process;

FIG. 28 is a view showing image data of a character (dog) and sound-effect data previously stored in ROM of the fourth electronic notebook;

FIG. 32 is a view illustrating initial motions of a character (dog) in the image-display mode process;

FIG. 33 is a view illustrating indications corresponding to a ROM address "M=3" in an order setting mode in the image-display mode process;

FIG. 35 is a flowchart of a pass-word mode process performed immediately after power supply is turned on.

DETAILED DESCRIPTION OF PREFERRED EMBODIMENTS

Now, preferred embodiments of the present invention will be described in detail with reference to the accompanying drawings.

First Embodiment

Figure 1:
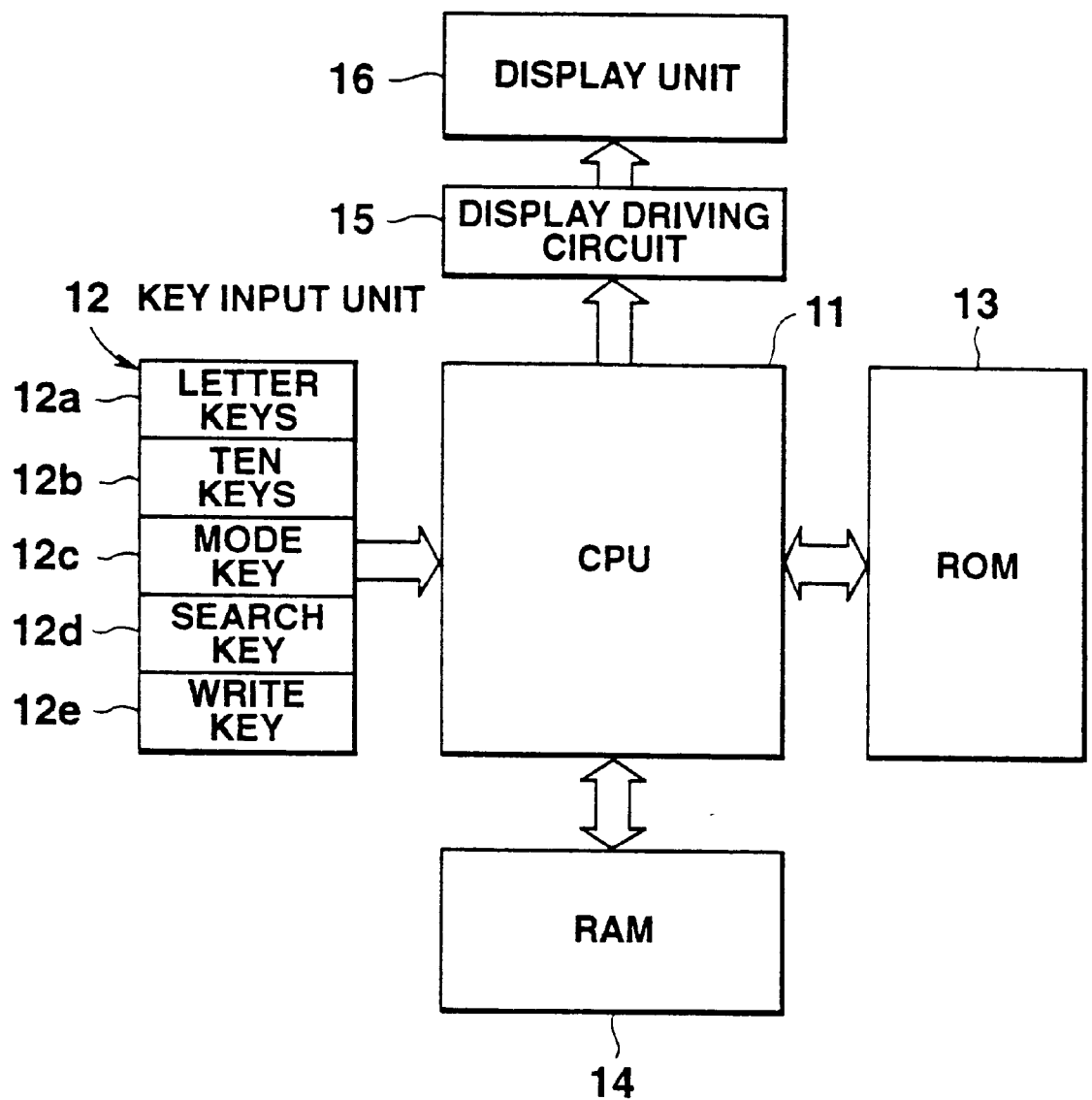
FIG. 1 is a circuit diagram of a first electronic notebook incorporating a first embodiment of an image displaying apparatus according to the present invention.

FIG. 1 is a circuit diagram of a first electronic notebook incorporating a first embodiment of the image displaying apparatus according to the present invention.

The first electronic notebook is provided with a central processing unit (CPU) 11.

The CPU 11 is driven by a key input signal supplied from a key input unit 12 to control operations of peripheral circuits in accordance with a system program stored in a read only memory (ROM) 13. The CPU 11 is connected with the key input unit 12, the ROM 13, a random access memory (RAM) 14, a display driving circuit 15 and a liquid crystal display unit (LCD unit or display unit) 16 through the display driving circuit 15.

The key input unit 12 is installed with letter keys 12a, ten keys 12b, a mode key 12c, a search key 12d and a write key 12e. The letter keys 12a are operated to input "names" etc. The ten keys 12b are used to input "phone numbers" and numerals to designate data to be searched. The mode key 12c is operated to set a notebook mode and/or an image display mode. The search key 12d is operated to search and display data through notebook data registered in the RAM 14 in the notebook mode and to search and display plural sorts of element data through element data (water, light and manure for raising plants) previously registered in the ROM 13 in the image display mode. The write key 12e is used in the notebook mode to register notebook data input by operation of the letter keys 12a and ten keys 12b in the RAM 14, and further is used in the image display mode to give a plant the element searched and displayed by operation of the search key 12d by amount specified by numerals input by the ten keys 12b.

In the ROM 13 are previously stored the system program for the CPU 11 to perform a control operation, image data representative of elements for raising plants and plural image data of a plant which illustrate how the plant grows.

FIG. 2 is a view showing image data representative of elements previously stored in the ROM 13 of the first electronic notebook. More specifically, in the ROM 13 are stored bit map data representing three sorts of plant growing elements such as water, light and manure, each of the plant growing elements (water element, light element and manure element) corresponding to four amounts represented by (1) NO, (2) A LITTLE, (3) AVERAGE and (4) MUCH, as shown in FIG. 2.

Figure 3:
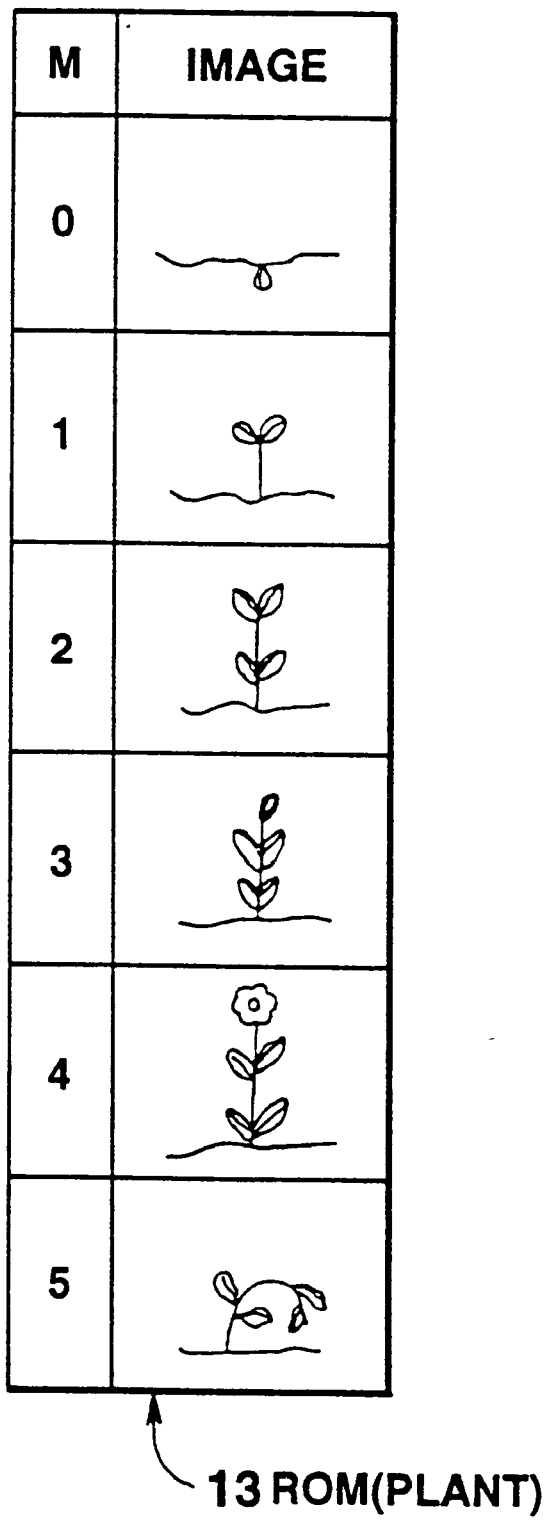
FIG. 3 is a view showing image data of a plant (plant image data) previously stored in the ROM of the first electronic notebook.
Figure 4:
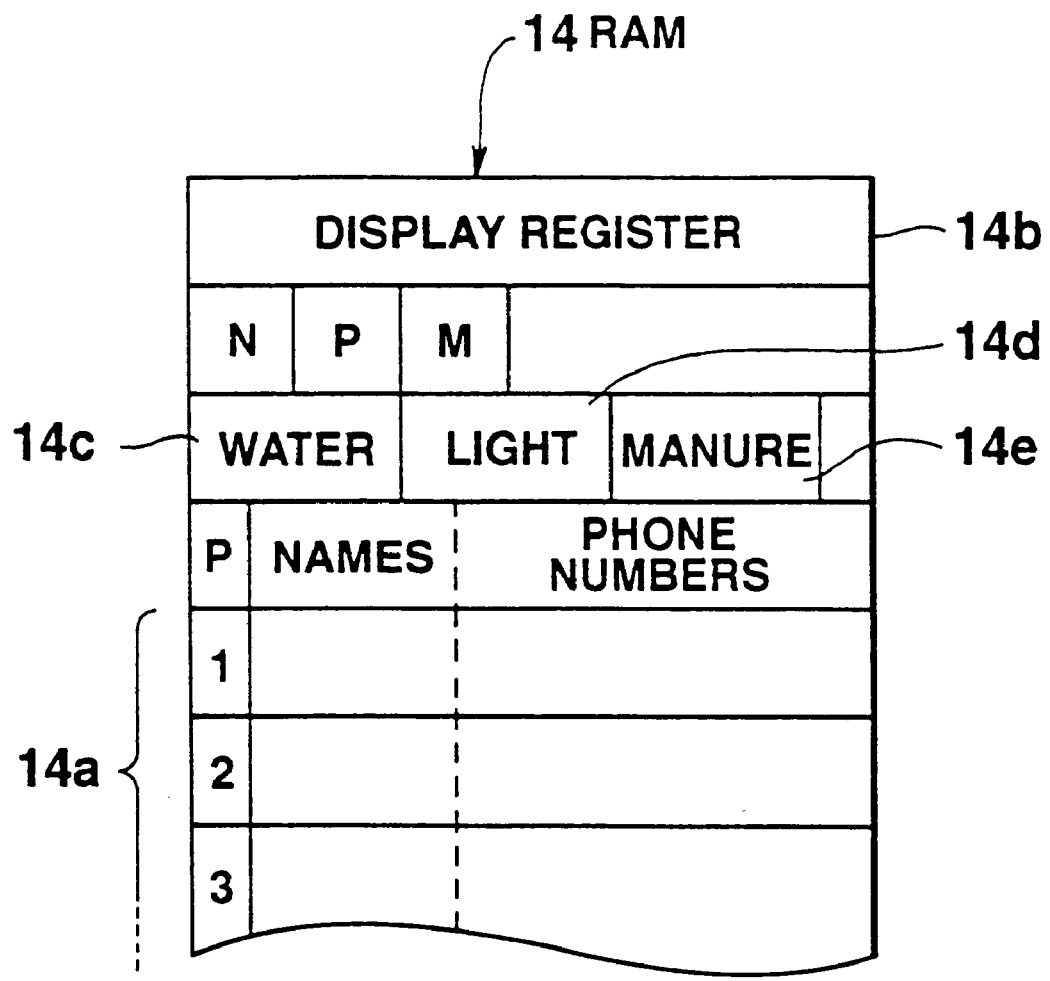
FIG. 4 is a view showing registers in a random access memory (RAM) of the first electronic notebook.

FIG. 3 is a view showing image data of a plant (plant image data) previously stored in the ROM 13 of the first electronic notebook. The plant image data are stored as bit map data in the ROM 13. The plant image data represent a growing course (six stages) of a plant, and correspond respectively to addresses "M=0, 1, . . . and 5". (Each plant image data represents one stage of the growing plant in the growing course.) FIG. 4 is a view showing a structure of registers in the RAM 14 of the first electronic notebook. The RAM 14 comprises a notebook data register 14a, a display register 14b, a mode flag register N, a plant-address register M, a water register 14c, a light register 14d and a manure register 14e. Personal data (notebook data) for a predetermined number of person including names and phone numbers are registered at areas designated by a pointer P in the notebook data register 14a. Display data to be displayed on the LCD unit 16 is written as image data in the display register 14b. The mode flag register N is set to a value "0" in the notebook mode, and to a value "1" in the image display mode. The plant address register M represents addresses ("M=0, 1, . . . and 5") in the ROM 13 indicating areas where the plant image data (FIG. 3) are stored. Numeral data representing amounts of respective elements (water, light and manure), which are set by operation of the write key 12e in the image display mode, are stored in the water register 14c, light register 14d and the manure register 14e, respectively.

On the LCD unit 16, either notebook data input by operation of the letter keys 12a and the ten keys 12b or notebook data searched through the notebook data register 14a of the RAM 14 in response to operation of the search key 12d is displayed in the notebook mode.

In the image display mode, either element data of the respective elements read out from the ROM 13 in response to operation the search key 12d or plant image data read out from the area in the ROM 13 designated by the plant address register M of the RAM 14 is displayed on the LCD unit 16.

In the plant address register M of the RAM 14 is set one of the plant addresses, "M 0, 1, 2, . . . and 5", each corresponding to a growing rate of the plant, which growing rate is designated by the amounts of elements (water element, light element and manure element) that are set in the water register 14c, the light register 14d and the manure register 14e by operation of the write key 12e in the image display mode.

Now, operation of the first electronic notebook with the above mention structure will be described in detail.

Figure 5:
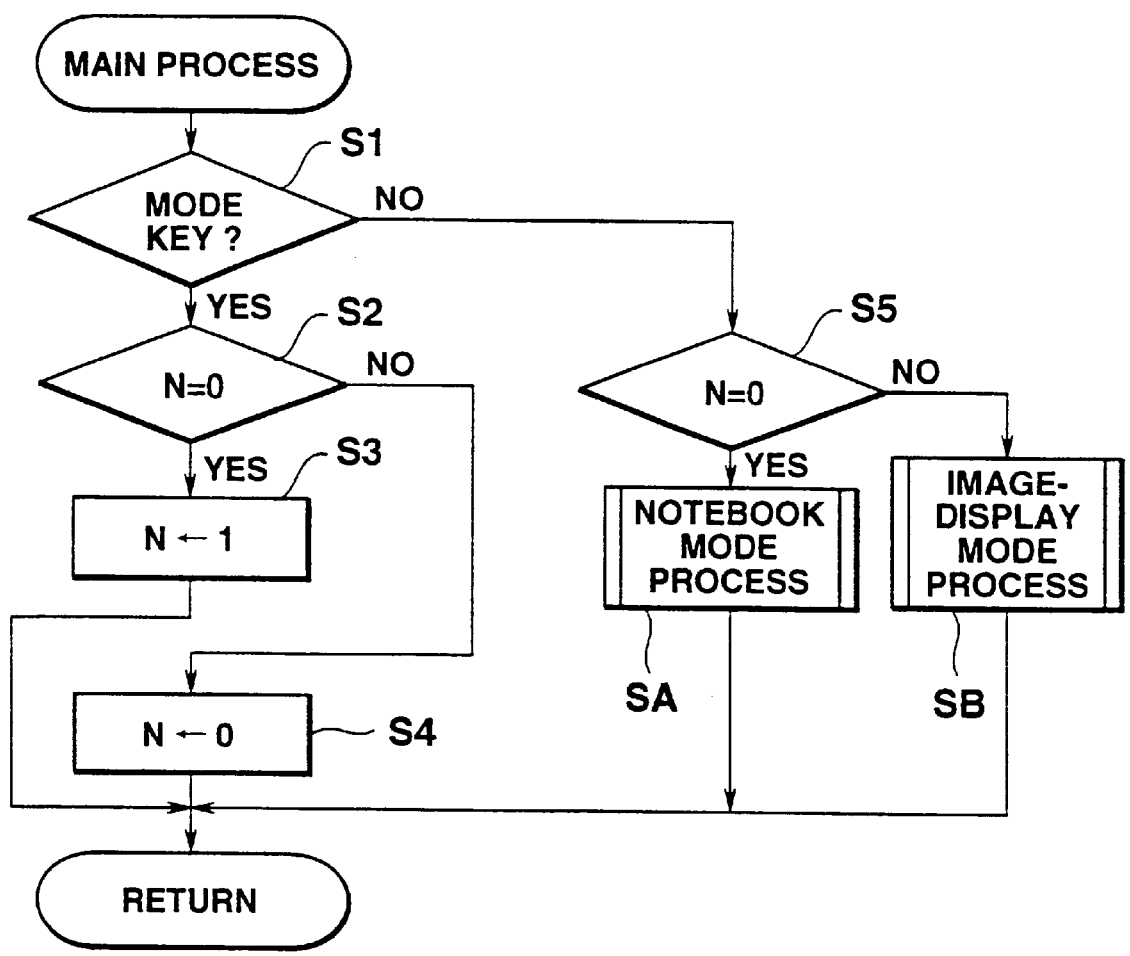
FIG. 5 is a flowchart of a main process of the first electronic notebook.

FIG. 5 is a flowchart of a main process of the first electronic notebook.

In the case that a value "0" has been set to the mode flag register N of the RAM 14 when the mode key 12c of the key input unit 12 is operated, i.e., in the case that the CPU 11 has been set to the notebook mode, the mode flag register N is set to a value "1" and the CPU 11 is switched to the image display mode (steps S1, S2, and S3 in the flowchart of FIG. 5).

In the case that a value "1" has been set to the mode flag register N of the RAM 14 when the mode key 12c is operated, i.e., in the case that the CPU 11 has been set to the image display mode, the mode flag register N is set to a value "0" and the CPU 11 is switched to the notebook mode (steps S1, S2, and S4).

Figure 6:
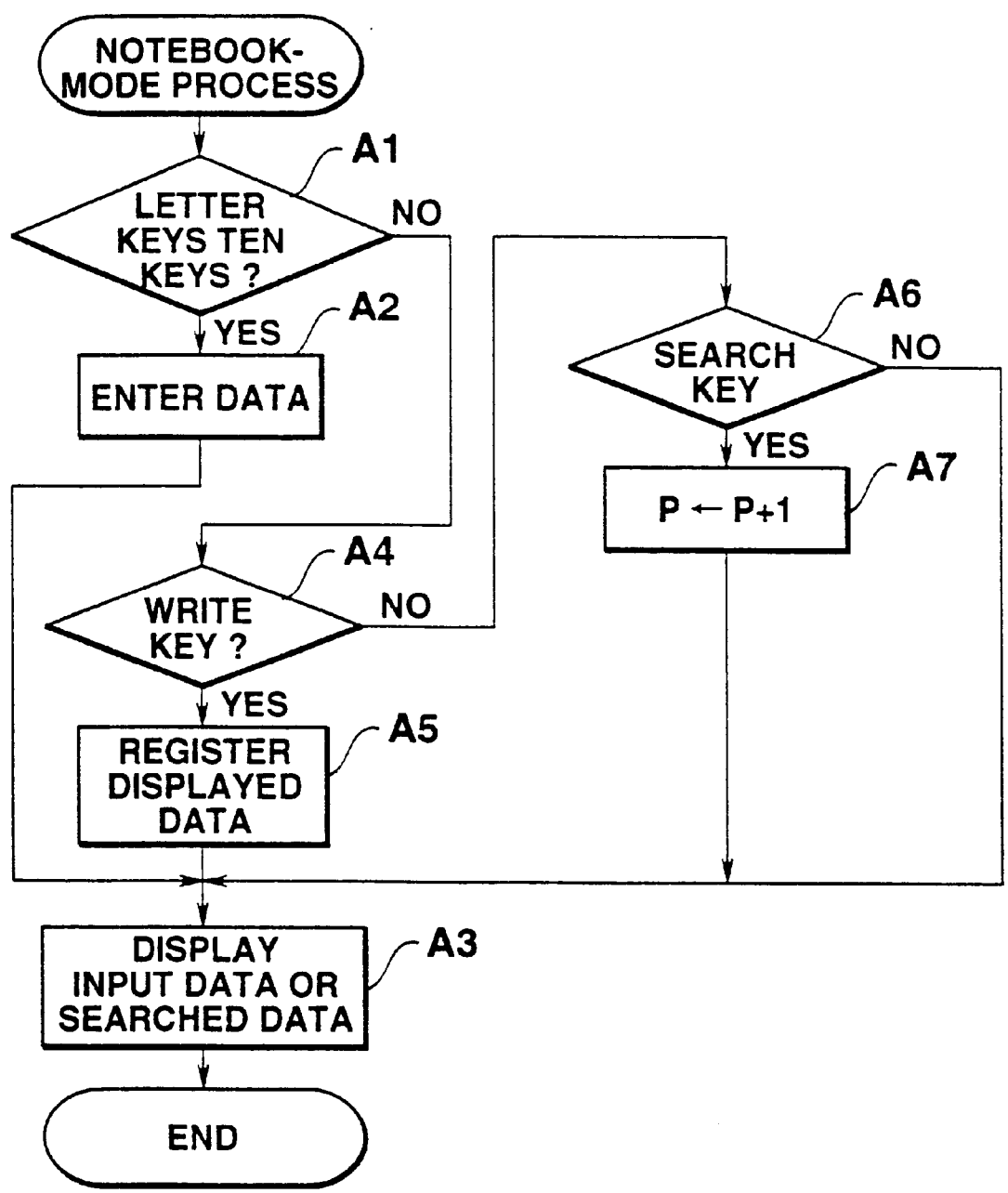
FIG. 6 is a flowchart of a notebook-mode process of the first electronic notebook.

In the notebook mode where a value "0" has been set to the mode flag register N, the CPU 11 performs the notebook mode process (steps S5, SA, FIG. 6).

Figure 7:
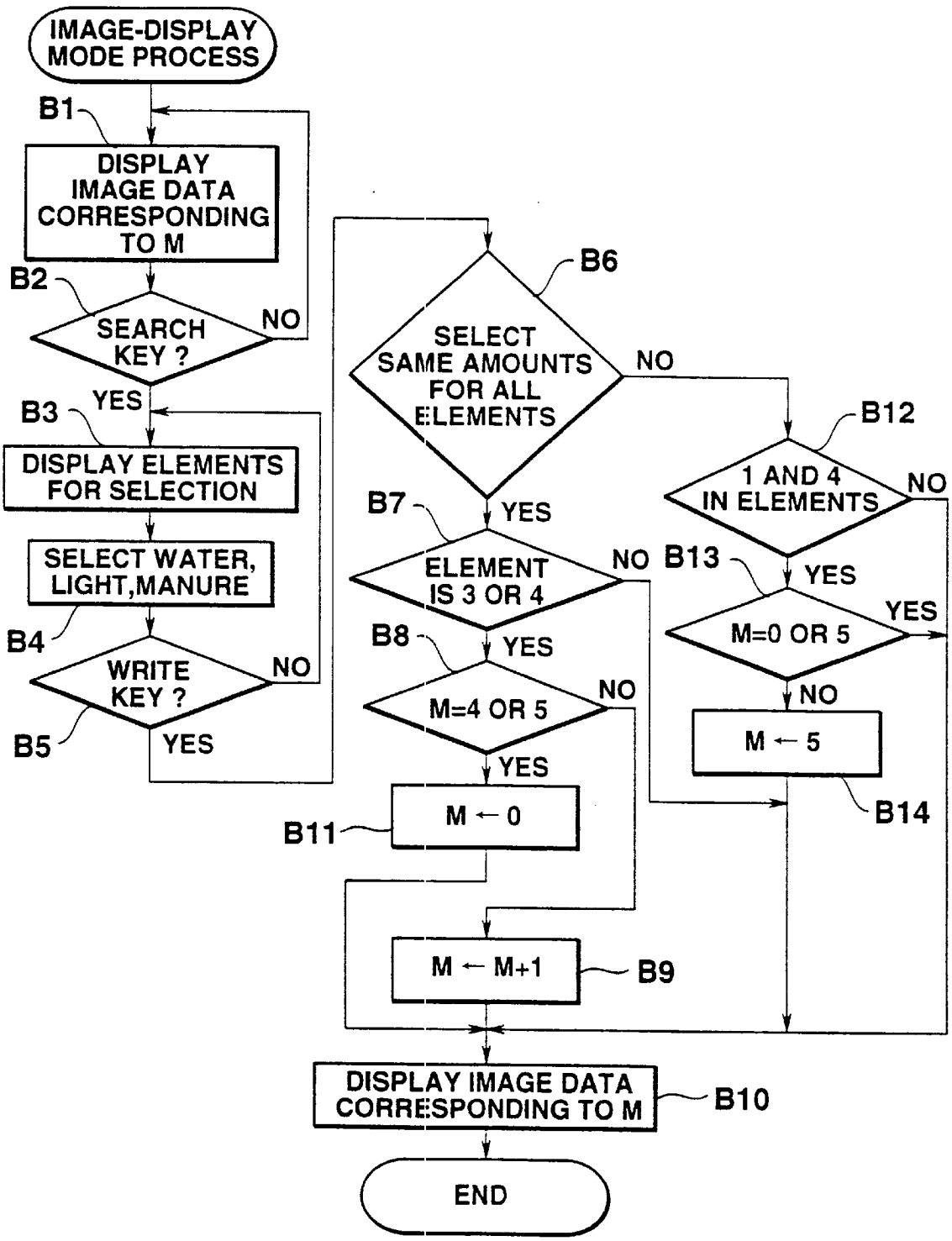
FIG. 7 is a flowchart of an image-display mode process of the first electronic notebook.

In the image display mode where a value "1" has been set to the mode flag register N, the CPU 11 performs the image-display mode process (steps S5, SB, FIG. 7).

FIG. 6 is a flowchart of the notebook-mode process in the first electronic notebook.

In the notebook mode where a value "0" has been set to the mode flag register N of the RAM 14, when notebook data such as a "name" and A "phone number" are entered by operation of the letter keys 12a and the ten keys 12b of the key input unit 12, the CPU 11 drives the display driving circuit 15 to display the entered notebook data on the LCD unit 16 (steps A1, A2 and A3 of the flowchart shown in FIG. 6).

Further, when the write key 12e of the key input unit 12 is operated, the notebook data that are displayed on the LCD unit 16 are registered in the notebook data register 14a of the RAM 14 (steps A4, A5).

When the search key 12d is operated, the notebook data pointer P of the RAM is incremented every operation of the search key 12d, and the CPU 11 searches for notebook data through the notebook data register 14a and drives the display driving circuit to display searched notebook data on the LCD unit 16 (steps A6, A7 and A3).

FIG. 7 is a flowchart of the image-display mode process in the first electronic notebook.

Figure 8A:
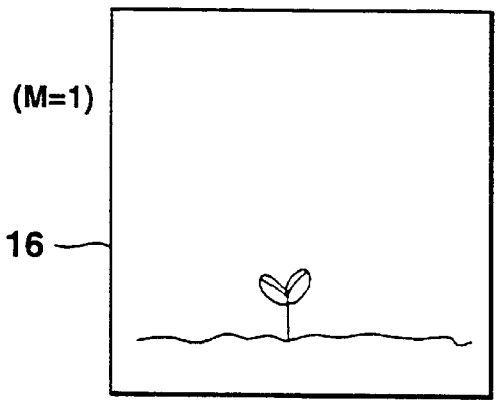
Figure 8B:
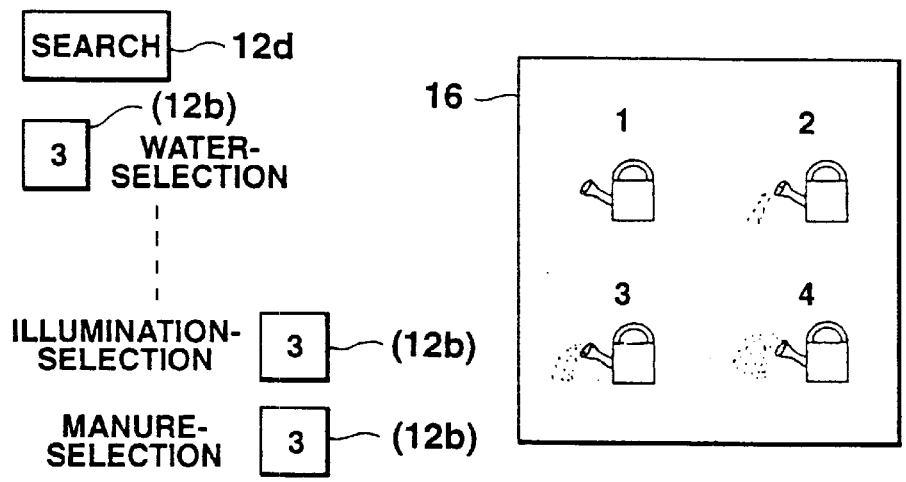
Figure 8C:
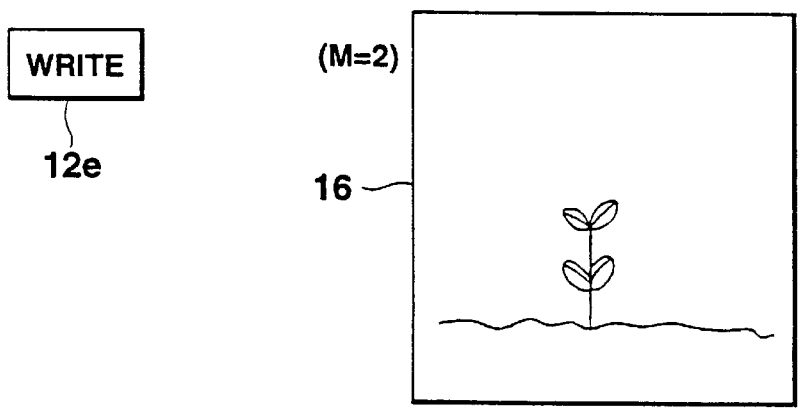

FIGS. 8A–8C are views showing indications displayed on the LCD unit 16 in the image-display mode process. FIG. 8A is a view showing an indication of a plant corresponding to a plant address M=1 in the image-display mode process. FIG. 8B is a view showing an indication illustrating water-elements for selecting a water-element. FIG. 8C is a view showing an indication illustrating the plant corresponding to a plant address M=2 when a water-element is selected in the image-display mode process.

In the case that, for example, a value "1" has been set to the plant address register M in the RAM 14 in the image-display mode process of FIG. 7, the CPU 11 reads out and displays on the display unit 16 plant image data of a second growing stage corresponding to the plant address "M=1" from the ROM 13 as shown in FIG. 8A (step B1 of FIG. 7).

When the search key 12d is operated to determine amounts of water to be supplied or fed to a plant represented by the plant image data of the second growing stage displayed on the display unit 16 (FIG. 8B), the CPU 11 reads out and displays image data of the water element (water image data) corresponding to four amounts, (1) NO, (2) A LITTLE, (3) AVERAGE and (4) MUCH (FIG. 2) on the LCD unit 16 (steps B2, B3).

When, for example, water element of amount (3) AVERAGE is selected on the LCD unit 16 by operation of the ten keys 12b, numeral data "3" corresponding to the selected water element of amount (3) AVERAGE is set to the water register 14c in the RAM 14 (step B4).

On the LCD unit 16, image data of the light element (light image data) corresponding to four amounts, (1) NO, (2) A LITTLE, (3) AVERAGE and (4) MUCH (FIG. 2) are displayed in place of the water element data. When, for example, light element of amount (3) AVERAGE is selected on the LCD unit 16 by operation of the ten keys 12b, numeral data "3" corresponding to the selected light element of amount (3) AVERAGE is set to the light register 14d (steps B5, B3 and B4).

On the LCD unit 16, image data of the manure element (manure image data) corresponding to four amounts, (1) NO, (2) A LITTLE, (3) AVERAGE and (4) MUCH (FIG. 2) are displayed in place of the light element data. When, for example, manure element of amount (3) AVERAGE is selected on the LCD unit 16 by operation of the ten keys 12b, numeral data "3" corresponding to the selected manure element of amount (3) AVERAGE is set to the light register 14e (steps B5, B3 and B4).

When the write key 12e is operated to supply the plant of the second growing stage shown on the LCD unit 16 with the selected amounts of water, light and manure, the CPU 11 searches for numeral data through the registers 14c–14d, and determines whether the searched, i.e., selected numeral data of water, light and manure elements are equivalent to one another (steps B5, B6).

Since the amount (3) AVERAGE is selected for the water, light and manure elements, the CPU determines "YES", and further determines whether the numeral data is (3) AVERAGE or (4) MUCH (steps B6, B7).

In other words, the CPU 11 determines whether the three elements are fed enough to the plant in well balanced state (steps B6, B7). Since the amount (3) AVERAGE has been selected for all the water, light and manure elements, the CPU determines "YES" in step B7, and further searches through the plant address register M of the RAM 14 to determine whether the plant address corresponding to the present growing stage of the plant is "M=4" or "M=5", that is, determines whether the plant is in the most growing stage (fifth growing stage) or in the final stage (sixth growing stage) in the growing course (steps B7, B8).

Since "M =1" is set to the plant address register M in the RAM 14, and the plant is in the second growing stage at present, the CPU 11 determines "NO" in step B8, and the plant address register is renewed from "M=1" (second growing stage) to "M=2" (third growing stage) (steps B8, B9).

Then, the CPU 11 reads out and displays plant image data of the third growing stage (FIG. 3) corresponding to the renewed plant address "M=2" on the LCD unit 16 as shown in FIG. 8C (step B10).

When the plant is in the first ("M=0") to fourth growing stages ("M=3") and elements (water, light and manure) are fed enough to the plant, the plant address is incremented by "+1" and thereby-the plant image data of the following growing stage is displayed.

Even though the CPU determines "YES" in steps B6 and B7, i.e., determines that water, light and manure elements are fed enough to the plant in well balance state, the plant address M is set to "0" when the CPU 11 determines "YES" in step B8, i.e., determines that the plant is in the fifth growing stage ("M=4") or in the sixth growing stage ("M=5"). Therefore, the plant of the first growing stage ("M=0") (FIG. 3) is displayed on the display unit 16 (steps B8, B11 and B10).

Even though the CPU determines "YES" in steps B6 and B7, i.e., determines that water, light and manure elements are fed to the plant in well balance state, the plant address M is not renewed when the CPU 11 determines "NO" in step B7, i.e., determines that numeral data of the selected amount (1) NO or (2) A LITTLE is not enough. Therefore, the plant of the second growing stage ("M=1") displayed in step B1 is kept displayed on the display unit 16 (steps B7 to B10)(, which indicates that the plant does not grow).

Meanwhile, when the CPU determines "NO" in step B6, i.e., determines that water, light and manure elements are not fed to the plant in well balance state, and further when the CPU 11 determines "NO" in step B12, i.e., determines that amounts, (1) NO and (4) MUCH are selected, and that water, light and manure elements are not fed to the plant in well balance state, the CPU 11 determines whether the present plant address M is "0" in step 13. When the CPU 11 determines "M=0", the plant of the first growing stage ("M=0") displayed in step B1 is kept displayed on the display unit 16 (steps B12, B13 and B10)(, which indicates that the plant does not grow).

Further, when the CPU determines "YES" in step B12, i.e., determines that amounts, (1) No and (4) MUCH are selected, and that water, light and manure elements are fed to the plant in extremely unbalanced state, and further when the CPU 11 determines "NO" in step B13, i.e., determines that the present plant address M is in the range of "M=1" (the second growing stage) and "M=4" (the fifth growing stage), the plant address M is set to "5" (the sixth growing stage) and the plant of the sixth growing stage (final growing stage, withering plant, FIG. 3) is displayed on the display unit 16 (steps B12, B13, B14 and B10).

When, in step B12, the CPU determines "NO", i.e., determines that water, light and manure elements are fed to the plant in well balanced state, the plant address M is not renewed and the plant displayed in step B1 is kept displayed on the display unit 16 (the plant does not grow)(steps B12, B10).

In the first electronic notebook with the above mentioned structure, one of the plant image data corresponding to the first (M=0) to sixth growing stages (M=5) is read out from the ROM 13 and is displayed on the LCD unit 16. Further, image data representing the plant growing elements (water, light and manure) are read out from the ROM 13 and are displayed. When amounts are selected for the water, light and manure elements respectively by setting numerals by means of the key input unit 12, the selected amounts are set in the water register 14c, the light register 14d and the manure register 14e respectively. When the plant of the selected growing stage displayed on the display unit 16 is fed with the plant growing elements of the selected amounts, a plant of renewed growing stage is read out from the ROM 13 and is displayed in place of the previously displayed plant. Therefore, the user can not only review the growing stages of the plant on the display unit 16 but also he (or she) can confirm, as if he actually grows the plant, how the plant grows when some amounts of the plant growing elements are fed to the plant. In this way, using the first electronic notebook, the user can learn how to glow a plant even if he does not actually grow the plant.

Second Embodiment

Now, the second embodiment of the present invention will be described.

Figure 9:
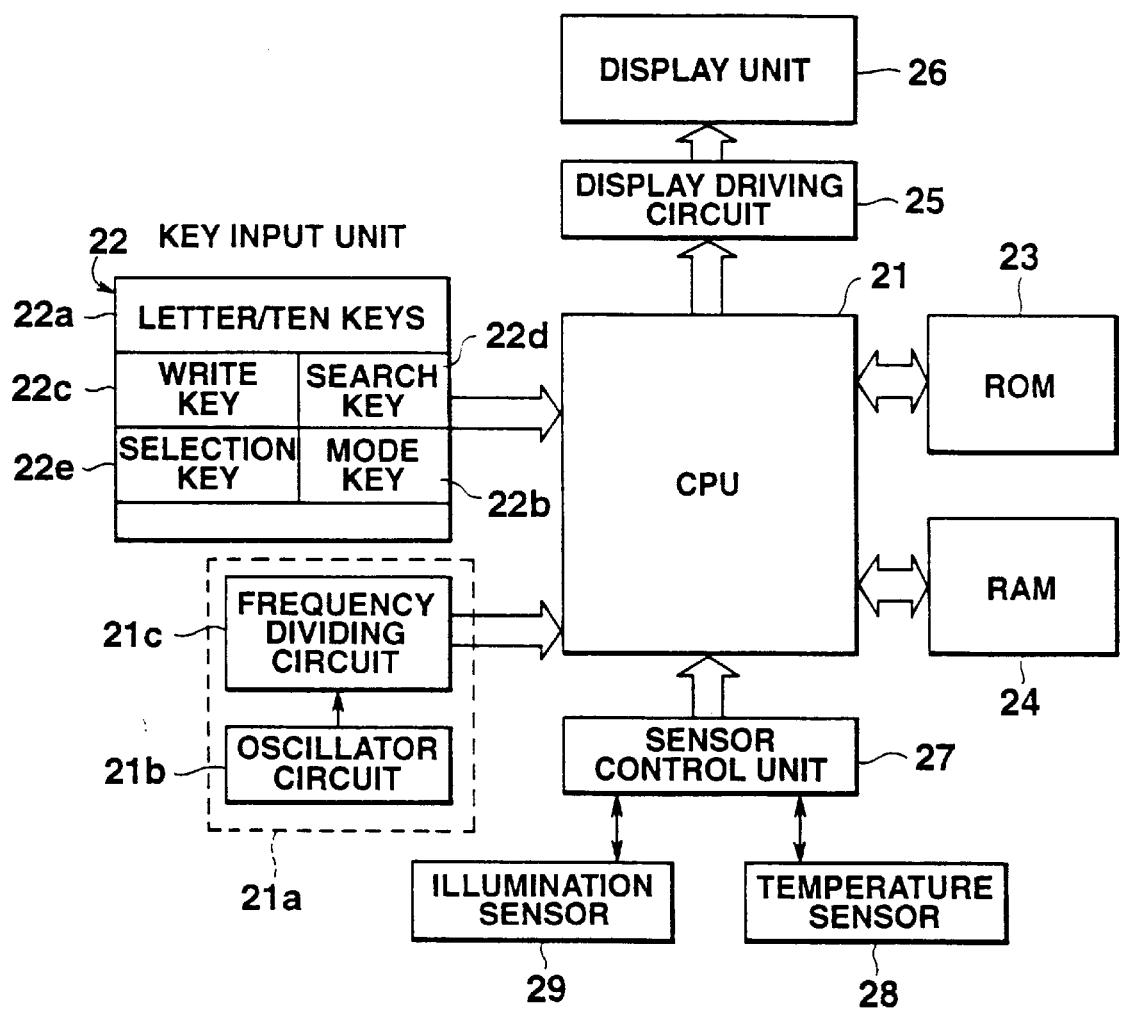
FIG. 9 is a circuit diagram of a second electronic notebook incorporating a second embodiment of the image displaying apparatus according to the present invention.

FIG. 9 is a circuit diagram of a second electronic notebook incorporating the second embodiment of the image displaying apparatus according to the present invention.

The second electronic notebook is provided with a central processing unit (CPU) 21.

The CPU 21 is driven by a key input signal supplied from a key input unit 22 to control operations of peripheral circuits in accordance with a system program stored in a read only memory (ROM) 23. The CPU 21 is connected with the key input unit 22, the ROM 23, a random access memory (RAM) 24, a timer 21a including an oscillator circuit 21b and a frequency dividing circuit 21c, a display driving circuit 25 and a liquid crystal display unit (LCD unit or display unit) 26 through the display driving circuit 25.

The CPU 21 is connected with a temperature sensor 28 and an illumination sensor 29 through a sensor control unit 27.

The key input unit 22 is installed with letter/ten keys 22a, a mode key 22b, a write key 22c, a search key 22d and a selection key 22e. The letter/ten keys 22a are operated to input "names" and "phone numbers" to be registered as notebook data. The mode key 22b is operated to set a notebook mode and/or an image display mode. The write key 22c is used to register notebook data input by operation of the letter/ten keys 22a in the RAM 24. The search key 22d is operated to search and display data through notebook data registered in the RAM 24. The selection key 22e is operated to select a sort of plants (a tulip, "T=0" and wheat, "T=1").

In the ROM 23 are previously stored the system program for the CPU 11 to perform a control operation and a plurality of plant image data representative of growing stages of two plants (tulip and wheat).

Figure 10:
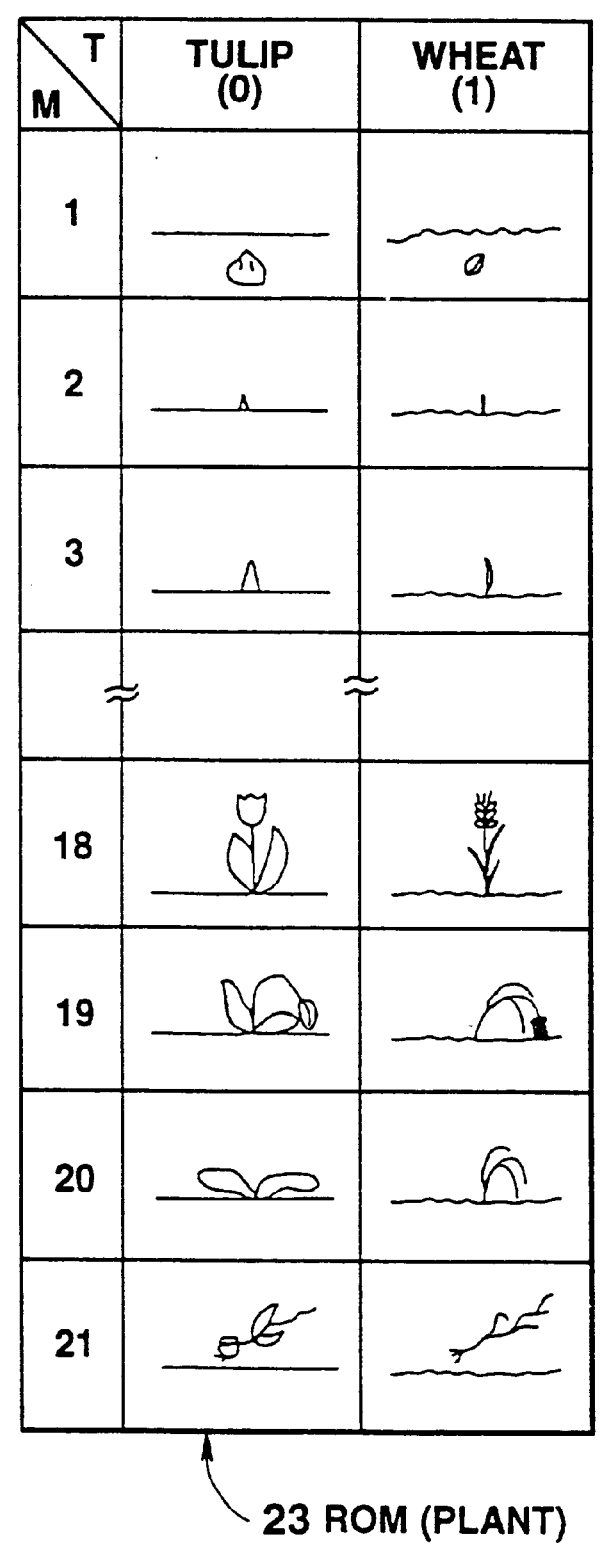

FIG. 10 is a view showing plant image data previously stored in the ROM 23 of the second electronic notebook. More specifically, the plant image data are bit map data stored in the ROM 23, which represent the two sorts of plants (tulip: "T=0" and wheat: "T=1") in 21 growing stages (corresponding to addresses "M=1" to "M=21") in a growing course.

Figure 11:
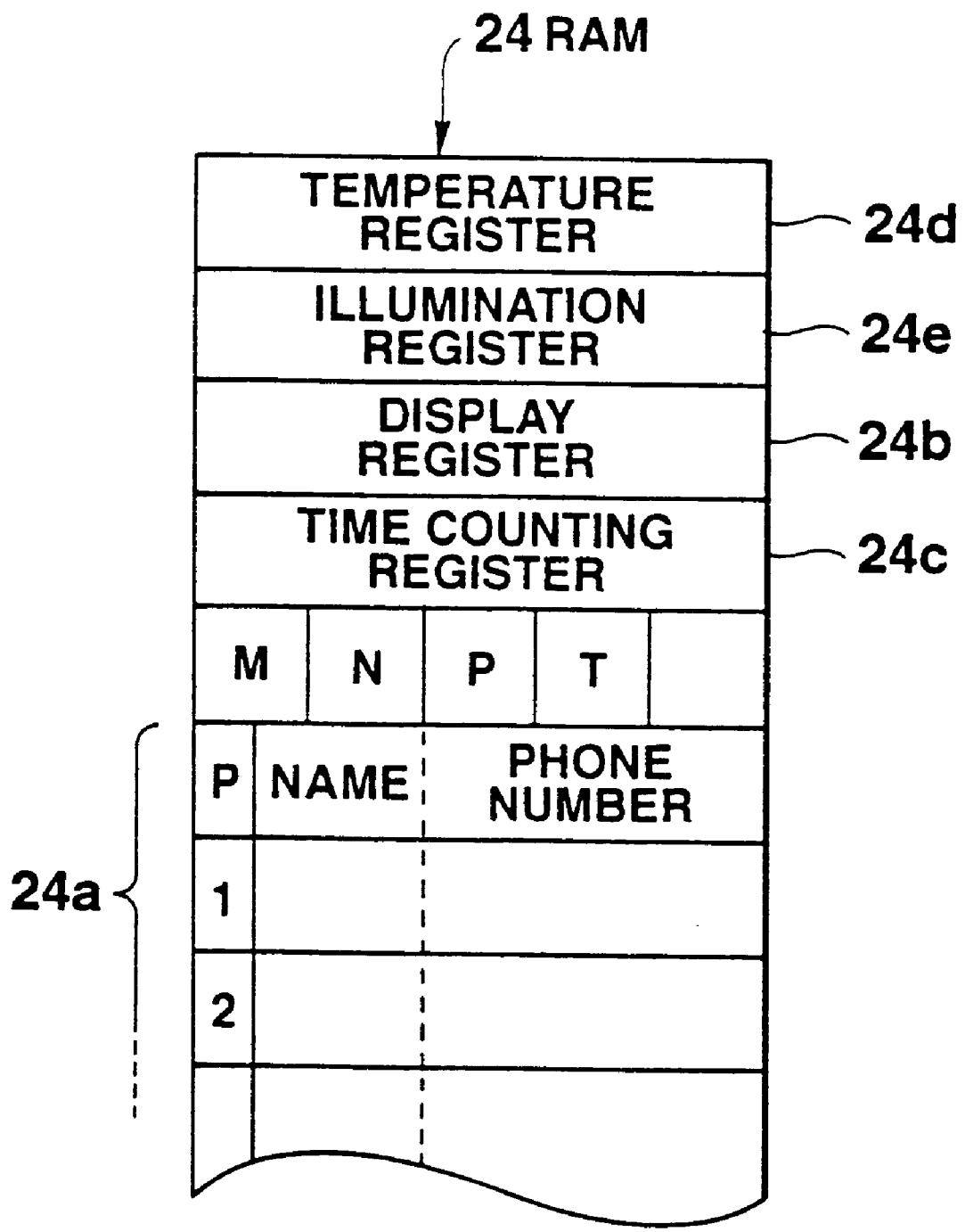
FIG. 11 is a view showing registers in RAM of the second electronic notebook.

FIG. 11 is a view showing a structure of registers in the RAM 24 of the second electronic notebook. The RAM 24 comprises a notebook data register 24a, a display register 24b, a time counting register 24c, a mode flag register N, a plant-address register M, a sort register T, a temperature register 24d, an illumination register 24e. The notebook data register 14a stores personal data (notebook data) for the predetermined number of persons including names and phone numbers at areas designated by a pointer P. Display data to be displayed on the LCD unit 26 is written as image data in the display register 24b. Time counting data corresponding to a time counting signal sent from the timer 21a are successively renewed and set to the-time counting register 24c. The mode flag register N is set to a value "0" in the notebook mode, and to a value "1" in the image display mode. The plant address register M indicates addresses ("M=0, 1, . . . and 5") in the ROM 23 representing areas where the plant image data (FIG. 10) are stored. The sort register T indicates a sort of plants image data (FIG. 10). Environmental temperatures which are detected by the temperature sensor 28 every hour based on time counting data set in the time counting register 24c are successively accumulated in the temperature register 24d. Environmental illuminations which are detected every hour by the illumination sensor 29 are successively accumulated in the illumination register 24e.

On the LCD unit 26, either notebook data input by operation of the letter/ten keys 22a or notebook data searched through the notebook data register 24a of the RAM 24 in response to operation of the search key 22d is displayed in the notebook mode.

In the image display mode, plant image data of a tulip or wheat in one of the growing stages, which data is read out from the ROM 23 in accordance with a plant address indicated by the plant address register M and a sort indicated by the sort register T, is displayed on the LCD unit 26.

In the plant address register M of the RAM 24 is set one of the plant addresses, "M=0, 1, 2, . . . and 21", corresponding to a growing rate of the plants, which growing rate is designated based on temperature accumulated value set in the temperature register 24d and the illumination accumulated value set in the illumination register 24e, when it is determined based on the time counting data set in the time counting register 24c that 24 hours have lapsed.

The timer 21a sends a time counting signal to the CPU 21 all the time to reset the time data in the time counting register 24c of the RAM 24. The temperature accumulated value set in the temperature register 24d and the illumination accumulated value set in the illumination register 24e are cleared every 24 hours based on the time counting data set in the time counting register 24c.

Now, operation of the second electronic notebook with the above mentioned structure will be described in detail.

Figure 12:
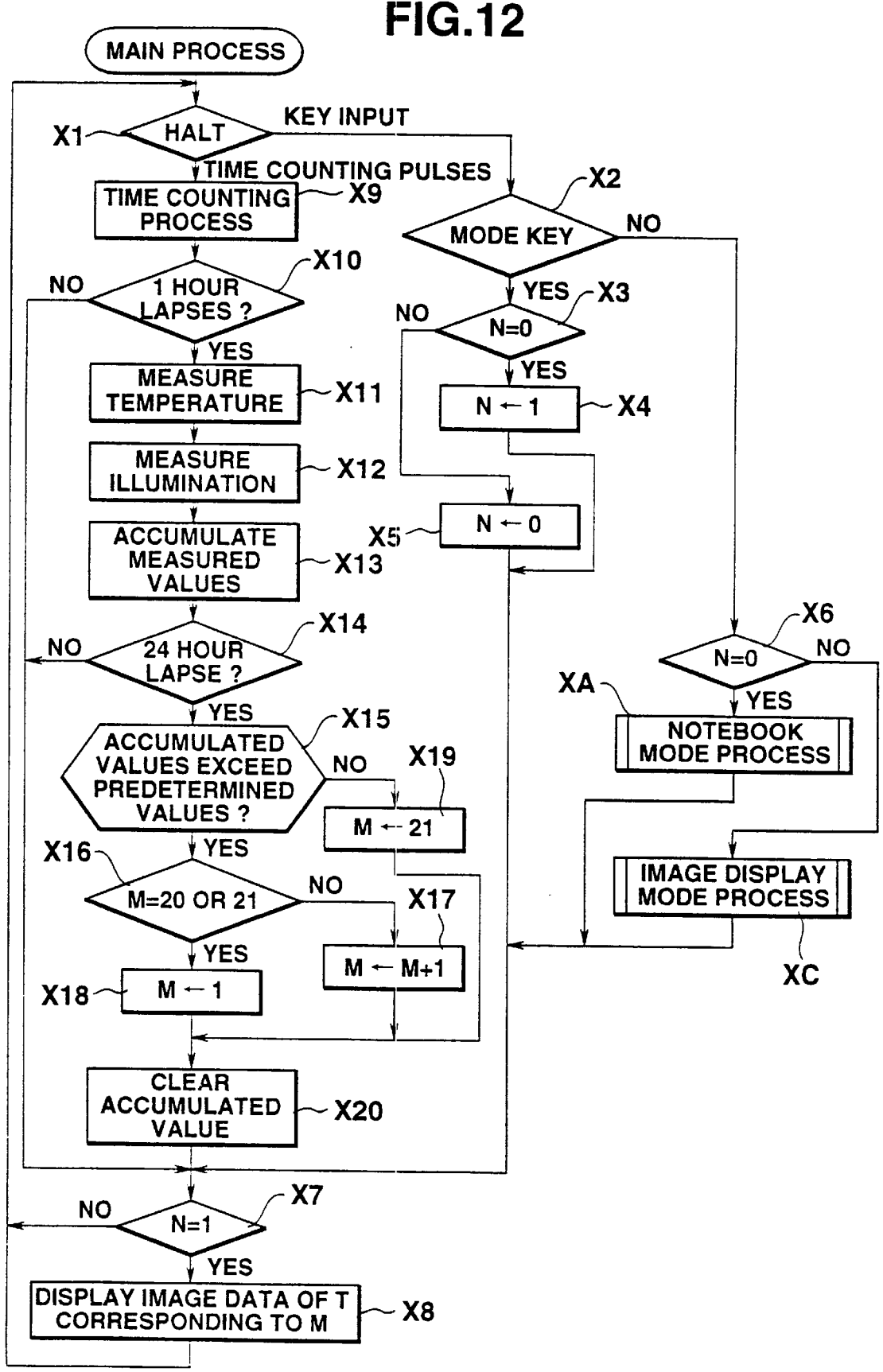
FIG. 12 is a flowchart of a main process of the second electronic notebook.

FIG. 12 is a flowchart of a main process of the second electronic notebook.

Figure 13:
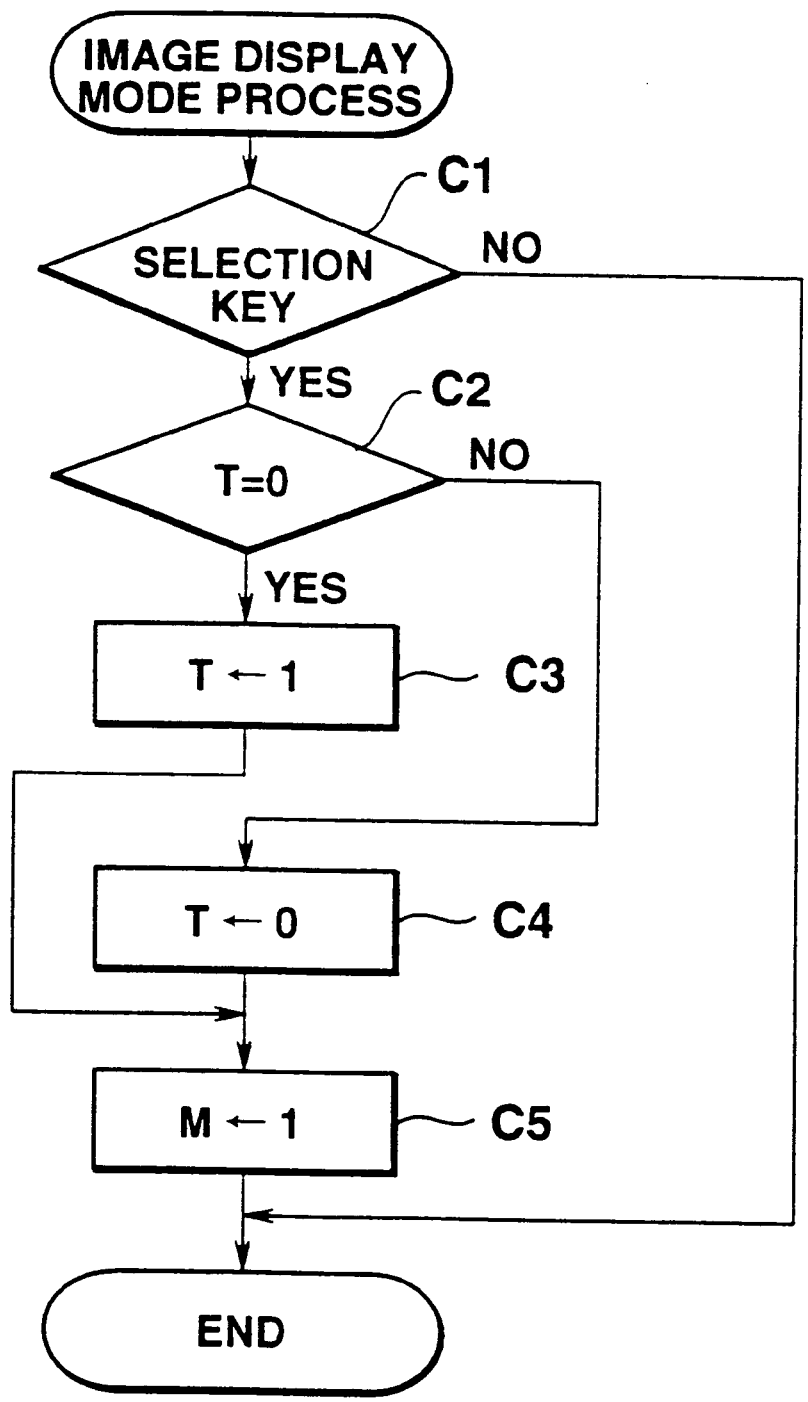
FIG. 13 is a flowchart of a plant-selecting process in an image-display mode process of the second electronic notebook.

FIG. 13 is a flowchart of a plant-selecting process in an image-display mode process of the second electronic notebook.

In the case that a value "0" has been set to the mode flag register N of the RAM 24 when the mode key 22b of the key input unit 22 is operated, i.e., in the case that the CPU 21 has been set to the notebook mode, a value "1" is set to the mode flag register N and the CPU 21 is switched to the image display mode (steps X1, X2, X3, X4 of FIG. 12).

In the case that a value "1" has been set to the mode flag register N of the RAM 24 when the mode key 22b is operated, i.e., in the case that the CPU 21 has been set to the image display mode, the mode flag register N is set to a value "0" and the CPU 21 is switched to the notebook mode (steps X1, X2, X3, X5).

In the notebook mode where a value "0" has been set to the mode flag register N of the RAM 24, the CPU 21 performs the notebook mode process (steps X6, XA of FIG. 12, FIG. 6).

In the image display mode where a value "1" has been set to the mode flag register N, the CPU 21 performs the image-display mode process (steps X6, XC of FIG. 12, FIG. 13).

In the image display mode where a value "1" has been set to the mode flag register N in the RAM 24, a plant image data (tulip or wheat) is read out from the ROM 23 and displayed on the display unit 26 in accordance with a plant address indicated by the plant address register M and a sort of plants indicated by the sort register T (steps X7, X8).

Meanwhile, a time counting pulse signal is supplied to the CPU 21 from the timer 21a to renew a time counting data set in the time counting register 24c of the RAM 24. It is judged based on the time counting data set in the time counting register 24c every time the time counting data is renewed, whether one hour period has lapsed. As long as it is determined "NO", the operation advances to step X7, where, in the image display mode, the plant image data (tulip or wheat) are successively read out from the ROM 23 and displayed on the display unit 26 in accordance with the plant addresses indicated by the plant address register M and a sort of plants indicated by the sort register T (steps X1 to X9, X10 to X7 to X8).

When the time counting data set in the time counting register 24c is renewed by the time counting pulse signal transferred from the timer 21a, and when it is determined at step X10 that one hour period has lapsed, an environmental temperature and an environmental illumination are detected by the temperature sensor 28 and the illumination sensor 29, respectively. The detected environmental temperature and environmental illumination are measured by the CPU 21 through the sensor control unit 27, and are stored in the temperature register 24d and the illumination register 24e, respectively (steps X10, X11, X12 and X13).

At step X14, it is judged based on the time counting data set in the time counting register 24c whether a twenty-four hour period has lapsed. When it is determined "NO", the operation advances to step X7, where, in the image display mode, the plant image data (tulip or wheat) are successively read out from the ROM 23 and displayed on the display unit 26 in accordance with the plant addresses indicated by the plant address register M and a sort of plants indicated by the sort register T (steps X14, X7, X8).

More specifically, every time it is determined at step X10 that one hour period has lapsed, an environmental temperature and an environmental illumination are measured accumulated in the temperature register 24d and the illumination register 24e, respectively. Thereafter, when it is determined, at step X14, based on the time counting data set in the time counting register 24c that twenty four hours have lapsed, it is judged whether the temperature accumulated in twenty four hours and stored in the temperature register 24d and the illumination accumulated in twenty four hours and stored in the illumination register 24e exceed certain values, respectively (steps X14, X15).

When it is determined at step X15 that the temperature and illumination accumulated in twenty four hours exceed the certain values which are necessary for the plant to grow, it is judged at step X16 whether the plant address M of the plant address register M has been set to "20" or "21".

In other words, it is judged at step X16 whether the plant is in a twentieth growing stage or in a twenty-first growing stage, the plant image data of which plant is read out from the ROM 23 in accordance with the plant address M and is displayed on the display unit 26. In the present embodiment, a plant in the twentieth growing stage or in the twenty-first growing stage seems to stop growing. For example, when the plant address M is "2" and it is determined "NO" at step X16, the plant address M is incremented to "3" (steps X16, X17).

Then, when the image display mode is set after the accumulated temperature in the temperature register 24d and the accumulated illumination in the illumination register 24e are cleared, the plant image data (FIG. 10) of the plant (tulip or wheat) designated by the sort register T and of the third growing stage corresponding to the plant address "M=3" of the plant address register M is read out and displayed on the display unit 26 in place of the previously displayed image (steps X20, X7, X8).

More specifically, when the temperature and illumination accumulated in twenty four hours reach certain values, respectively, which are necessary for the plant to grow, and when the selected plant address falls within a range of "M=1" to "M=19" (that is, in a plant growing range), the plant address M is incremented by "+1", whereby the plant image data of the next growing stage is displayed on the display unit 26.

When it is determined at step X15 that the temperature and illumination accumulated in twenty four hours exceed the certain values which are necessary for the plant to grow, and further when it is determined at step X16 that the plant address M of the plant address register M has been set to "20" or "21", the plant address M is set to "1", and the plant image data (of tulip or wheat) of the first growing rate is displayed on the display unit 26 in place of the previously displayed image. (steps X16, X18, X20, and steps X7, X8).

When it is determined at step X15 that the temperature and illumination accumulated in twenty four hours do not reach the certain values which are necessary for the plant to grow, the plant address M is set to "21" (the twenty-first growing rate) and the plant image data (withered-plant image data) of the plant (tulip or wheat) is displayed on the display unit 26 in place of the image previously displayed thereon (steps X15 to X19, X20, X7, X8).

Meanwhile, when the selection key 22e on the key input unit 22 is operated in the image display mode, in which the mode flag register N is set to "1" and the plant image data of the plant designated by the sort register T is read out from the ROM 23 in accordance with the plant address set in the plant address register M and is displayed on the display unit 26, the CPU 21 starts a image display mode process (FIG. 13). in the image display mode.

More specifically, when a value "0" is set to the sort register T of the RAM 24, i.e., when a "tulip" is selected or designated, a value "1" is set to the sort register T and the plant is switched to "wheat" (steps C1, C2, C3 of FIG. 13).

When a value "1" is set to the sort register T of the RAM 24 at the time the selection key 22e is operated, i.e., when a "wheat" is selected or designated, a value "t" is set to the sort register T and the plant is switched to "tulip" (steps C1, C2, C4 of FIG. 13).

In either case that the plant is switched from the "tulip" to the "wheat" or case that the plant is switched from the "wheat" to the "tulip", the plant address M is set to a value "1", which represents an initial growing rate (step C5).

In the second electronic notebook with the above mentioned structure, plant image data of each of the plan its, which correspond respectively to the first growing rate "M=1" to the twenty-first growing rate "M=21", are previously stored in the ROM 23, and one of the plant image data of one of the plants is read out from the ROM 23 and displayed on the LCD unit 26. Meanwhile, time counting data registered in the RAM 24 is updated by the time counting pulse signal sent from the timer 21a and the CPU 21 judges it based on the updated time counting data, whether an one-hour period has lapsed. Environmental temperature and illumination are detected by the temperature sensor 28 and the illumination sensor 29, respectively, every time an one-hour period has lapsed, and the detected temperatures and illuminations are accumulated in the temperature register 24d and the illumination register 24e, respectively. When twenty four hours have lapsed, the CPU 21 judges whether the accumulated temperature and illumination exceed the predetermined values respectively. Then, another plant image data of the plant corresponding to another growing rate is read out from the ROM 23 depending on the result of the judgement by the CPU 21 and the growing rate of the previously displayed plant image data, and the read out plant image data is newly displayed on the LCD unit 26. Therefore, the user can observe the growing course of the plant on the LCD unit 26, and can make it displayed on the LCD unit 26 how the growing course of the plant is affected by the environmental conditions. As a result, even if the user does not grow a plant actually, he (or she) can learn how the plant grows under various environmental conditions.

In the second embodiment, plant image data of a new growing rate is selected among from those stored in the ROM 23 depending on the temperature and illumination accumulated in a twenty-four hour period, but this period may be arbitrarily selected.

Further, in the second embodiment, the temperature sensor 28 and the illumination sensor 29 are used to detect environmental conditions, but other sensor such as a humidity sensor may be employed in addition to the above two sensors to detect more actual environmental conditions for growing a plant.

A device with such a structure as determining a growing rate of a plant depending on combination of the plant growing elements (water, light, manure) of the first embodiment and the environmental conditions (temperature, illumination) of the second embodiment will allow the user to watch how the plant grows under environmental conditions which are more similar to natural conditions.

In the above embodiments, plants are selected as an object to be observed but animals such as a cat and a dog may be selected.

Third Embodiment

Now, a third embodiment of the present invention will be described with reference to the drawings.

Figure 14:
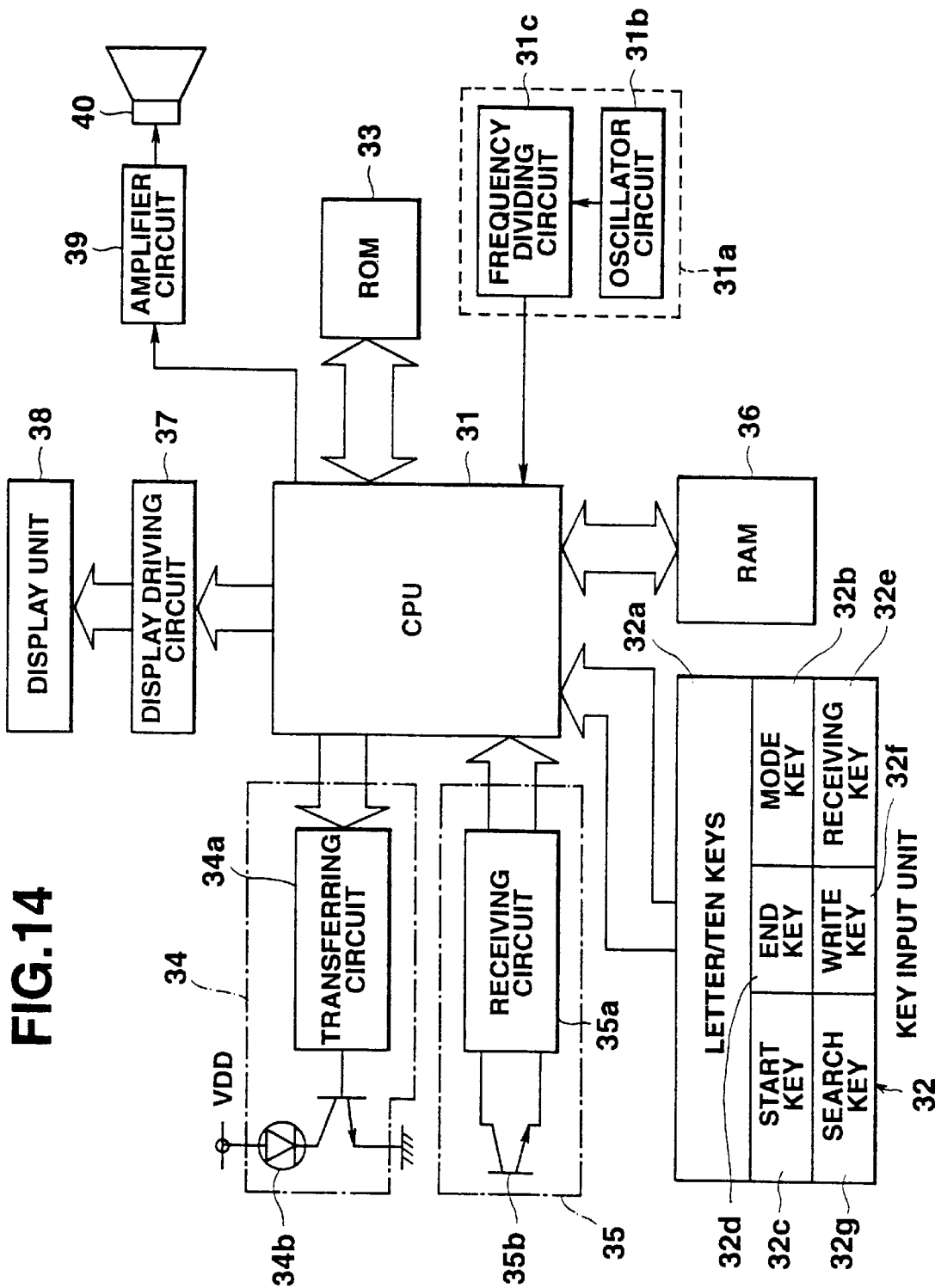
FIG. 14 is a circuit diagram of a third electronic notebook incorporating a third embodiment of the image displaying apparatus according to the present invention.

FIG. 14 is a circuit diagram of the third electronic notebook incorporating a switching device according to the present invention.

The third electronic notebook is provided with a central processing unit (CPU) 31.

The CPU 31 is driven by a key input signal supplied from a key input unit 32 to control operations of peripheral circuits in accordance with a system program stored in a read only memory (ROM) 33. The CPU 31 is connected with the key input unit 32, the ROM 33, a transferring unit 34, a receiving unit 35 and a random access memory (RAM) 36.

Further, the CPU 31 is connected with a timer 31a including an oscillator circuit 31b and a frequency dividing circuit 31c, a display driving circuit 37, a liquid crystal display unit (LCD unit or display unit) 38 through the display driving circuit 37, an amplifier circuit 39 and a speaker 40 through the amplifier circuit 39.

The key input unit 32 is installed with letter/ten keys 32a, a mode key 32b, a start key 32c, an end key 32d, a receiving key 32e, a write key 32f and a search key 32g. The letter/ten keys 32a are used to input "names" and "phone numbers" to be registered as notebook data. The mode key 32b is operated to set a notebook mode and/or an image display mode. The start key 32c is operated to start transferring notebook data to other electronic appliance in the notebook mode and is operated to send an infrared light in the image display mode. The end key 32d is operated to stop receiving notebook data from other electronic appliance in the notebook mode and is operated to stop sending the infrared light in the image display mode. The receiving key 32e is operated to receive notebook data sent from other electronic appliance in the notebook mode. The write key 32f is used to register in the RAM 36 notebook data input by operation of the letter/ten keys 32a and notebook data sent from other electronic appliance. The search key 32g is operated to search and display data through notebook data registered in the RAM 36.

In the ROM 33 are previously stored the system program for the CPU 31 to perform a control operation, a plurality of image data, and effect-sound data corresponding respectively to the image data.

FIG. 15 is a view showing image data of an object and effect-sound data previously stored in the ROM 33 of the third electronic notebook.

Six combination data ((1), (2)), each including two image data of a dog in a bit map format, and corresponding effect-sound data (PCM data) are stored at corresponding addresses "M=1 to 5" in the ROM 33, respectively.

The transferring unit 34 is provided with a transferring circuit 34a and a light emitting element 34b, which emits the infrared light in response to a transfer data sent from the CPU 31. When the start key 32c is operated in the notebook mode, the infrared light emitted by the light emitting element 34b is modulated by means of the transferring circuit 34a in accordance with the notebook data input and displayed on the display unit 38 by operation of the letter/ten keys 32a and/or notebook data searched and displayed by operation of the search key 32g, and the modulated infrared light is transferred as infrared light data from the transferring unit 34.

In the image display mode, an infrared light of a predetermined frequency is transferred through the transferring circuit 34a and the light emitting element 34b in response to an instruction of the CPU 31.

The receiving unit 35 is provided with a receiving circuit 35a and a light receiving element 35b for receiving an infrared light data externally supplied thereto. When the receiving key 32e is operated in the notebook mode, notebook data sent from an external electronic appliance is received and demodulated by the receiving circuit 35a and the light receiving element 35b. The demodulated data is displayed on the liquid crystal display means 38.

In the image display mode, an externally supplied infrared light is received by the light receiving element 35b, and the received infrared light is transmitted to the CPU 31 through the receiving circuit 35a.

Figure 16:
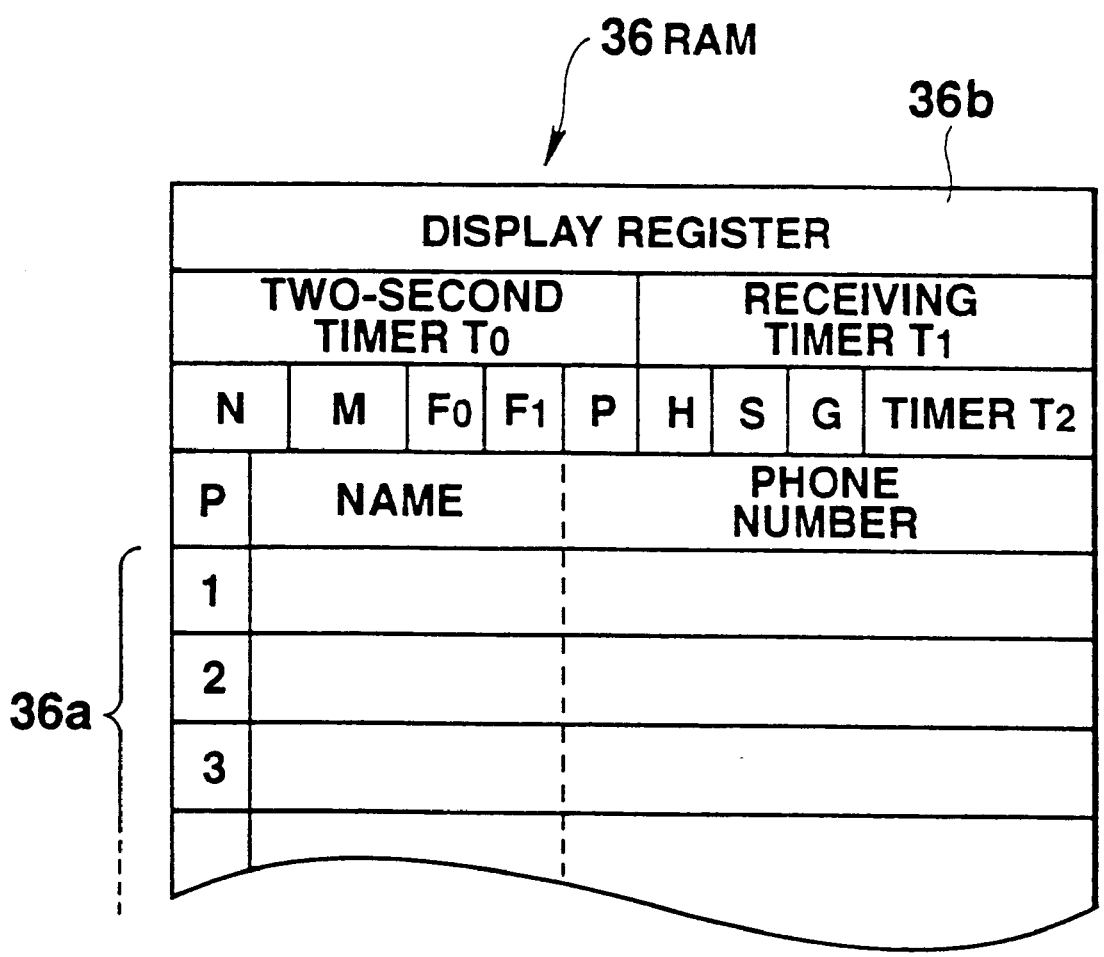
FIG. 16 is a view showing registers in RAM of the third electronic notebook.

FIG. 16 is a view showing registers in the RAM 36 of the third electronic notebook.

The RAM 36 comprises a notebook data register 36a, a display register 36b, a two-second timer register T0, a receiving timer register T1, a display timer register T2, a mode flag register N, a ROM-address register M, a receiving flag register F0, a light emitting flag register F1, an object designating register H, a light receiving flag register S, and a number-of-receiving-time register G. The notebook data register 36a stores personal data (notebook data) for the predetermined number of persons including names and phone numbers at areas designated by a pointer P. Display data to be displayed on the LCD unit 38 is written as image data in the display register 36b. The two-second timer register T0 serves to define a time duration based on a timer signal from the timer 31a, during which the transferring unit 34 emits the infrared light in the image display mode. An infrared light receiving time duration is renewed and set to the receiving timer register T1 based on the timer signal from the timer 31a, during which time duration the infrared light is received. The display timer register T2 defines a switching time based on the timer signal from the timer 31a, at which time a displayed image data is switched in the image display mode. The mode flag register N is set to a value "0" in the notebook mode, and to a value "1" in the image display mode. The ROM address register M indicates addresses in the ROM 23 where the image data and the effect-sound data are stored. The receiving flag register F0 is set to a value "1" while notebook data is received in the notebook mode. The light emitting flag register F1 is set to a value "1" while the infrared light is emitted in the image display mode. The object designating register H is alternatively set to "0" and "1" every switching time (every two seconds) defined by the display timer register T2, thereby alternatively designating image data (1) and (2) indicated by the ROM address register M. The light receiving flag register S is set to a value "1" when the receiving unit 35 starts receiving an infrared light in the image display mode, and is set to a value "0" when the unit 35 stops receiving the infrared light. The number-of-receiving-time register G is incremented by "+1" every time the infrared light is received in the image display mode.

On the LCD unit 38, any one of notebook data input by operation of the letter/ten keys 32a, notebook data searched through the notebook data register 36a of the RAM 36 in response to operation of the search key 32g and notebook data received through the receiving unit 35 in response to operation of the receiving key 32e is displayed in the notebook mode.

In the image display mode, image data (1), (2), which are included in at least one combination data read out from the ROM 33 in accordance with a ROM address indicated by the ROM address register M of the RAM 36, are alternatively displayed on the LCD unit 38 every two seconds based on the designation by the object designating register H.

Further, an effect sound is output through the speaker 40, based on effect-sound data which are read out from the ROM 33 in accordance with a ROM address indicated by the ROM address register M.

The timer 31a supplies the CPU 31 with a timer signal of 32 Hz. A time counting data is added to the two-second timer register T0, the receiving timer register T1 and the display timer register T2 in response to the timer signal of 32 Hz. For example, these registers count 1 sec. when T=32 and 2 sec. when T=64.

The two-second timer register T0 and the receiving timer register T1 are cleared to start counting operation again, when the transferring unit 34 sends the infrared light by operation of the start key 32c in the image display mode and the receiving unit 35 receives a reflected infrared light. When the time counting data written in the two-second register T0 exceeds 2 seconds, the transferring unit 34 stops sending the infrared light.

The transferring unit 34 sends or emits the infrared light only for a period of 2 seconds after the receiving unit 35 receives the reflected infrared light form the transferring unit 34, whereby unnecessary power consumption may be avoided or minimized. The number-of-receiving-time register G is incremented by "+1" in accordance with the number of times the receiving unit 35 receives the infrared light in the period of 2 seconds in response to non-contact operation by the user.

When time counting data which is read out from the receiving timer register T1 at the time when the receiving unit 35 stops receiving the infrared light, i.e., a time length during which the receiving unit 35 receives the infrared light continuously is not less than 0.3 seconds but not more than 1 second, a value "2" is set to the ROM address register M. When the time counting data is not less than 1 second, a value "3" is set to the ROM address register M.

When time counting data read out from the receiving timer register T1, i.e., a time length during which the receiving unit 35 receives the infrared light continuously is, for example, less than 0.3 seconds, and "1" has been set to the number-of-receiving-time register G when the time counting data of the two-second timer register T0 exceeds 2 seconds, a value "1" is set to the ROM address register M. And when a value "2" has been set to the number-of-receiving-time register G when the time counting data of the two-second timer register T0 exceeds 2 seconds, a value "4" is set to the ROM address register M. Further, when a value of not less than "3" has been set to the number-of-receiving-time register G, a value "5" is set to the ROM address register M.

That is, an address is set to the ROM address register M, which address is determined in accordance with a time duration and the number of times of the non-contacting operation performed by the user while the receiving unit 35 receives the infrared light.

Now, operation of the third electronic notebook with the above mentioned structure will be described.

Figure 17:
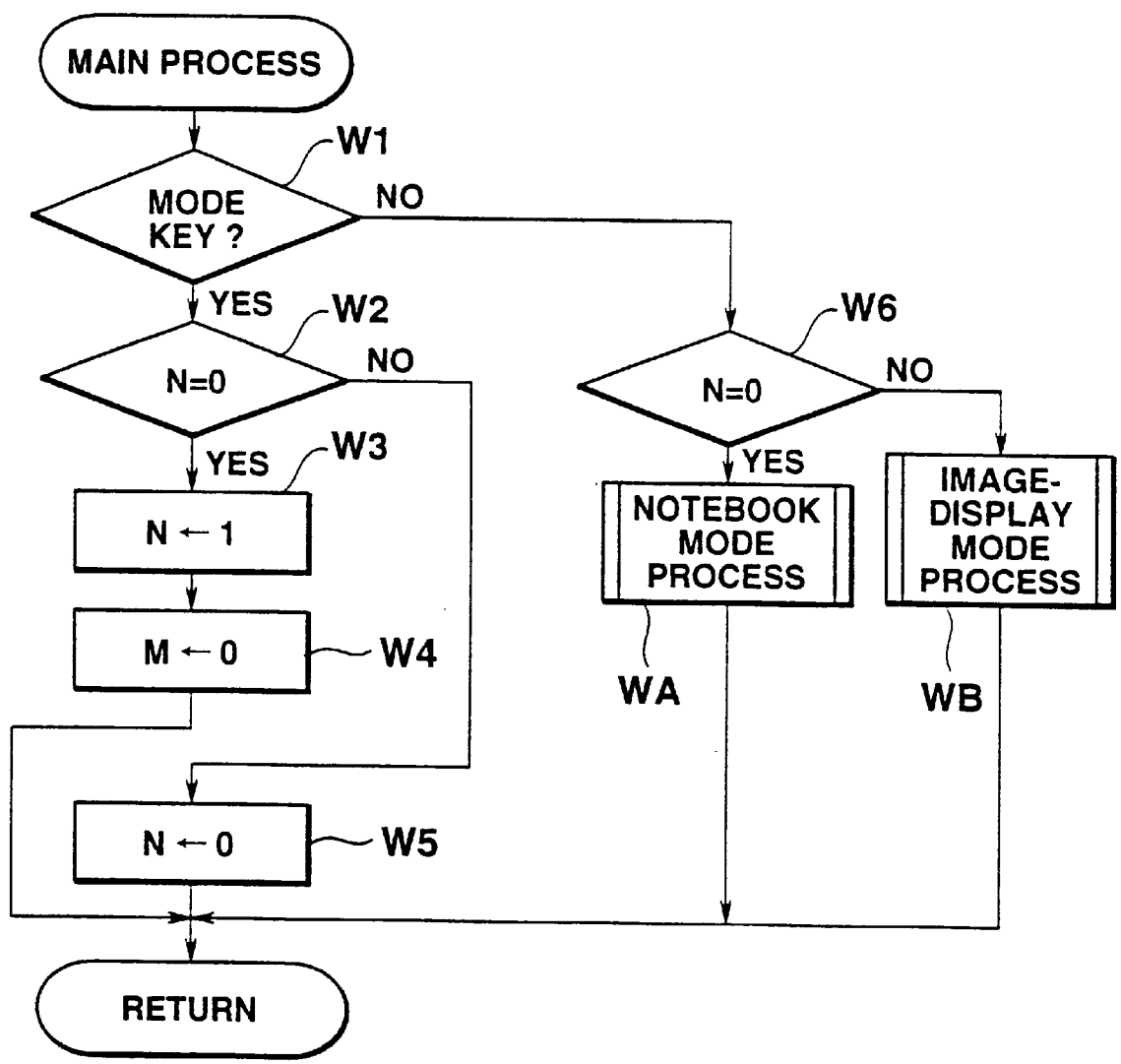
FIG. 17 is a flowchart of a main process of the third electronic notebook.

FIG. 17 is a flowchart of a main process of the third electronic notebook.

In the case that a value "0" has been set to the mode flag register N of the RAM 36 when the mode key 32b of the key input unit 32 is operated, i.e., in the case that the CPU 31 has been set to the notebook mode, the mode flag register N is set to a value "1" and the CPU 31 is switched to the image display mode (steps W1, W2, W3 of in the flowchart of FIG. 17).

When the CPU 31 has been set to the image display mode, a value "0" is set to the ROM address register M (step W4).

In the case that a value "1" has been set to the mode flag register N of the RAM 36 when the mode key 32b is operated, i.e., in the case that the CPU 31 has been set to the image display mode, the mode flag register N is set to a value "0" and the CPU 31 is switched to the notebook mode (steps W1, W2, W5).

Figure 18:
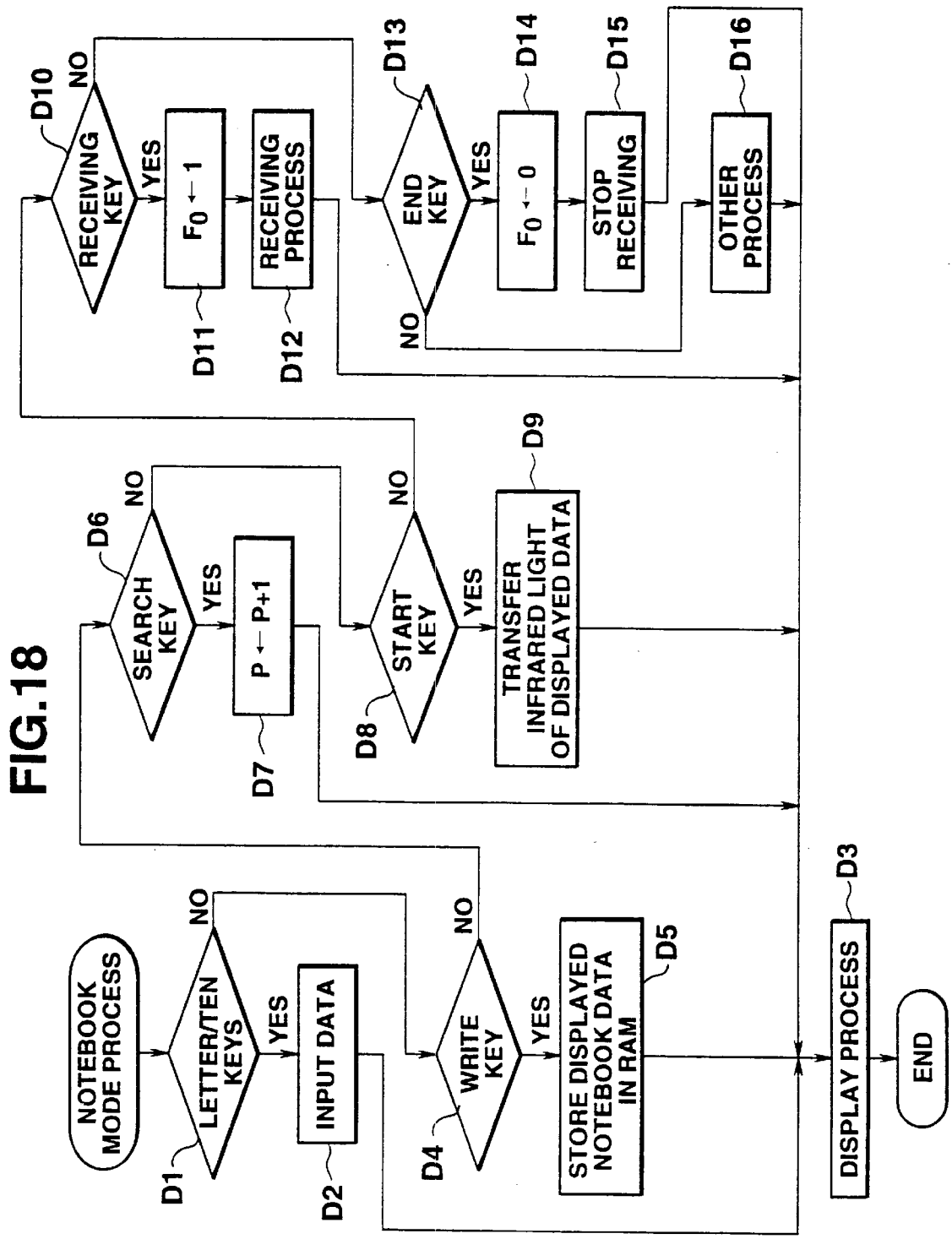
FIG. 18 is a flowchart of a notebook-mode process of the third electronic notebook.

In the notebook mode where a value "0" has been set to the mode flag register N of the RAM 36, the CPU 31 performs the notebook mode process (steps W6, WA of FIG. 17, FIG. 18).

In the image display mode where a value "1" has been set to the mode flag register N, the CPU 31 performs the image-display mode process (steps W6, WB of FIG. 17, FIGS. 19–26).

The notebook-mode process will be described with reference to FIG. 18, which is a flowchart of the notebook-mode process of the third electronic notebook.

In the notebook mode, where a value "0" is set to the mode flag register N of the RAM 36, when notebook data such as "name", and "phone number" are entered by operation of the letter/ten keys 32a of the key input unit 32, the entered notebook data are successively displayed on the LCD unit 38 through the CPU 31 and the display driving circuit 37 (steps D1, D2, D3 of FIG. 18).

When the write key 32f of the key input unit 32 is operated, the notebook data which is displayed on the LCD unit 38 at present is registered in the notebook data register 36a of the RAM 36 (steps D4, D5).

Every operation of the search key 32g of the key input unit 32 increments the notebook-data pointer P of the RAM 36.

Then, the CPU 31 successively searches for notebook data of a predetermined number of persons through the notebook-data register 36a, and displays the searched data on the LCD unit 38 through the display driving circuit 37 (steps D6, D7, D3).

Operation of the start key 32c of the key input unit 32 makes the transferring circuit 34a of the transferring unit 34 modulate the infrared light of the light emitting element 34b with the notebook data which is displayed-on the LCD unit 38 at present. The modulated infrared light is output from the transferring unit 34 as infrared light data (steps D8, D9).

Operation of the receiving key 32e of the key input unit 32 sets a value "1" to the receiving flag register F0 of the RAM 36. Then, the receiving unit 35 receives infrared light data from an external electronic appliance, and the CPU 31 displays the received infrared light data on the display unit 38 through the display driving circuit 37 (steps D10, D11, D12, D3).

Operation of the end key 32d of the key input unit 32 sets a value "0" to the receiving flag register F0 of the RAM 36. Then, the receiving unit 35 stops receiving the infrared light data transferred from the external electronic appliance (steps D13, D14, D15).

Figure 19:
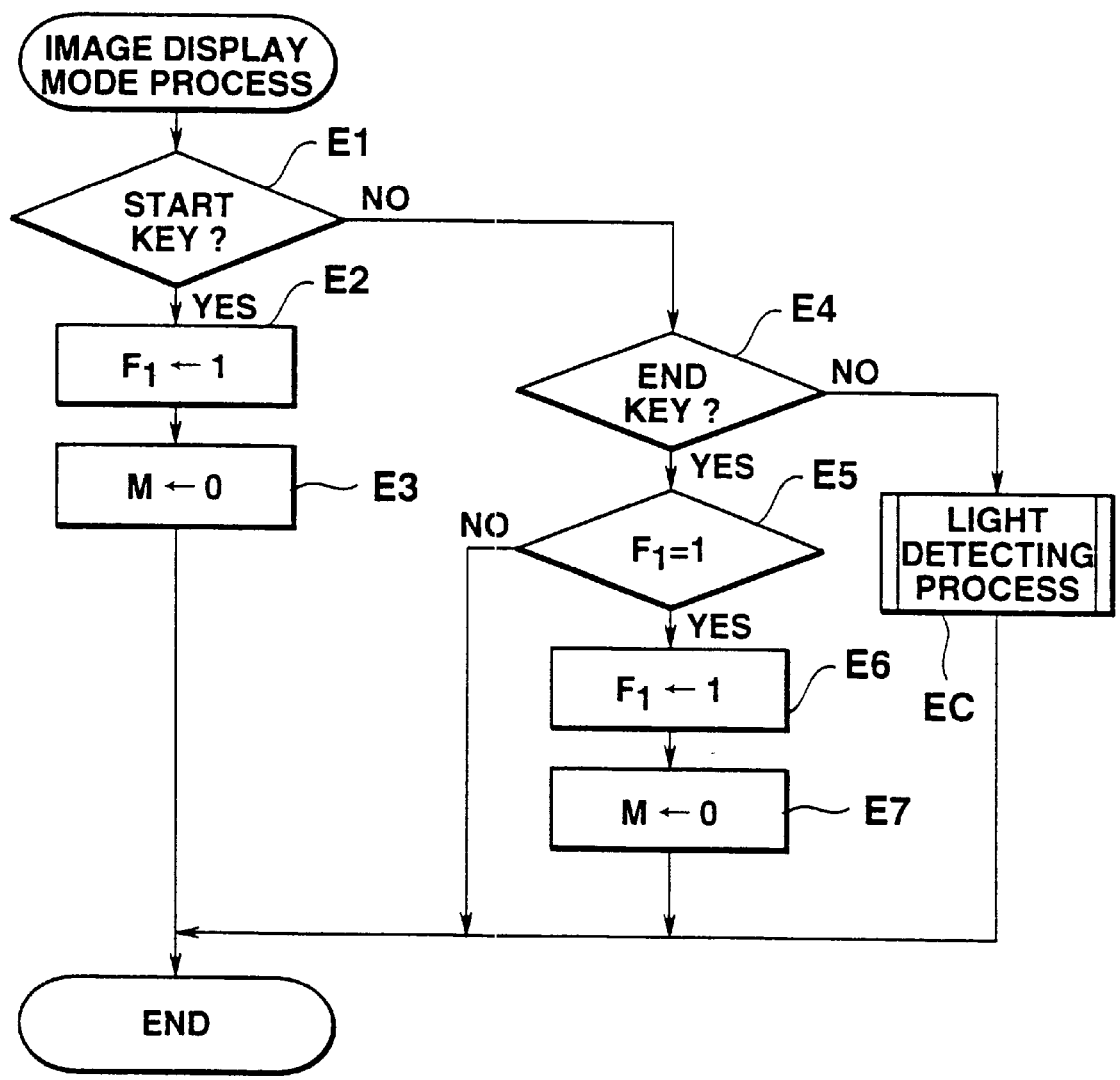
FIG. 19 is a flowchart of an image-display mode process of the third electronic notebook.
Figure 20:
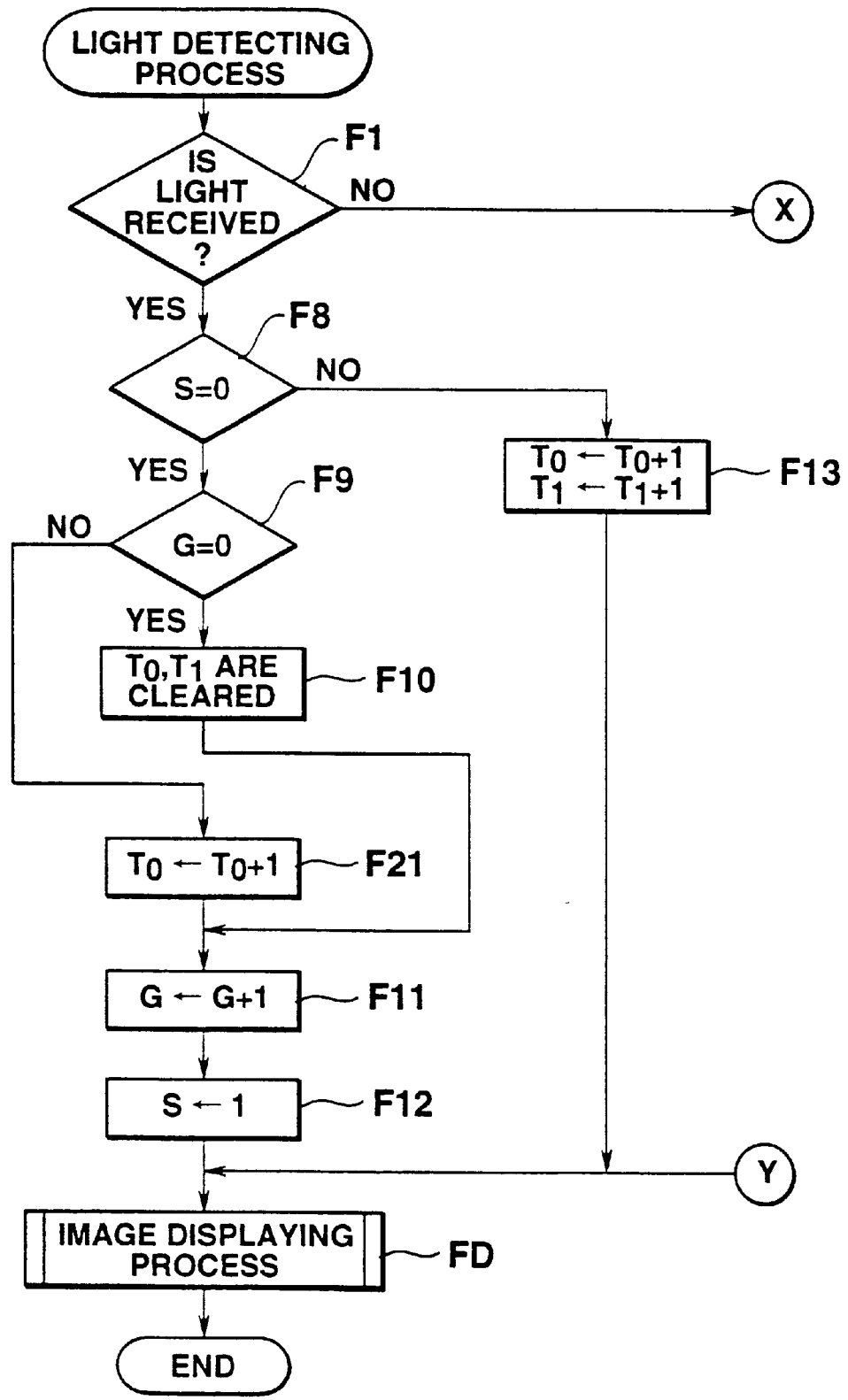
FIG. 20 is a flowchart of a light detecting process (performed when light is received) in the image-display mode process of the third electronic notebook.
Figure 21:
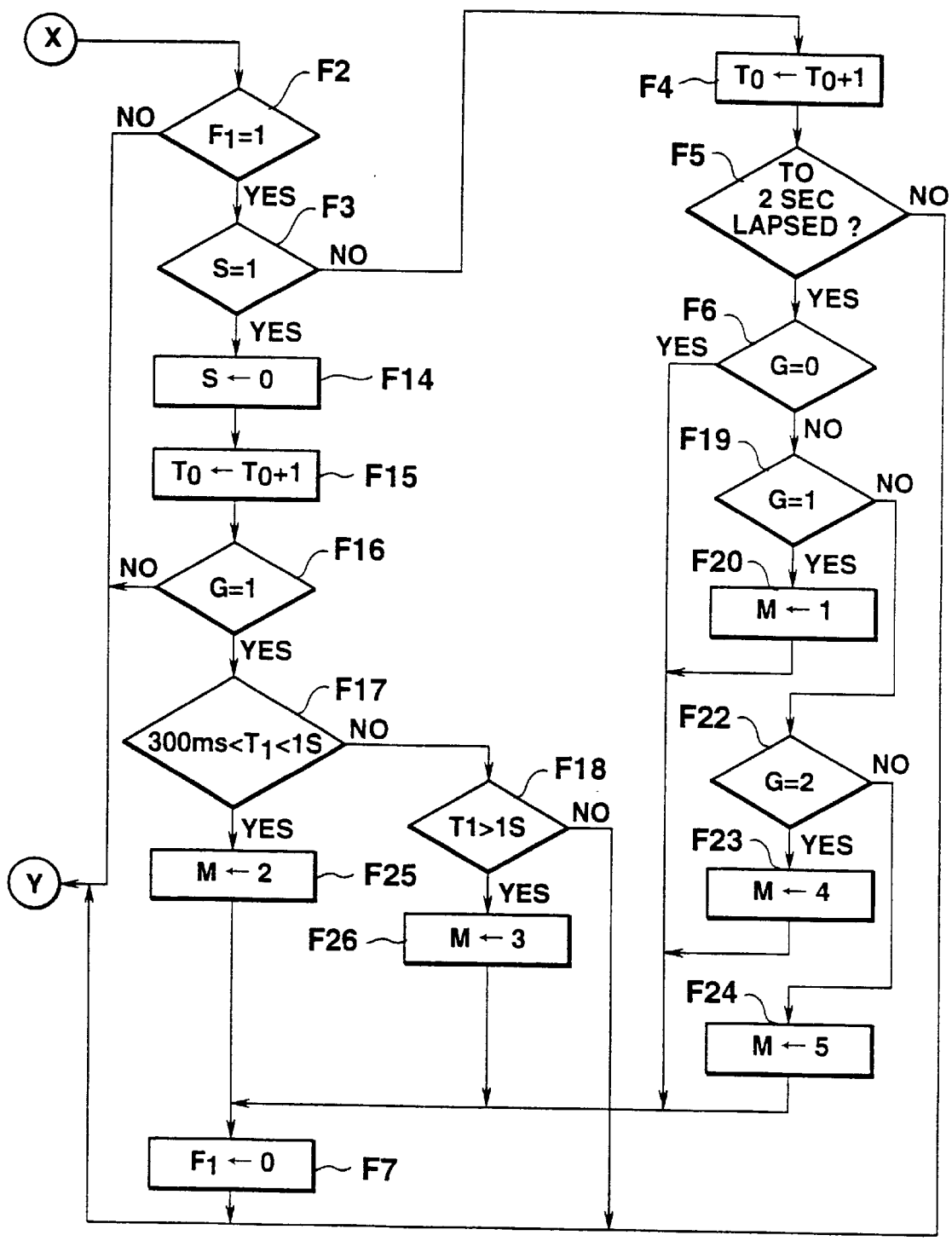
FIG. 21 is a flowchart of a light detecting process (performed when no is light received) in the image-display mode process of the third electronic notebook.

The image-display mode process will be described with reference to FIG. 19, which is a flowchart of the image-display mode process of the third electronic notebook.

In the image display mode, operation of the start key 32c of the key input unit 32 sets a value "1" to the light emitting flag register F1 of the RAM 36. Then, the light emitting element 34b of the transferring unit 34 start emitting infrared light (steps E1, E2 in the flowchart of FIG. 19).

Further, a value "0" is set to the ROM address register M of the RAM 36 (step E3).

Operation of the end key 32d of the key input unit 32 sets a value "0" to the light emitting flag register F1 of the RAM 36, while the light emitting flag register F1 is set to a value "1" and the light emitting element 34b is emitting infrared light. Then, the light emitting element 34b stope emitting infrared light, and the ROM address register M is initialized to a value "0" (steps E4, E5, E6, E7).

In the image display mode, when neither the start key 32c nor the end key 32d is operated, a light detecting process (FIGS. 20, 21) will be performed (E1, E4, EC).

More specifically, when the start key 32c is operated, the transferring unit 34 starts emitting infrared light. When no non-contacting operation is performed by the user after a value "1" is set to the light emitting flag register F1 and a value "0" is set to the ROM address register M (steps E1, E2, E3), it is determined "NO" at step F1 in the illumination detecting operation (FIGS. 20, 21), because the light receiving element 35b of the receiving unit 35 receives no reflected infrared light.

Since a value "1" is set to the light emitting flag register F1 and a value "1" is not set to the light receiving flag register S, it is determined "YES" at step F2 and "NO" at step F3. Then, time counting data of 32 Hz is added to the two-second timer register T0 (step F4 of FIG. 21).

Time counting data is read out from the two-second timer register T0 and it is judged at step F5 whether an infrared-light emitting period of 2 seconds has lapsed. When "NO" is determined at step F5, i.e., it is determined at step F5 that no period of 2 seconds has not lapsed after the light emitting element 34b starts emitting infrared light or after the start key 32c is operated, an image display process (FIG. 22) will be performed (steps F5, FD).

In the image display process, time counting data of 32 Hz is added to the display timer register T2 (step G1 of FIG. 22), and it is judged from the display timer register T2 at step G2 whether a period of 2 seconds has lapsed. When it is determined at step G2 that the period of 2 seconds has not lapsed, it is judged at step G3 whether the object designating register H has been set to a value "0".

Since the object designating register H has been initialized to "0", a first image data (1) is read out from the ROM 33 (FIG. 15) in accordance with the ROM address "M=0" of the ROM address register M, and the read out first image data (1) is displayed on the LCD unit 38 (steps G3, G4).

Then, processes at steps F1 to F5, FD (FIGS. 20, 21) are repeatedly performed until the time counting data of the two-second timer register T0 reaches "2" seconds. Meanwhile, processes at steps G1 to G4 (FIG. 22) are also repeatedly performed until timer counting data of the display timer register T2 reaches "2" seconds.

When it is determined at step F5 from the two-second timer register T0 that the infrared light emitting period of 2 seconds has lapsed, and further it is determined at step F6 that a value "0" has been set to the number-of-receiving-time register G, a value "0" is set to the light emitting flag register F1 and the transferring unit 34 stops emitting infrared light (steps F6, F7).

When it is determined from the display timer register T2 at step G2 that the first image data (1) of the ROM address "M=0 " corresponding to the object designating register "H=0" is displayed for 2 seconds, the display timer register T2 is cleared and a value "1" is set to the object designating register H (steps G2, G5 to G7).

Then, a second image data (2) is read out from the ROM 33 (FIG. 15) in accordance with the ROM address "M=0" of the ROM address register M, and the read out second image data (2) is displayed on the LCD unit 38 in place of the first image data (1) previously displayed thereon (step G8).

At step G9, effect sound data is read out from the ROM 33 in accordance with the ROM address "M=0" of the ROM address register M, but effect sound data is for making no sound. Therefore, the second image data of the ROM address "M=0" is displayed with no sound.

Through the processes at steps F1 to F7, FD, the image display process is repeatedly performed, and through the processes at steps G1 to G3, G8, G9, the second imaged data (2) corresponding to the ROM address "M=0" is displayed. When it is judged from the display timer register T2 that the second image data (2) corresponding to the ROM address "M=0" is displayed for 2 seconds, the display timer register T2 is cleared and a value "0" is set to the object designating register H (steps G2 to G5, G6 to G10).

When the image display process is performed again, the first image data (1) corresponding to the ROM address "M=0" is read out from the ROM 33 and displayed on the LCD unit 38 in place of the second image data (2).

In other words, when the start key 32c is operated, and a value "0" is set to the ROM address register M of the RAM 36 at step E3, the CPU 31 alternatively reads out a pair of image data (first and second image data) (1), (2) (FIG. 15) corresponding to the ROM address "M=0" in accordance with time counting data of the display timer register T2 and object designating data of the object designating register H, and alternatively displays the read out the pair of image data for 2 seconds. That is, the first image data (1) of a doghouse is displayed for first 2 seconds and then the second image data (2) of a dog coming out from the doghouse is displayed for the second 2 seconds, as shown in FIG. 24 (steps F1 to F7, FD of FIGS. 20, 21).

Figure 24:
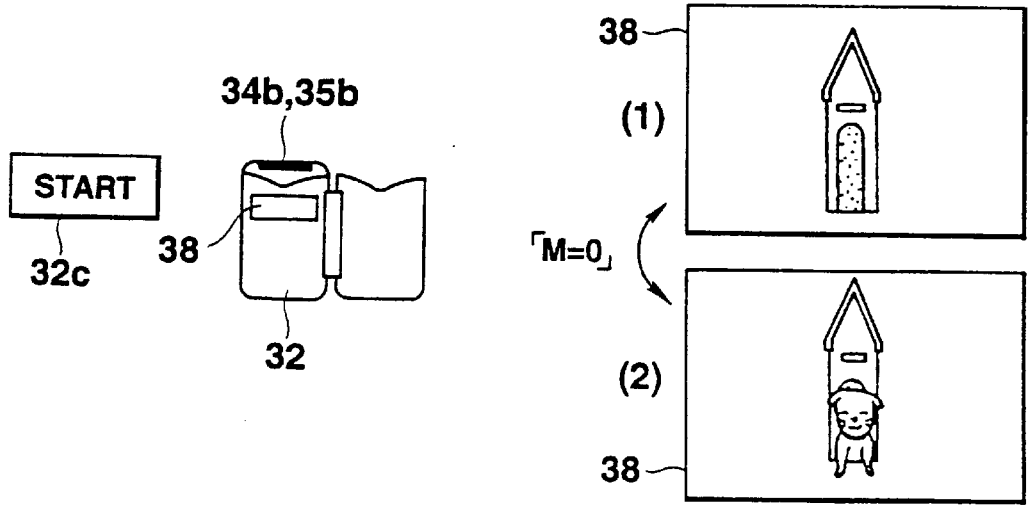
FIG. 24 is a view illustrating motions of a character (dog) shown when a "start" key is operated in the image-display mode process.
Figure 25:
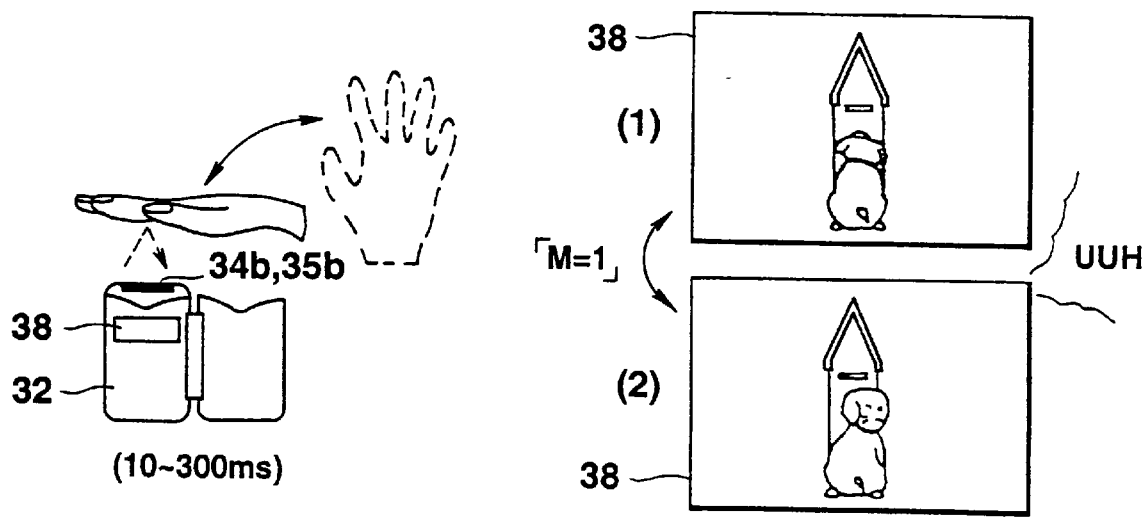
FIG. 25 is a view illustrating motions of the character (dog) shown when non-contact operation of the user is performed within a period of not more than 0.3 seconds in the image-display mode process.

When the user puts his (her) hand in front of the light emitting element 34b and the light receiving element 35b of the third electronic notebook, as shown in FIG. 25, before time counting data of the two-second register T0 reaches 2 seconds, while infrared light is emitted by operation of the start key 32c, and image data (1), (2) of a dog corresponding to the ROM address "M=0" are alternatively displayed on the LCD unit 38 as shown in FIG. 24, then the infrared light emitted from the light emitting element 34b is reflected on the user's palm towards the light receiving element 35b. Then, the light receiving element 35b receives the reflected light, and it is determined "YES" at step F1.

When the infrared light emitted from the transferring unit 35 is reflected on the user's palm and is detected by the light receiving element 35b of the receiving unit 35 at step EC, it is determined that the light receiving flag register S and the number-of-receiving-time register G have been set to a value "0" and two-second timer register T0 and the receiving timer register T1 are cleared (steps F1, F8 to F19).

Then, the number-of-receiving-time register G is added with "+1", and is set to "1", whereby indicating that the reflected infrared light is received once by the receiving unit 35. Further, the light receiving flag register S is set to a value "1", whereby indicating the infrared light is received, and the image display process is performed (steps F11, F12, FD). Since the ROM address register M is kept set to "M=0", image display data (1), (2) of a dog corresponding to the ROM address "M=0" are still alternatively displayed on the LCD unit 38 as shown in FIG. 24 (steps G1 to G10).

When processes of steps F1, F8, F13, FD are repeatedly performed while the receiving unit 35 continuously receives the infrared light reflected from the user's palm, an adding process of an infrared light emitting time duration from the time at which the receiving starts receiving the reflected infrared light is repeatedly performed to the two-second timer register T0 and an adding process of a light receiving time duration from the time at which the receiving starts receiving the reflected infrared light is repeatedly performed to the receiving timer register T1, and also image data (1), (2) of a dog corresponding to the ROM address "M=0" are alternatively displayed.

When the user keeps his hand apart from the light emitting element 34b and the light receiving element 35d, and the infrared light reflected from the his palm is not detected by the light receiving element 34b, it is confirmed that the light emitting flag register F1 is set to "1" and the light receiving flag register S is set to "1" and then the light receiving flag register S is set to a value "0" and an adding process of an infrared light emitting time duration is performed to the two-second timer register T0 (steps F1 to F3, F14, F15).

When the user executes the non-contacting operation instantaneously as if he hits a head of the dog displayed on the LCD unit 38 with his hand, and the light receiving time duration of the reflected infrared light, which corresponds to a time duration of the non-contacting operation performed by the user, falls within a range of not less than 0.1 seconds to less than 0.3 seconds, the number-of-receiving-time register G is set to "G=1" at step F11. Since the receiving timer register T1 has been set to "T1=0.1 to 0.3 "at step F13, it is determined "YES" at step F16, "NO" at steps F17 and F18. In the image display process at step FD, image data (1), (2) of a dog corresponding to the ROM address "M=0" are alternatively displayed again.

Through the processes at steps F1 to F5, FD, the image data (1), (2) of a dog corresponding to the ROM address "M=0" are alternatively displayed repeatedly until the infrared light emitting time duration represented by the two-second timer register T0 exceeds 2 seconds. When it is determined that the infrared light emitting time duration represented by the two-second timer register T0 exceeds 2 seconds, it is determined at step F19 that the number of receiving times of the reflected infrared light represented by the number-of-receiving-time register G has been set to "1" at step F11. At step F20, the ROM address register M is set to "1" (steps F5, F6, F19, F20).

Then, a value "0" is set to the light emitting flag register F1, and the transferring unit 34 stops emitting of infrared light, and further image data (1), (2) of a dog corresponding to the ROM address "M=1" are alternatively displayed (steps F7, FD).

Figure 22:
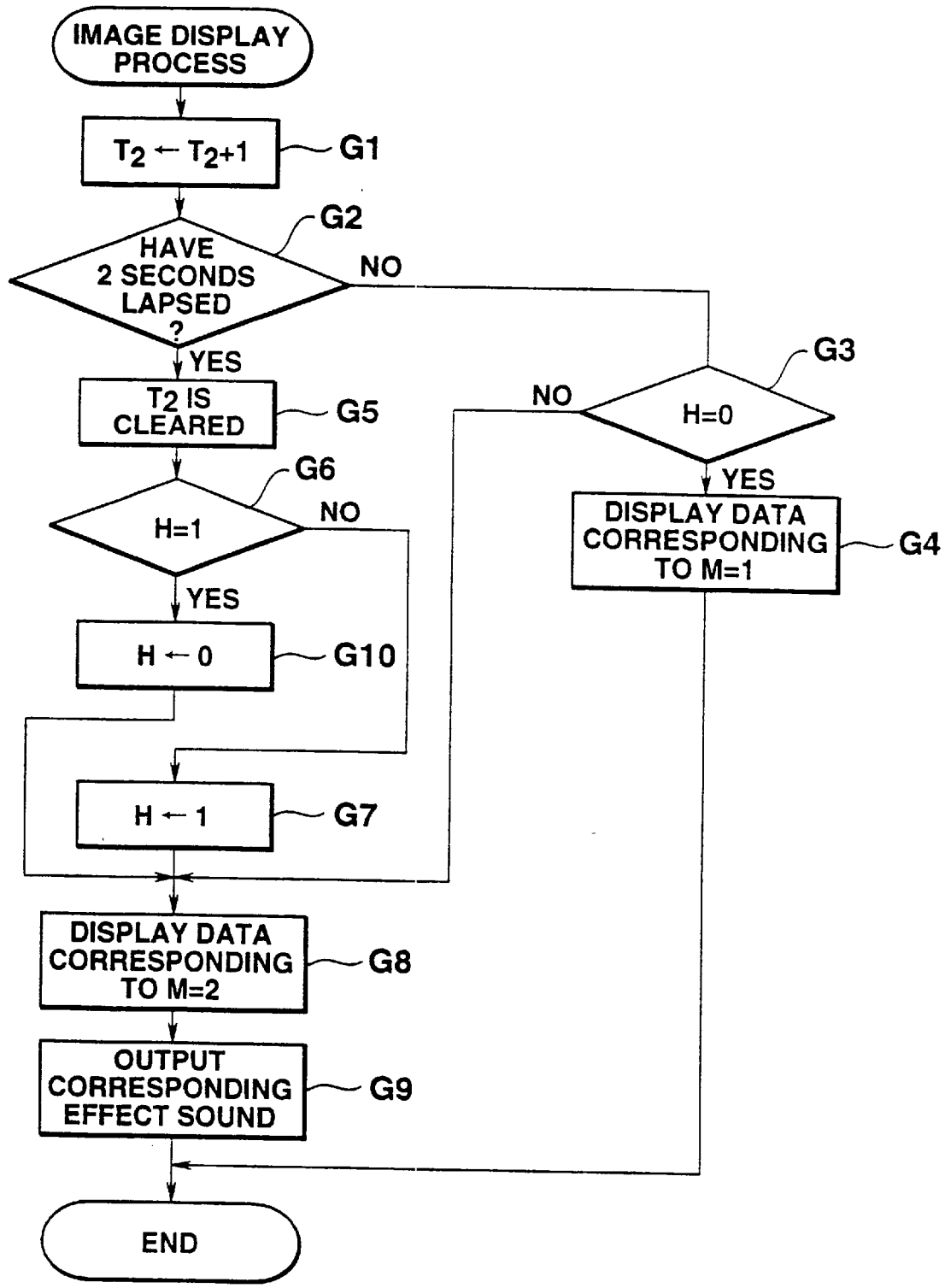
FIG. 22 is a flowchart of an image displaying process in the image-display mode process.

More specifically, in the image display process of FIG. 22, the CPU 31 alternatively reads out from the ROM 33 image data (1), (2) (FIG. 15) corresponding to the updated ROM address "M=1" in accordance with time counting data of the display timer register T2 and object designating data of the object designating register H, and displays the read out image data on the LCD unit 38. Image data (1) of a rear view of a dog in front of the doghouse and image data (2) of a looking-back disheartened dog are alternatively displayed on the LCD unit 38 each for 2 seconds in place of the image data corresponding to the ROM address "M=0".

At this time, the CPU 31 reads out effect sound data from ROM address "M=1" of the ROM 33, and outputs a sound of "UUH" (a groaning of a dog showing disheartenment) from the speaker 40 through the amplifier circuit 39 while the image data (2) of the looking back dog is being displayed on the LCD unit 38 (steps F1, F2, FD, G1 to G10).

That is, when the user performs non-contacting operation as if he hits on the head of the dog with his hand, the disheartened dog is displayed on the LCD unit 38 with a groaning sound output through the speaker 40.

Meanwhile, when the user performs the non-contacting operation, the number-of-receiving-time register G is set to "G=1" and the receiving timer register T1 is set to "T1<0.3" at step F13. Then it is determined "YES" at step F16, and "NO" at steps F17, F18, and further predetermined processes are performed at steps FD, F1 to F5, FD. In the image displaying process at step FD, where image data (1) (the doghouse) and (2) (the dog in front of the doghouse), corresponding to the ROM address "M=0" are alternatively displayed before the infrared light emitting time duration of the two-second timer register T0 reaches 2 seconds, when the light receiving element 35b of the receiving unit 35 detects the reflected infrared light in response to the non-contacting operation of the user, it is determined that the light receiving flag register S is not set to "0" and the number-of-receiving-time register G is not set to "0", and the infrared light emitting time duration is added to the two-second timer register T0 (steps F1, F8, F9, F21).

Then, the number-of-receiving-time register G is incremented by "+1" and is set to "2", which indicates that the reflected infrared light is received twice. Further, the light receiving flag register S is set to "1", which indicated that the reflected infrared light is received. Then, the image display process of FIG. 22 is performed (steps F11, F12, FD).

Since the ROM address register M has been set to the ROM address "M=0", image data (1), (2) of a dog corresponding to the ROM address "M=0" are alternatively displayed as shown in FIG. 24 (steps G1 to G10 of FIG. 22).

When the user keeps his hand away from the light emitting element 34b and the light receiving element 25b and the reflected infrared light is not detected, the light receiving flag register S is set to "0" and the infrared light emitting time duration is added to the two-second timer register T0 because the light emitting flag register F1 has been set to "1" and the light receiving flag register S has been set to "1" (steps F1 to F3, F14, F15).

The user can order the dog displayed on the LCD unit 38 to sit down by moving his hand so as to make itself pass by the light emitting element 34b and the light receiving element 35b twice. When the user moves his hand to pass by the light emitting element 34b and the light receiving element 35b twice, and when the number-of-receiving-time register G has been set to "G=2" at step F11, it is determined "NO" at step F11 and image data (1), (2) of a dog corresponding to the ROM address "M=0" are repeatedly and alternatively displayed in the image display process at step FD.

When it is determined that the infrared light emitting time duration of the two-second timer register T0 exceeds 2 seconds, and further when it is determined at step F22 that the number-of-receiving-time register G has been set to "G=2" at step F11, which means that the reflected infrared light has been received twice, the ROM address register is set to "4" at step F23 (steps F5, F6, F22, F23).

Then, a value "0" is set to the light emitting flag register F1, the transferring unit 34 stops emitting infrared light and image data of a dog corresponding to the updated ROM address "M=4" are displayed (steps F7, FD).

More specifically, in the image display process of FIG. 22, the CPU 31 reads out from the ROM 33 image data (1), (2) (FIG. 15) corresponding to the ROM address "M=4" alternatively, in accordance with time counting data of the display timer register T2 and object designating data of the object designating register H, and displays the read out image data (1), (2) of a dog on the LCD unit 38. In other words, image data (1), (2) of a dog sitting in front of the doghouse are alternatively displayed on the LCD unit 38 each for 2 seconds in place of the image data (1), (2) of ROM address "M=0" previously displayed thereon. At this time, the CPU 31 reads out-effect sound data corresponding to the ROM address "M=4" from the ROM 33 to generate a sound, and outputs a generated sound of "BOWWOW" through the amplifier circuit 39 and the speaker 40 while the image data (2) of the dog sitting in front of the doghouse is being displayed (steps F1, F2, FD, steps G1 to G10 of FIG. 22).

As described above, when the user moves his hand so as to make itself pass by the light emitting element 34b and the light receiving element 35b twice and orders the dog displayed on the LCD unit 28 to sit down, image data of the dog sitting down is selected and displayed with the sound of "BOWWOW" outputted through the speaker 40.

The user can give good words to the dog displayed on the LCD unit 38 by moving his hand so as to make itself pass by the light emitting element 34b and the light receiving element 35b three times before the infrared light emitting time duration of the two-second timer register T0 exceeds 2 seconds, while the image data (1), (2) of a dog corresponding to the ROM address "M=0" are alternatively displayed during the processes at steps F1 to F5, FD. When the user waves his hand in front of the light emitting element 34b and the light receiving element 35b three times, and when the number-of-receiving-time register G has been set to "G=3" at step F11, it is determined "NO" at step F16 after the processes at steps F1 to F3, F14, F15. Then, in the image display process at step FD, image data (1), (2) corresponding to the ROM address "M=0" are alternatively displayed.

Thereafter, during the processes at steps F1 to F5, FD, the image data (1), (2) corresponding to the ROM address "M=0" will be alternatively displayed until the infrared light emitting time duration of the two-second timer register T0 exceeds 2 seconds. When it is determined that the infrared light emitting time duration of the two-second timer register T0 exceeds 2 seconds, it is determined at step F22 that the number-of-receiving-time register G has not been set to any of "0", "1" and "2" at step F11, and the ROM address register M is set to "5" at step F24 (steps F5, F6, F19, F22, F24).

Then, a value "0" is set to the light emitting flag register F1, the transferring unit 34 stops emitting infrared light, and an image display process corresponding to the updated ROM address "M=5" will be performed (steps F7, FD).

More specifically, in the image display process of FIG. 22, the CPU 31 reads out from the ROM 33 image data (1), (2) (FIG. 15) corresponding to the updated ROM address "M=5" alternatively, in accordance with time counting data of the display timer register T2 and object designating data of the object designating register H, and displays the read out image data (1), (2) of a dog on the LCD unit 38. In other words, image data (1), (2) of a dog showing pleasure are alternatively displayed on the LCD unit 38 each for 2 seconds in place of the image data (1), (2) of ROM address "M=0" previously displayed thereon. At this time, the CPU 31 reads out effect sound data corresponding to the ROM address "M=5" from the ROM 33 to generate a sound, and outputs a generated sound of "FAWNING BARKING" through the amplifier circuit 39 and the speaker 40 while the image data (2) of the dog showing pleasure is being displayed (steps F1, F2, FD, steps G1 to G10 of FIG. 22)

As described above, when the user moves his hand so as to make itself pass by the light emitting element 34b and the light receiving element 35b three times, thereby giving good words to the dog displayed on the LCD unit 28 to sit down, image data of the dog showing pleasure is selected and displayed with the sound of "FAWNING BARKING" outputted through the speaker 40.

The user can order the dog in front of the doghouse, displayed on the LCD unit 38, to give him hand or to give him another hand, by performing non-contacting operation temporarily in front of the light emitting element 34b and the light receiving element 35. When the reflected infrared light receiving time duration representative of a time duration of the non-contacting operation by the user falls within a range of not less than 0.3 seconds to less than one second, it is determined at steps F16, F17 "YES", and ROM address register M is set to "2" at step F25 because the number-of-receiving-time register G has been set to "G=1" at step F11 and the receiving timer register T1 has been set to "T1=0.3 to 1.0" at step F13 (steps F17 to F25).

Then, a value "0" is set to the light emitting flag register F1, the transferring unit 34 stops emitting infrared light, and an image display process corresponding to the updated ROM address "M=2" will be performed (steps F7, FD).

More specifically, in the image display process of FIG. 22, the CPU 31 reads out from the ROM 33 image data (1), (2) (FIG. 15) corresponding to the updated ROM address "M=2" alternatively, in accordance with time counting data of the display timer register T2 and object designating data of the object designating register H, and displays the read out image data (1), (2) of a dog on the LCD unit 38. In other words, image data (1), (2) of a dog giving its hand to the user are alternatively displayed on the LCD unit 38 each for 2 seconds in place of the image data (1), (2) of ROM address "M=0" previously displayed thereon. At this time, the CPU 31 reads out effect sound data corresponding to the ROM address "M=2" from the ROM 33 to generate a sound, and outputs a generated sound of "BOWWOW BOWWOW" through the amplifier circuit 39 and the speaker 40 while the image data (2) of the dog giving its hand to the user is being displayed (steps F1, F2, FD, steps G1 to G10 of FIG. 22)

As described above, when the user performs the non-contacting operation temporarily in front of the light emitting element 34b and the light receiving element 35b, thereby ordering the dog in front of the dog house, displayed on the LCD unit 28, to give its hand to the user or to give another hand to the user, image data of the dog giving its hand to the user or giving another hand is selected and displayed with the sound of "BOWWOW BOWWOW" outputted through the speaker 40.

The user can order the dog in front of the doghouse, displayed on the LCD unit 38, to wait or to lie down, by performing non-contacting operation continuously. When the reflected infrared light receiving time duration representative of a time duration of the non-contacting operation by the user is not less than one second, it is determined "YES" at step F16, "NO" at step F17 and "YES" at step 18, and ROM address register M is set to "3" at step F26, because the number-of-receiving-time register G has been set to "G=1" at step F11 and the receiving timer register T1 has been set to "T1>1" at step F13 (steps F18 to F26).

Then, a value "0" is set to the light emitting flag register F1, the transferring unit 34 stops emitting infrared light, and an image display process corresponding to the updated ROM address "M=3" will be performed (steps F7, FD).

More specifically, in the image display process of FIG. 22, the CPU 31 reads out from the ROM 33 image data (1), (2) (FIG. 15) corresponding to the updated ROM address "M=3" alternatively, in accordance with time counting data of the display timer register T2 and object designating data of the object designating register H, and displays the read out image data (1), (2) of a dog on the LCD unit 38. In other words, image data (1), (2) of a dog waiting or lying down are alternatively displayed on the LCD unit 38 each for 2 seconds in place of the image data (1), (2) of ROM address "M=0" previously displayed thereon. At this time, the CPU 31 reads out effect sound data corresponding to the ROM address "M=3" from the ROM 33 to generate a sound, and outputs a generated sound of "KUH" (a groan of a dog) through the amplifier circuit 39 and the speaker 40 while the image data (2) of the dog lying down is being displayed (steps F1, F2, FD, steps G1 to G10 of FIG. 22)

As described above, when the user performs the non-contacting operation continuously in front of the light emitting element 34b and the light receiving element 35b, thereby ordering the dog in front of the dog house, displayed on the LCD unit 28, to wait or to lie down, image data of the dog waiting or lying down is selected and displayed with the sound of "KUH" outputted through the speaker 40.

When the end key 32d of the key input unit 32 is operated while the light emitting flag register F1 is set to "1" and infrared light is being emitted, a value "0" is set to the light emitting flag register F1 and thereby the transferring unit 35 stops emitting infrared light. Then, the ROM address register M is initialized to a value "0", and image data corresponding to ROM address "M=0" is displayed again, as shown in FIG. 24 (steps E4 to E7, F1, F2, FD).

As described above, in the electronic notebook with the above mentioned structure, when the user moves his hand in front of the light emitting element 34b and the light receiving element 35b installed on the body of the electronic notebook, infrared light emitted from the light emitting element 34b is reflected on the user's hand and the reflected infrared light is received by the light receiving element 35b. Then, ROM address of ROM address register M is determined depending upon a reflected infrared receiving time duration of the light the receiving timer register T1 and data of the number-of-receiving-time register G. The CPU 31 selectively reads out from the ROM 33 image data of a dog corresponding to the ROM address determined as described above together with pertinent effect sound data. In the present embodiment, the image data represent a dog in various movements such as a dog sitting in front of the doghouse, a dog showing pleasure, a disheartened dog, a dog giving its hand and so on. The read out image data is displayed on the LCD unit 38 and the pertinent effect sound data is audibly output from the speaker 40. The user can make his desired image of a dog on the display unit 38 by moving his hand as if he actually orders the dog without performing mechanical operations, which are required in conventional display apparatus. For example, the user can selectively display an image of a disheartened dog and/or a sitting dog on the display unit 38, as desired, in which the user will find numerous entertainments.

In the present embodiment of the electronic notebook, reflection of infrared light emitted from the body of the electronic notebook is detected to judge whether the user has performed non-contacting operation. For example, however, interruption of external light with user's hand, reflection on user's hand of a sound wave generated from the notebook body, interruption with user's hand of an externally supplied sound wave, changes in magnetic force caused by a magnet held in the user's hand may be used to determine what the user has intended or ordered. As described above, image data to be displayed on the display unit may be switched as desired by the user by executing non-contacting operation.

Further, changes in waveforms of the infrared light, a sound wave and/or magnetic force may be also used to switch images displayed on the display unit.

Further in the present embodiment, the images displayed on the display unit are switched in accordance with either a time duration of non-contacting operation or the frequency of performed non-contacting operations. The images displayed on the display unit, however, may be switched in accordance with a combination of time durations of non-contacting operation and the frequency of performed operations.

Furthermore in the present embodiment, the images displayed on the display unit are switched in accordance with non-contacting operation, but another controlling operations such as switching of mechanical operations may be performed in accordance with the non-contacting operation.

Fourth Embodiment

Now, a fourth embodiment of the present invention will be described with reference to the drawings.

Figure 27:
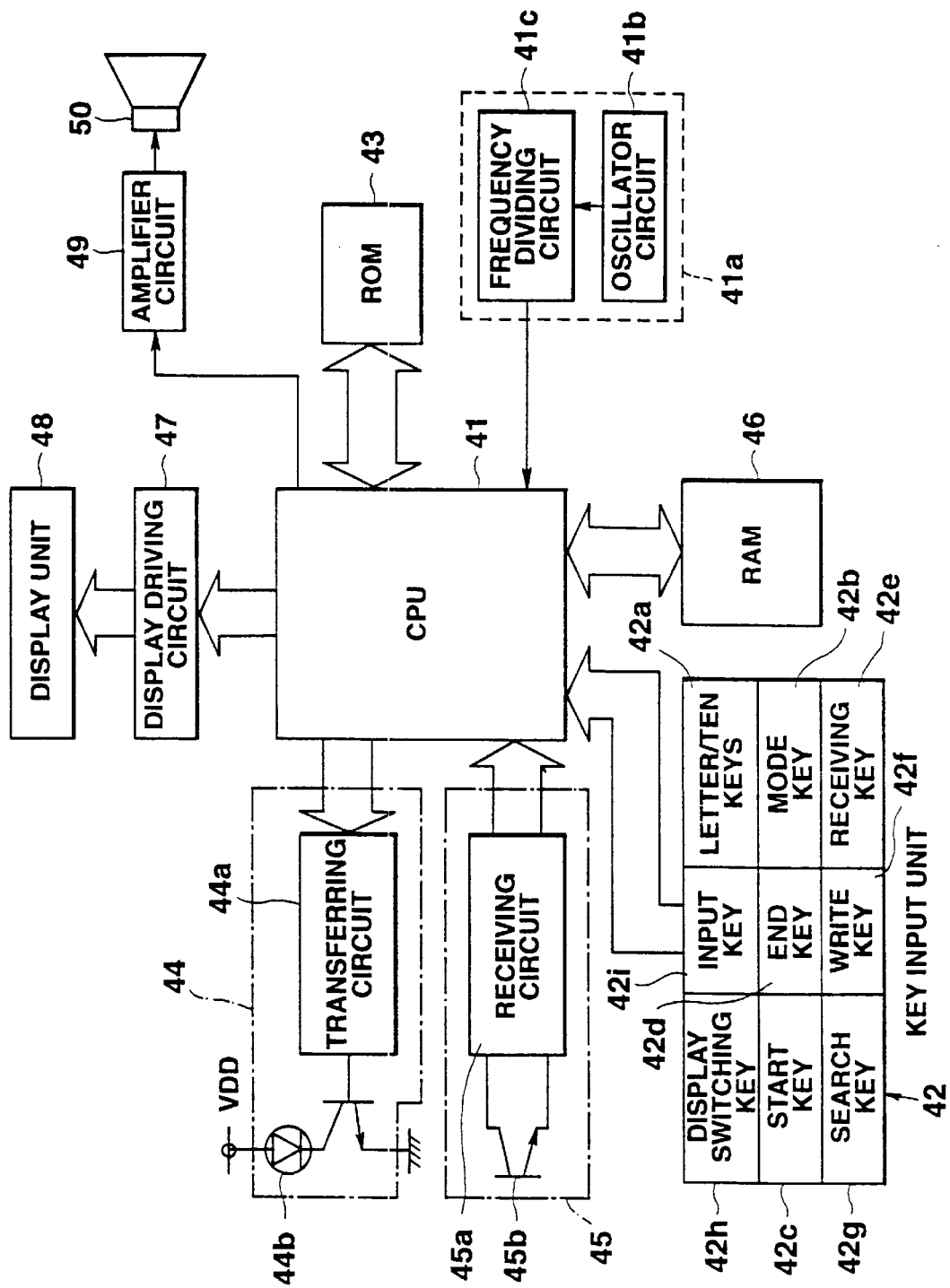
FIG. 27 is a circuit diagram of a fourth electronic notebook incorporating a fourth embodiment of the image displaying apparatus according to the present invention.

FIG. 27 is a circuit diagram of the third electronic notebook incorporating a switching device according to the present invention.

The fourth electronic notebook is provided with a central processing unit (CPU) 41.

The CPU 41 is driven by a key input signal supplied from a key input unit 42 to control operations of peripheral circuits in accordance with a system program stored in ROM 43. The CPU 41 is connected with the key input unit 42, the ROM 43, a transferring unit 44, a receiving unit 45 and RAM 46.

Further, the CPU 41 is connected with a timer 41a including an oscillator circuit 41b and a frequency dividing circuit 41c, a display driving circuit 47, a liquid crystal display unit (LCD unit or display unit) 48 through the display driving circuit 47, an amplifier circuit 49 and a speaker 50 through the amplifier circuit 49.

The key input unit 42 is installed with letter/ten keys 42a, a mode key 42b, a start key 42c, an end key 42d, a receiving key 42e, a write key 42f, a search key 42g, a display switching key 42h and an enter key 42i. The letter/ten keys 42a are used to input "names" and "phone numbers" to be registered as notebook data. The mode key 42b is operated to set a notebook mode and an image display mode. The start key 42c is operated to start transferring notebook data to other electronic appliance in the notebook mode and is operated to send an infrared light in the image display mode and in the password mode. The end key 42d is operated to stop receiving notebook data from other electronic appliance in the notebook mode and is operated to stop sending the infrared light in the image display mode. The receiving key 42e is operated to receive notebook data sent from other electronic appliance in the notebook mode. The write key 42f is used to register in the RAM 46 notebook data input by operation of the letter/ten keys 42a and notebook data sent from other electronic appliance. The search key 42g is operated to search and display data through notebook data registered in the RAM 46. The display switching key 42h is operated to selectively switch image data of the ROM 43 to be displayed on the LCD unit 48 in the image display mode. The enter key 42i is operated to switch a normal mode and a display instruction setting mode in the image display mode, and to set a user's pass word in the password mode.

In the ROM 43 are previously stored the system program for the CPU 41 to perform a control operation, a plurality of image data, and effect-sound data corresponding respectively to the image data.

FIG. 28 is a view showing image data of an object and effect-sound data previously stored in the ROM 43 of the third electronic notebook.

Four combination data ((1), (2)), each including two image data of a dog in a bit map format, and four corresponding effect-sound data (PCM data) are stored at corresponding addresses "M=1 to 3" in the ROM 43, respectively.

The transferring unit 44 is provided with a transferring circuit 44a and a light emitting element 44b, which emits the infrared light in response to a transfer data sent from the CPU 41. When the start key 42c is operated in the notebook mode, the infrared light emitted by the light emitting element 44b is modulated by means of the transferring circuit 44a in accordance with the notebook data input and displayed on the display unit 48 by operation of the letter/ten keys 42a and/or notebook data searched and displayed by operation of the search key 42g, and the modulated infrared light is transferred as infrared light data from the transferring unit 44.

In the image display mode, or in the password mode immediately after the power is turned on, an infrared light of a predetermined frequency is transferred through the transferring circuit 44a and the light emitting element 44b in response to an instruction of the CPU 41.

The receiving unit 45 is provided with a receiving circuit 45a and a light receiving element 45b for receiving an infrared light data externally supplied thereto. When the receiving key 42e is operated in the notebook mode, notebook data sent from an external electronic appliance is received and demodulated by the receiving circuit 45a and the light receiving element 45b. The demodulated data is displayed on the liquid crystal display means 48.

In the image display mode or in the password mode, an externally transmitted infrared light or reflected infrared light of the transferring unit 44 is received by the light receiving element 45b, and the received infrared light is transmitted to the CPU 41 through the receiving circuit 45a.

Figure 29:
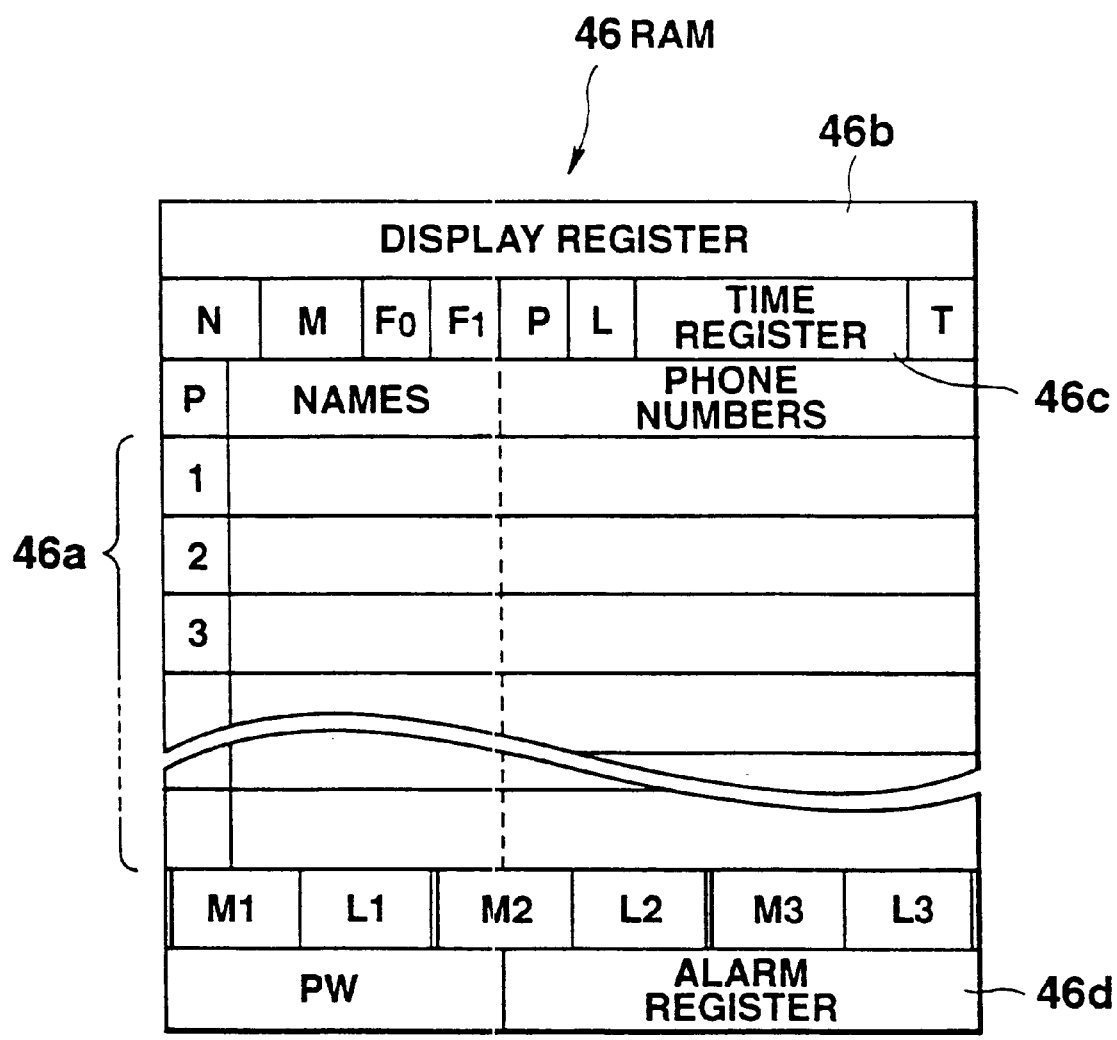
FIG. 29 is a view showing registers in RAM of the fourth electronic notebook.

FIG. 29 is a view showing registers in the RAM 46 of the fourth electronic notebook.

The RAM 46 comprises a notebook data register 46a, a display register 46b, a mode flag register N, a ROM-address register M, a receiving flag register F0, a light emitting flag register F1, a number-of-receiving-time register L, an image-display mode flag register T, a time register 46c, display-instruction setting registers M1–M3, a password register PW and an alarm register 46d. The notebook data register 46a stores personal data (notebook data) for the predetermined number of persons including names and phone numbers at areas designated by a pointer P. Display data to be displayed on the LCD unit 48 is written as image data in the display register 46b. The mode flag register N is set to a value "0" in the notebook mode, and to a value "1" in the image display mode. The ROM address register M indicates addresses in the ROM 43 where the image data of an object and the effect-sound data are stored. The receiving flag register F0 is set to a value "1" while notebook data is received in the notebook mode. The light emitting flag register F1 is set to a value "1" while the infrared light is emitted in the image display mode and in the password mode. The number-of-receiving-time register L indicates the number of receiving times of reflected infrared light, i.e., indicates how many times the receiving unit 45 has received reflected infrared light in the image display mode and/or in the password mode. The image-display mode flag register T .is set to a value "0" in a normal mode of the image display mode and to a value "1" in a display-instruction mode of the display mode. In the time register 46c is registered time counting data from the timer 41a, which is repeatedly cleared and set to the register 46c in response to start/stop of the timer 41a. In the display-instruction setting registers M1–M3 are set display-instruction data L1–L3, respectively, which correspond to three image data of a dog represented by three ROM addresses "M=1–3" of the ROM 43. The password register PW is set with passwords of users. The alarm register 46d stores PCM data of an alarm sound (bark of a dog) generated when a wrong password is inputted in the password mode set immediately after the power is turned on.

On the LCD unit 48, any one of notebook data input by operation of the letter/ten keys 42a, notebook data searched through the notebook data register 46a of the RAM 46 in response to operation of the search key 42g and notebook data received through the receiving unit 45 in response to operation of the receiving key 42e is displayed in the notebook mode.

In the image display mode and the password mode, image data (1), (2), which are included in at least one combination data read out from the ROM 43 in accordance with a ROM address indicated by the ROM address register M of the RAM 46, are alternatively displayed on the LCD unit 48 each for one second.

Further, an effect sound is output through the speaker 50 in the image display mode, based on effect-sound data which are read out from the ROM 43 in accordance with a ROM address indicated by the ROM address register M, and the alarm sound of the alarm sound register 46d of the RAM 46 is output through the speaker 50 when a wrong password is input.

The time 41a installed in the CPU 41 starts a time counting operation in the image display mode at the same time when the receiving unit 45 receives reflected infrared light after the transferring unit 44 emits infrared light in response to operation of the start key 42c, and starts the time counting operation in the password mode at the same time when the transferring unit 44 emits infrared light in response to operation of the start key 42c. The time counting data of the timer 41a is written in the time register 46c of the RAM 46.

Now, operation of the forth electronic notebook with the above mentioned structure will be described.

In the case that a value "0" has been set to the mode flag register N of the RAM 46 when the mode key 42b of the key input unit 42 is operated, i.e., in the case that the CPU 41 has been set to the notebook mode, the mode flag register N is set to a value "1" and the CPU 41 is switched to the image display mode.

When a value "0" has been set to the mode flag register N of the RAM 46, the CPU 41 performs a notebook mode process. The notebook mode process is the same as that performed in the third embodiment, and the further description thereof will be omitted.

Figure 30:
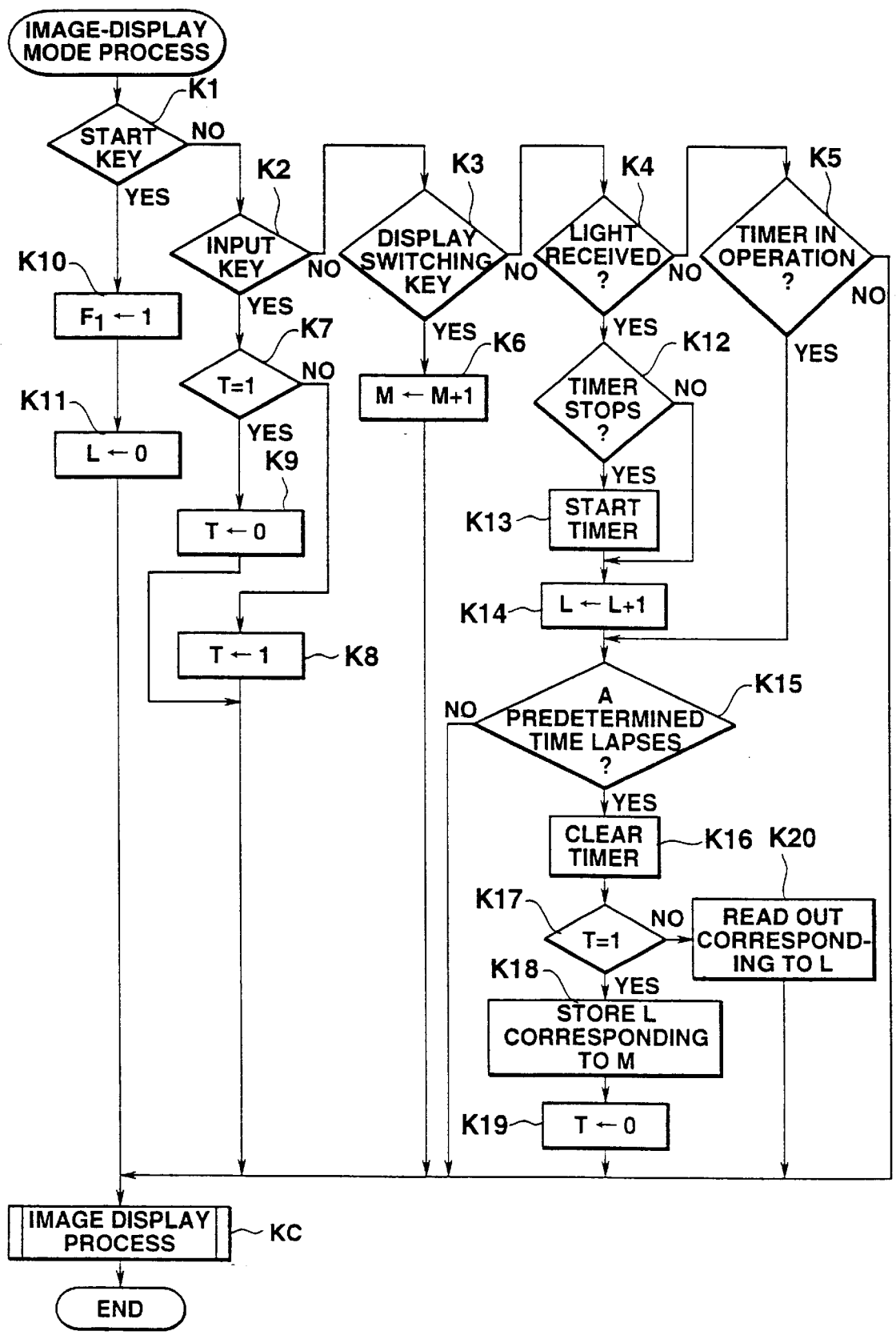
FIG. 30 is a flowchart of an image-display mode process of the fourth electronic notebook.

When a value "1" is set to the mode flag register N in response to operation of the mode key 42b of the key input unit 42, and the ROM address register M is initialized to "0", an image-display mode process is performed in accordance with the flowchart of FIG. 30.

Since the ROM address register M has been to "M=0" at the initiation of the image-display mode process, an image display process starts at step KC when the start key 42c of the input unit 42 is operated (steps K1, K2, K3, K4, K5, KC of FIG. 30).

Figure 31:
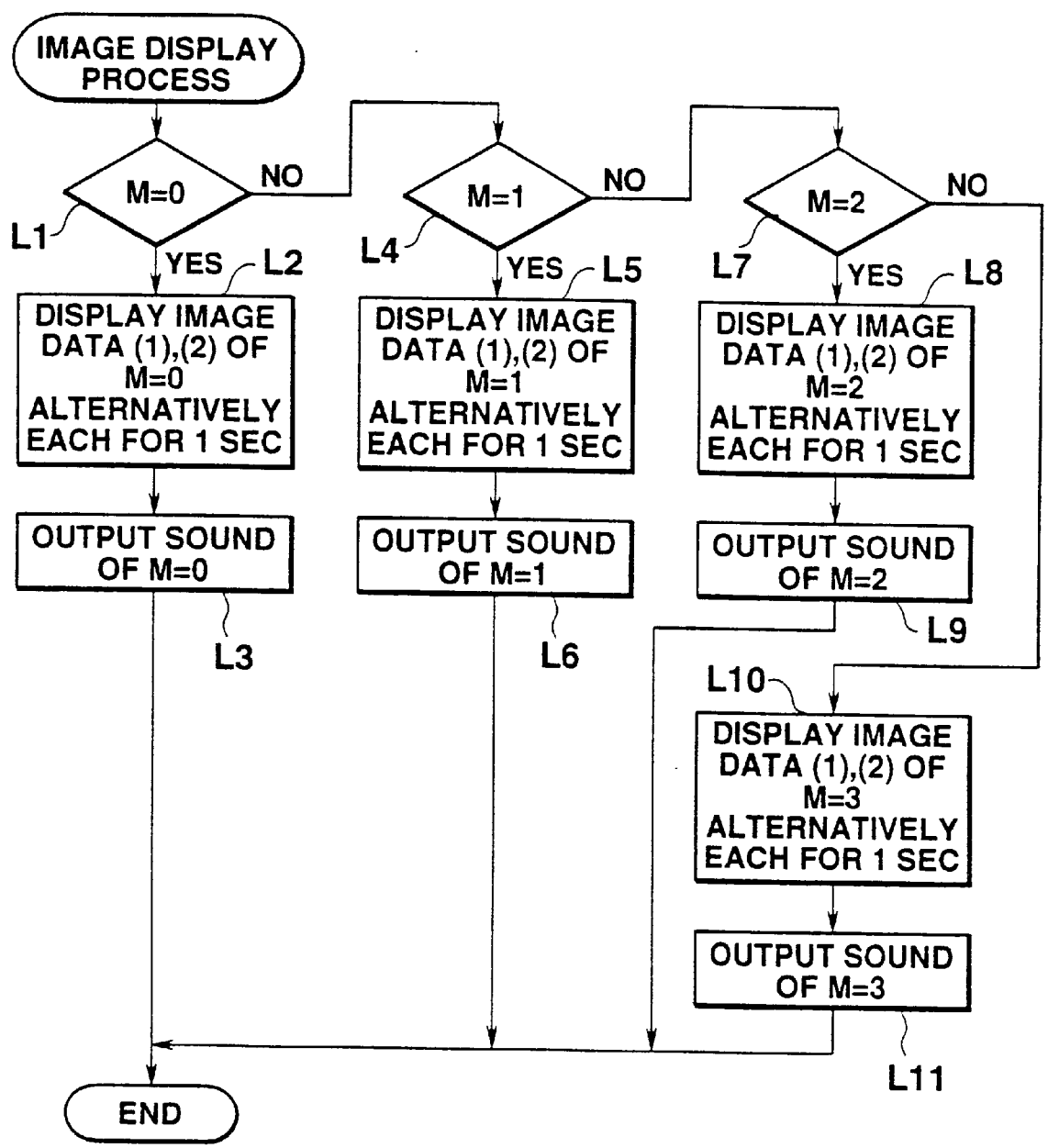
FIG. 31 is a flowchart of an image-display process in the image-display mode process of the fourth electronic notebook.

More specifically, in the image display process of FIG. 31, the CPU 41 alternatively reads out from the ROM 43 image data (1), (2) (FIG. 28) corresponding to the ROM address "M=0" previously set to the ROM address register M, and displays the read out image data (1) of and (2) of a dog on the LCD unit 48. In other words, image data (1) of a doghouse and (2) of a dog sitting in front of the doghouse are alternatively displayed on the LCD unit 48 each for one second in place of the image data (1), (2) (steps L1, L2 of FIG. 31).

At this time, the CPU 41 reads out from the ROM 33 effect sound data corresponding to the ROM address "M=0" set to the ROM address register M. Since effect sound data corresponding to the ROM address "M=0" is for making no sound, image data (1), (2) are displayed as described above with no sound (step L3).

Meanwhile, when the user operates the display switching key 42h of the key input unit 42 to set a display instruction with respect to image data of a lying dog corresponding to the ROM address "M=3" of the ROM 43, the ROM address register M on the ROM address M is incremented by "+1" every operation of the displaying switching key 42h and image data of a dog corresponding to the ROM address "M=1 to 3" are repeatedly displayed (steps K3, K6, KC of FIG. 30).

More specifically, when a value "1" is set to the ROM address register M in response to the first operation of the display switching key 42h by the user, the CPU 41 alternatively reads out from the ROM 43 image data (1), (2) (FIG. 28) corresponding to the ROM address "M=1", and displays the read out image data (1), (2) on the LCD unit 48. That is, image data (1), (2) of a disheartened dog are alternatively displayed on the LCD unit 48 each for one second (steps K3, K6, KC of FIG. 30, steps L4, L5 of FIG. 31).

At this time, the CPU 41 reads out effect sound data corresponding to the ROM address "M=1" of the ROM 43, and outputs a sound of "UUH" (a groan of a dog showing disheartenment) from the speaker 50 through the amplifier circuit 49 (step L6).

When a value "2" is set to the ROM address register M in response to the second operation of the display switching key 42h by the user, the CPU 41 alternatively reads out from the ROM 43 image data (1), (2) (FIG. 28) corresponding to the ROM address "M=2", and displays the read out image data (1), (2) on the LCD unit 48. That is, image data (1), (2) of a dog giving hand are alternatively displayed on the LCD unit 48 each for one second (steps K3, K6, KC of FIG. 30, steps L7, L8 of FIG. 31).

At this time, the CPU 41 reads out effect sound data corresponding to the ROM address "M=2" of the ROM 43, and outputs a sound of "BOWWOW" (a groaning of a dog) from the speaker 50 through the amplifier circuit 49 (step L9).

When a value "3" is set to the ROM address register M in response to the third operation of the display switching key 42h by the user as shown in FIG. 33, the CPU 41 alternatively reads out from the ROM 43 image data (1), (2) (FIG. 28) corresponding to the ROM address "M=3", and displays the read out image data (1), (2) on the LCD unit 48. That is, image data (1), (2) of a lying dog are alternatively displayed on the LCD unit 48 each for one second (steps K3, K6, KC of FIG. 30, steps L7, L10 of FIG. 31).

At this time, the CPU 41 reads out effect sound data corresponding to the ROM address "M=3" of the ROM 43, and outputs a sound of "KUH" (a groan of a dog) from the speaker 50 through the amplifier circuit 49 (step L11).

As described above, when the user operates the input unit 42i to set a display instruction with respect to image data corresponding to the ROM address "M=3" while the image data of a lying dog corresponding to the ROM address "M=3" of the ROM 43 is displayed on the LCD unit 48, the image-display mode flag register T is set to "0" in the normal mode, in which the flag register T has been set to "1", and the operation mode is switched to the display instruction mode (steps K2, K7, K8).

In the display-instruction setting mode in which the image-display mode flag register T has been set to "1", the image-display mode flag register T is set to "0" in the normal mode, the operation mode is switched to the normal mode (steps K7, K9).

When the user operates the start key 42c with the image data of a lying dog corresponding to the ROM address "M=3" of the ROM 43 being displayed on the LCD unit 48 as shown in FIG. 33 and with the display-instruction setting mode flag register T being set to "T=1", the light emitting flag register F1 is set to "1". Then, the light emitting element 44b of the transferring unit 44 emits infrared light and the image-display mode flag register T is set to "0" and the number-of-receiving-time register L is reset to "0" (steps K1, K10, K11).

The display instruction with respect to image data corresponding to the ROM address "M=3" of the ROM 43 (the image data of a lying dog corresponding to the ROM address "M=3") displayed on the LCD unit 48 is set as follows: When the light receiving element 45b of the receiving unit 45 receives infrared light reflected on the user's hand in response to the first non-contacting operation at the time when the user waves his hand twice, the timer 41a starts time counting operation and the time counting data is written in the time register 46c, a time counting operation start counts a predetermined time duration (for example, two seconds), and the number-of-receiving-time register L is incremented by "+1" thereby being set to "1" (steps K4, K12, K13, K14).

When the light receiving element 45b of the receiving unit 45 receives infrared light reflected on the user's hand in response to the second non-contacting operation in the similar manner described above, the number-of-receiving-time register L is further incremented by "+1", thereby being set to "2" (steps K4, K12, K14).

During the time counting operation of the time register 46c before the time counting data to be written in the time register 46c exceeds a predetermined time duration, image data of a lying dog corresponding to the ROM address "M=3" are repeatedly displayed and pertinent effect sound data are audibly output (steps K5, K15, KC, L7, L10, L11).

When the time counting data to be written in the time register 46c exceeds the predetermined time duration, the timer 41a stops time counting operation and the time register 46c is cleared (steps K15, K16).

Since the image-display mode flag register T is set to "1", which sets the display instruction setting mode with respect to the image data of a dog corresponding to the ROM address "M=3", the number of receiving times of the reflected infrared light "2" is set and stored in the number-of-receiving-time register L (steps K17, K18).

Then, the image-display mode flag register T is reset to "0", and thereby the operation mode is switched to the normal mode. (step K19).

Thereafter, similar display-instruction setting processes are performed with respect to the image data of a disheartened dog corresponding to the ROM address "M=1" and the image data of a dog giving hand corresponding to the ROM address "M=2". The frequencies of receipts of the reflected infrared light in response to the non-contacting operations performed respectively in the display-instruction setting processes are set and stored as display-instruction data L1, L2 to the display-instruction setting registers M1, M2 (steps K3, K6, K2, K7, K8, K4, K12 to K19).

Now, we assume that, for example, the frequency ("1") of receipts of the reflected infrared light in response to the non-contacting operation is set as display instruction data L1 to the display instruction setting register M1, and the frequency ("3") of receipts of the reflected infrared light in response to the non-contacting operation is set as display instruction data L2 to the display instruction setting register M2.

When the start key 42c is operated to display a desired image of a dog in accordance with an instruction of non-contacting operation after the display instruction data L1–L3 have been set to the display instruction setting registers M1–M3 respectively and a value "0" has been set to the image-display mode flag register T, thereby the operation mode has been switched to the normal mode, then a value "1" is set to the light emitting flag register F1 and the light emitting element 44b of the transferring unit 44 emits infrared light and, further, the number-of-receiving-time register L is reset to "0" (steps K1, K10, K11).

Figure 34:
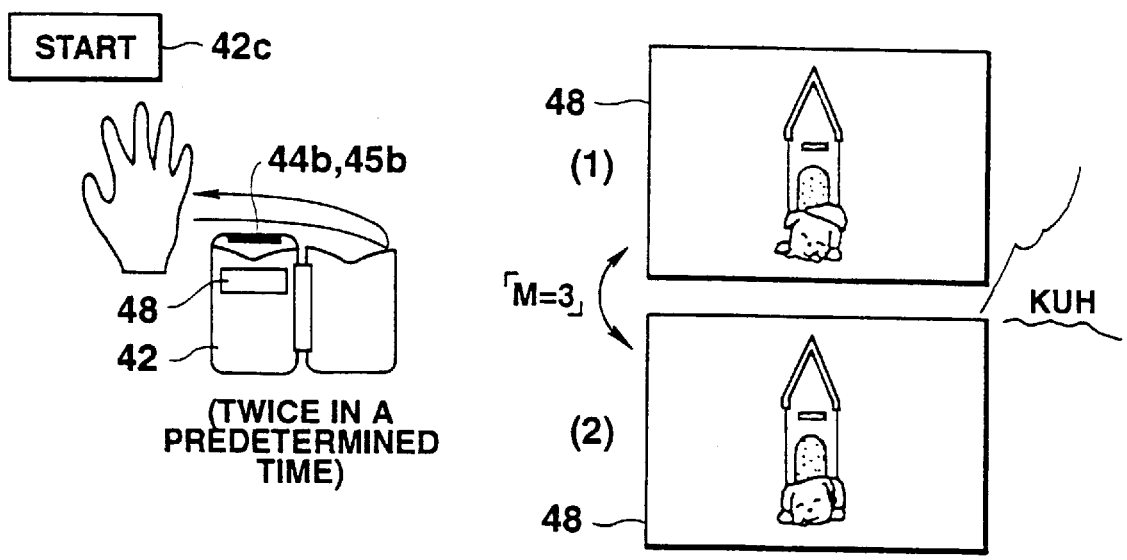
FIG. 34 is a view illustrating motions of the character (dog) shown in response to an order given by non-contact operation of the user in the image-display mode process.

When the user performs the non-contacting operations twice (waves his hand twice), as shown in FIG. 34, to display the image data of a lying dog stored in the ROM 43 and the light receiving element 45b of the receiving unit 45 receives reflected infrared light in response to the first non-contacting operation, the timer 41a starts the time counting operation and time counting data is written in the time register 46c. Then, the time counting process starts to count a predetermined time duration (for example, 2 seconds) and the number-of-receiving-time register L is set to "1" (steps K4, K12, K13, K14).

When the light receiving element 45b of the receiving unit 45 receives reflected infrared light in response to the second non-contacting operation, the number-of-receiving-time register L is incremented to "2" (steps K4, K12, K14).

During the time counting operation of the time register 46c before the time data in the time register 46c exceeds the predetermine time duration, the image data of a dog coming out of the doghouse corresponding to the ROM address "M=0" are repeatedly displayed and pertinent effect sound data are audibly output as shown in FIG. 32 (steps K5, K15, KC, L1, L2, L3).

When the time counting data to be written in the time register 46c exceeds the predetermined time duration, the timer 41a stops time counting operation and the time register 46c is cleared (steps K15, K16).

Since the image-display mode flag register T is set to "0", which sets the normal display mode, the display instruction setting register M3 is searched, in which the frequency "2" of receipts of the reflected infrared light in response to the non-contacting operation by the user set in the number-of-receiving-time register L is set as the display instruction data L3, and the ROM address is set to "M=3" (steps K17, K20).

Then, the CPU 41 reads out from the ROM 43 image data (1), (2) (FIG. 28) corresponding to the ROM address "M=3", and displays the read out image data (1), (2) on the LCD unit 48. That is, image data (1), (2) of a lying dog are alternatively displayed on the LCD unit 48 each for one second (steps K20, KC of FIG. 30, steps L7, L10 of FIG. 31).

At this time, the CPU 41 reads out effect sound data corresponding to the ROM address "M=3" of the ROM 43, and outputs a sound of "KUH" (a groan of a dog) from the speaker 50 through the amplifier circuit 49 (step L11).

With the light emitting flag register F1 set to "1" by operation of the start key 42c and infrared light being emitted from the light emitting element 44d of the transferring unit 44 and further with the light receiving register L reset to "0", when the user waves his hand once to display image data of a disheartened dog stored in the ROM 43, the light receiving element 45b of the receiving unit 45 receives infrared light reflected on the user's hand. Then, the timer 41a starts the time counting operation and time counting data is written in the time register 46c, whereby the time counting process starts counting a predetermined time duration (for example, 2 seconds) (steps K4, K12, K13).

And the number-of-receiving-time register L is incremented by (+1) and is set to "1" (step K14).

During the time counting operation of the time register 46c before the time counting data to be written in the time register 46c exceeds a predetermined time duration, image data of a dog coming out from the doghouse corresponding to the ROM address "M=0" are repeatedly displayed and pertinent effect sound data are audibly output (steps K5, K15, KC, L1, L2, L3).

When the time counting data to be written in the time register 46c exceeds the predetermined time duration, the timer 41a stops time counting operation and the time register 46c is cleared (steps K15, K16).

Since the image-display mode flag register T is set to "0", which sets the normal display mode, the display instruction setting register M1 is searched, in which the frequency "1" of receipts of the reflected infrared light in response to the non-contacting operation by the user set in the number-of-receiving-time register L is set as the display instruction data L1, and the ROM address is set to "M=1" (steps K17, K20).

Then, the CPU 41 reads out from the ROM 43 image data (1), (2) (FIG. 28) corresponding to the ROM address "M=1", and displays the read out image data (1), (2) on the LCD unit 48. That is, image data (1), (2) of a disheartened dog are alternatively displayed on the LCD unit 48 each for one second (steps K20, KC of FIG. 30, steps L4, L5 of FIG. 31).

At this time, the CPU 41 reads out effect sound data corresponding to the ROM address "M=1" of the ROM 43, and outputs a sound of "UUH" (a groaning of a dog showing disheartenment) from the speaker 50 through the amplifier circuit 49 (step L11).

With the light emitting flag register F1 set to "1" by operation of the start key 42c and infrared light being emitted from the light emitting element 44d of the transferring unit 44 and further with the light receiving register L reset to "0" (steps K1, K10, K11), when the user waves his hand three times, i.e., performs non-contacting operations three times, to display image data of a dog giving hand stored in the ROM 43, the light receiving element 45b of the receiving unit 45 receives infrared light reflected on the user's hand in response to the user's first non-contacting operation. Then, the timer 41a starts the time counting operation and time counting data is written in the time register 46c, whereby the time counting process starts counting a predetermined time duration (for example, 2 seconds) and the number-of-receiving-time register L is incremented by (+1) and is set to "1" (steps K4, K12, K13, K14).

When the light receiving element 45b of the receiving unit 45 receives infrared light reflected on the user's hand in response to the user's second non-contacting operation, the number-of-receiving-time register L is incremented by (+1) and is set to "2" (steps K4, K12, K14).

When the light receiving element 45b of the receiving unit 45 receives infrared light reflected on the user's hand in response to the user's third non-contacting operation, the number-of-receiving-time register L is incremented by (+1) and is set to "3" (steps K4, K12, K14).

During the time counting operation of the time register 46c before the time counting data to be written in the time register 46c exceeds a predetermined time duration, image data of a dog coming out from the doghouse corresponding to the ROM address "M=0" are repeatedly displayed and pertinent effect sound data are audibly output (steps K5, K15, KC, L1, L2, L3).

When the time counting data to be written in the time register 46c exceeds the predetermined time duration, the timer 41a stops time counting operation and the time register 46c is cleared (steps K15, K16).

Since the image-display mode flag register T is set to "0", which sets the normal display mode, the display instruction setting register M2 is searched, in which the frequency "3" of receipts of the reflected infrared light in response to the non-contacting operation by the user set in the number-of-receiving-time register L is set as the display instruction data L2, and the ROM address is set to "M=2" (steps K17, K20).

Then, the CPU 41 reads out from the ROM 43 image data (1), (2) (FIG. 28) corresponding to the ROM address "M=2", and displays the read out image data (1), (2) on the LCD unit 48. That is, image data (1), (2) of a dog giving hand are alternatively displayed on the LCD unit 48 each for one second (steps K20, KC of FIG. 30, steps L7, L8 of FIG. 31).

At this time, the CPU 41 reads out effect sound data corresponding to the ROM address "M=2" of the ROM 43, and outputs a sound of "BOWWOW" (a groaning of a dog) from the speaker 50 through the amplifier circuit 49 (step L11).

As described above, the user can display his desired image data of a dog on the LCD unit 48 by waving his hand in predetermined manners.

Figure 35:
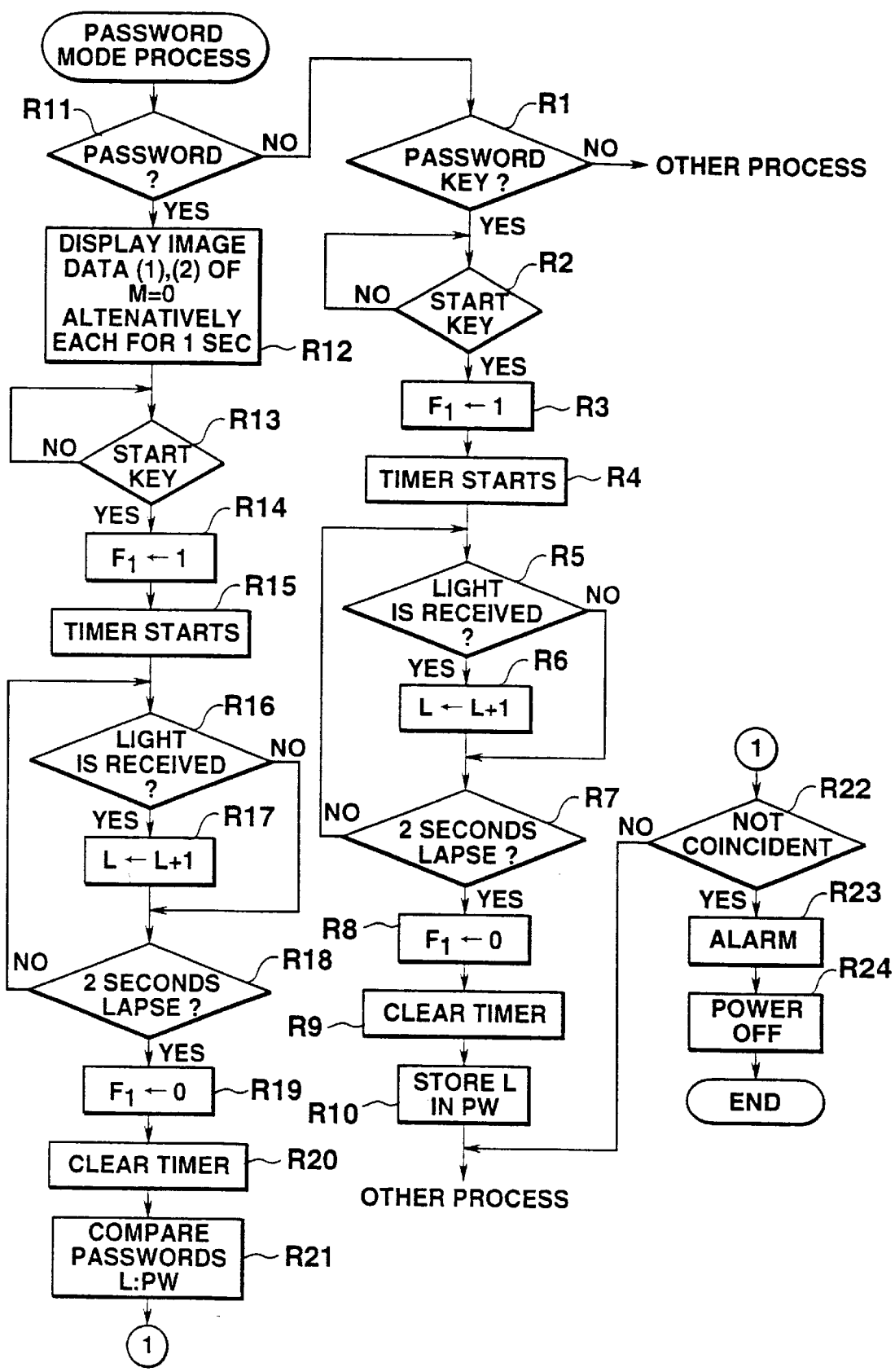

FIG. 35 is a flowchart of a password mode process to be performed immediately after the power is turned on.

When the input key 42i and the start key 42c are operated to set a password, a value "1" is set to the light emitting flag register F1 and the light emitting element 44b of the transferring unit 44 emits infrared light. At the same time, the timer 41a starts time counting operation, time counting data is written in the time register 46c, and time counting process is performed to count a predetermined time duration (2 seconds) (steps R1, R2, R3, R4 of FIG. 35).

When the user executes non-contacting operations twice in front of the light emitting element 44b and the light receiving element 45b in token of a password, the light receiving element 45b receives reflected infrared light twice in response to the con-contacting operations and a value "2" is set to the number-of-receiving-time register L (steps R5, R6).

When the time counting data written in the time register 46c exceeds 2 seconds, a value "0" is set to the light emitting flag register F1 and the light emitting element 44b stops emitting infrared light. Then, the timer 41a stops time counting operation and the time register 46c is cleared (steps R7, R8, R9).

As described above, the frequency "2" of light receipts registered in the number-of-receiving-time register L is set and memorized as a password in the password register PW (steps R10).

When the power of the electronic notebook in which the password "2" is registered in the password register PW is turned on, it is indicated that a password has been registered, and a value "0" is set to the ROM address register M. And, then, image data (1), (2) of a dog coming out from the doghouse corresponding to the ROM address "M=0" are read out from the ROM 43 and are alternatively displayed on the LCD unit 48 each for one second, as shown in FIG. 32 (steps R11, R12).

When the start key 42c is operated to enter a password, a value "1" is set to the light emitting flag register F1 and the light emitting element 44b of the transferring unit 44 emits infrared light. And at the same time, the timer 41a starts time counting operation, time counting data is written in the time register 46c, and time counting process is performed to count a predetermined time duration (2 seconds) (steps R13, R14, R15).

When the user executes non-contacting operations twice in front of the light emitting element 44b and the light receiving element 45b to enter the password, the light receiving element 45b receives reflected infrared light twice in response to the con-contacting operations and a value "2" is set to the number-of-receiving-time register L (steps R16, R17).

When the time counting data written in the time register 46c exceeds 2 seconds, a value "0" is set to the light emitting flag register F1 and the light emitting element 44b stops emitting infrared light. Then, the timer 41a stops time counting operation and the time register 46c is cleared (steps R18, R19, R20).

Then, it is judged whether the frequency "2" of light receipts corresponding to the non-contacting operations by the user and registered in the number-of-receiving-time register L coincides with the password "2" previously registered in the password register PW. When it is determined that the value registered in the number-of-receiving-time register L coincides with the password registered in the password register PW, other processes such as the notebook mode process and the image display mode process will be performed depending on the key input operations (steps R21, R22, other process).

When it is determined that the value registered in 2 does not coincide with the password registered in the password register PW, no other process will be performed and an alarm sound stored in the alarm register 46d is audibly output from the speaker 50 and at the same time the power source is compulsorily turned off (steps R21, R22, R23, R24).

In this case, a cover of a hard case of the electronic notebook may be closed as if a dog bites.

In other words, the user can enter a password by executing a predetermined hand-waving operation, that is, the user can make the electronic notebook execute a his desired process such as the notebook mode process and the image display mode process by the predetermined hand-waving operation.

Therefore, in the electronic notebook with the above mentioned structure, the user can make the light receiving element 45b receive reflected infrared light by waving his hand so as to pass by the light emitting element 44b and the light receiving element 45b. Then, the frequency (L) of the light receipts by the light receiving element 45b is previously memorized in the display instruction register of the RAM 46. This frequency (L) of the light receipts by the light receiving element may be used as an-order to the dogs which are selectively displayed on the LCD unit 48 by operation of the display switching key 42h. Therefore, the CPU 41 selectively reads out image data (of a dog showing pleasure or dog showing disheartenment or dog giving hand) and corresponding effect sound data from the ROM 43 in accordance with the frequency (L) of the light receipts by the light receiving element 45b, and displays the read out image data on the LCD unit 48, and further audibly outputs an effect sound based on the read out effect sound data through the speaker 50. Therefore, with the present electronic notebook, the user is not required to perform mechanical operation such as key inputting operation, but can make display on the LCD unit 48 image data of a dog showing various movements by performing the predetermined hand-waving operation.

Since the frequency "L" of light receipts by the light receiving element 45b is registered as a password in the password register PW, the user can enter a password by performing non-contacting operations. When the password registered in the password register PW coincides with a password entered by performing the non-contacting operations (the frequency of light receipts by the light receiving element 45b, a desired process such as the notebook mode process and the image display mode process may be performed. In conventional electronic notebooks, users are required to enter a password by mechanical operation such as a key input operation but, in the electronic notebook of the present invention, the user is not required to perform the mechanical operations.

In the present embodiment of the electronic notebook, reflection of infrared light emitted from the body of the electronic notebook is detected to judge whether the user has performed non-contacting operation. For example, however, interruption of external light with user's hand, reflection on user's hand of a sound wave generated from the notebook body, interruption with user's hand of an externally supplied sound wave, changes in magnetic force caused by a magnet held in the user's hand may be used to determine what the user has intended or ordered. As described above, image data to be displayed on the display unit may be selected and the process may be controlled as desired by the user by executing non-contacting operation.

Further, changes in waveforms of the infrared light, a sound wave and/or magnetic force may be also used to judge how non-contacting operation has performed for selecting image data or detecting the password.

Further in the present embodiment, the images displayed on the display unit are switched and the password is determined, in accordance with the frequency of non-contacting operations. Control operation such as mechanical switching operation in the electronic notebook, however, may be performed in accordance with the frequency of performed non-contacting operations.

Several embodiments of the present invention have been described in detail but these embodiments are simply illustrative and not restrictive. The present invention may be modified in various manners. All the modifications and applications of the present invention will be within the scope and spirit of the invention, so that the scope of the present invention should be determined only by what is recited in the present appended claims and their equivalents.

What is claimed is:

1. A portable electronic device including an image display device which sequentially and selectively displays a plurality of living thing images corresponding to predetermined growth steps of the living thing, wherein said image display device comprises:

storage means (ROM 13 in FIGS. 1, 3) in which said plurality of living thing images are prestored;

display means (display section 16 in FIG. 1; steps B1, B10 in FIG. 7; FIGS. 8A, 8C) for selectively and sequentially displaying one of said plurality of living thing images;

key input means (ten-key input section 12, ten-key 12b in FIG. 1; step B4 in FIG. 7; ten-key 12b in FIG. 8B) operated by a user with a key operation to input growth element data necessary for the growth of the living thing being displayed on said display means; and display control means (CPU 11 in FIG. 1; steps B9, B10 in FIG. 7) for determining (steps B4, B5, B7 in FIG. 7) whether a value of the growth element data input with the key operation through said key input means matches a predetermined value, and for retrieving from said plurality of living thing images stored in said storage means a living thing image whose growth step is next to that of the living thing image being displayed when it is determined that the input value of the growth element data matches the predetermined value (step B7=YES in FIG. 7) so that the retrieved living thing image is displayed on said display means.

2. The portable electronic device according to claim 1, further comprising:

element storage means (ROM 13 in FIGS. 1, 2) in which plural kinds of growth element images necessary for growth of the living thing are stored; and element image display control means (CPU 11 in FIG. 1; step B3 in FIG. 7) for displaying the plural kinds of growth element images stored in said element storage means on said display means, wherein said key input means comprises:

writing means (ten-key 12b, write key 12e in FIG. 1; steps B4, B5 in FIG. 7) for selecting an arbitrary growth element image from the plural kinds of growth element images displayed by said element image display control means, and for writing a value of the growth element data corresponding to the selected growth element image in said growth element data storage means (RAM 14 in FIG. 1; registers 14c–14e in FIG. 4), and said display control means comprises:

determination means (CPU 11 in FIG. 1; step B7 in FIG. 7) for determining whether the stored value of growth element data matches the predetermined value (numeric data "3" indicates normal amount and "4" indicates large amount, at step B7 in FIG. 7); and image display control means (CPU 11 in FIG. 1; steps B9, B10 in FIG. 7) for retrieving from the plurality of living thing images stored in said storage means a living thing image whose growth step is next to that of the living thing image being displayed when it is determined by said determination means that the value of the growth element data stored in said storage means matches the predetermined value (step B7=YES in FIG. 7), and for displaying the retrieved living thing image of the next growth step on said display means instead of the living thing image being displayed thereon.

3. The portable electronic device according to claim 1, comprising image display re-control means (CPU 11 in FIG. 1; steps B7, B10 in FIG. 7) for re-retrieving from the plurality of living thing images stored in said storage means the living thing image being displayed when it is determined by said determination means that the value of the growth element data stored in said growth element data storage means does not match with the predetermined value (step B7=NO in FIG. 7) so that the read living thing image being displayed is continued to be displayed on said display means.

4. The portable electronic device according to claim 1, wherein the images of the living thing are images of an animal or a plant.

5. A portable electronic device including an image display device which sequentially and selectively displays a plurality of living thing images corresponding to predetermined growth steps of the living thing, wherein said image display device comprises:

image storage means (ROM 13 in FIGS. 1, 3) in which said plurality of living thing images corresponding to the growth steps of the living thing are stored;

element storage means (ROM 12 in FIGS. 1, 2) in which plural kinds of growth element images necessary for growth of the living thing are stored;

element selecting means (key input section 12 in FIG. 1; ten-key 1, 2b in FIG. 1; step B4 in FIG. 7) for selecting an arbitrary growth element image from the plural kinds of growth element images stored in said element storage means;

growth element data storage means (RAM 14 in FIG. 1; registers 14c–14e in FIG. 4) for storing a value of the growth element data corresponding to the growth element image selected by said element selecting means;

designation data storage means (register M in FIG. 4) for storing designation data (M) for designating one of the plurality of living thing images stored in said image storage means to selectively display the designated living thing image;

determination means (CPU 11 in FIG. 1; step B7 in FIG. 7) for determining whether the value of the growth element data stored in said growth element data storage means matches a predetermined value (numeric data "3" indicates normal amount and "4" indicates large amount at step B7 in FIG. 7);

first display control means (CPU 11 in FIG. 1; steps B9, B10 in FIG. 7) for renewing the designation data stored in said designation data storage means to designation data for designating the living thing image of a next growth step (M+1) when it is determined by said determination means that the value of the growth element data stored in said growth element data storage means matches the predetermined value (step B7=YES in FIG. 7), and for retrieving from the plurality of living thing images stored in said living thing image storage means the living thing image of the next growth step designated by the renewed designation data so that the retrieved living thing image is displayed; and second display control means (CPU 11 in FIG. 1; step B10 in FIG. 7) for retaining the designation data stored in said designation data storage means so as not to be renewed to the designation data for designating the living thing image of the next growth step when it is determined by said determination means that the value of the growth element data stored in said growth element data storage means does not match the predetermined value, and for retrieving the living thing image designated by the currently stored designation data so that the retrieved living thing image is displayed.

6. The portable electronic device according to claim 5, further comprising element image display control means (step B3 in FIG. 7; see FIG. 8B) for displaying on said display means the plural kinds of growth element images stored in said element storage means.

7. The portable electronic device according to claim 5, wherein the plural kinds of growth element images are stored in said element storage means in bitmap data format.

8. The portable electronic device according to claim 5, wherein the growth element data is numeric data corresponding to the growth element image, and said growth element data storage means stores the numeric data.

9. The portable electronic device according to claim 5, wherein the images of the living thing are images of an animal or a plant.

10. A portable electronic device including an image display device which sequentially and selectively displays a plurality of living thing images corresponding to predetermined growth steps of the living thing, wherein said image display device comprises:

living thing image storage means (ROM 23 in FIGS. 9, 10) in which the plurality of living thing images are prestored;

display means (display section 26 in FIG. 9) for selectively displaying one of the plurality of living thing images stored in said living thing image storage means;

clock means (timer 21a in FIG. 9; step X9 in FIG. 12; clock register 24c in FIG. 11) for clocking a clock pulse signal to obtain clock data;

growth element data storage means (RAM 24 in FIGS. 9, 11) for storing growth element data (sensors 28, 29 in FIG. 9; "temperature data" at step X11, "illumination data" at step X12 in FIG. 12) necessary for growth of the living thing when one of the growth element data is input;

display control means (steps X17, X8 in FIG. 12) for determining (step X15 in FIG. 12) whether a value of the clock data obtained by said clock means matches a first predetermined value ("24 hours" in FIG. 12) and a value of the growth element data stored in said growth element data matches a second predetermined value ("constant accumulated value" in FIG. 12), and for retrieving from the plurality of living thing images stored in said living thing image storage means a living thing image whose growth step is next to that of the living thing image being displayed when matches are determined so that the retrieved living thing image is displayed instead of the living thing image being displayed.

11. The portable electronic device according to claim 10, wherein the images of the living thing are images of an animal or a plant.

12. The portable electronic device according to claim 10, including clearing means (CPU 21 in FIG. 9; step X20 in FIG. 12) for clearing the value of the growth element data stored in said growth element data storage means every time said display control means displays the living thing image of the next growth step.

13. An image display control method which sequentially and selectively displays a plurality of living thing images corresponding to predetermined growth steps of the living thing on an image display section (display section 16 in FIG. 1; steps B1, B10 in FIG. 7) in a portable electronic device, comprising the steps of:

display step of controlling storage means (ROM 13 in FIGS. 1, 3) having the plurality of living thing images prestored therein, and of selectively displaying (CPU 11 in FIG. 1; steps B1, B10 in FIG. 7; FIGS. 8A, 8C) one of the plurality of living thing images stored in said storage means so as to be displayed on said image display section;

key input step (key input section 12 ten-key 12b in FIG. 1; step B4 in FIG. 7; ten-key 12b in FIG. 8B) of inputting, by a user with a key operation, growth element data for the living thing image displayed by said display step; and display control step (CPU 11 in FIG. 1; steps B9, B10 in FIG. 7) of determining (steps B4, B5, B7 in FIG. 7) whether a value of the growth element data input with the key operation in said key input step matches a predetermined value, and of retrieving from the stored plurality of living thing images a living thing image whose growth step is next to the living thing image being displayed when it is determined that the input value of the growth element data matches the predetermined data (B7=YES in FIG. 7) so that the retrieved living thing image is displayed on said image display section instead of the living thing image being displayed.

14. The image display control method according to claim 13, comprising an image display re-control step (CPU 11 in FIG. 1; steps B7, B10 in FIG. 7) of re-retrieving from the plurality of living thing images stored in said storage means the living thing image being displayed when it is determined at said determining step that the stored value of the growth element data matches the predetermined value (step B7=NO in FIG. 7) so that the retrieved living thing image being displayed is continued to be displayed on said display means.

15. The image display control method according to claim 13, further comprising an element image display control step (step B3 in FIG. 7; see FIG. 8B) of displaying the stored plural kinds of growth element images on said display means.

16. An image display control method which sequentially and selectively displays a plurality of living thing images corresponding to predetermined growth steps of the living thing on an image display section (display section 16 in FIG. 1; steps B1, B10 in FIG. 7) in a portable electronic device, comprising the steps of:

growth element image display step (step B3 in FIG. 7) of displaying plural kinds of growth element images for growing the living thing on said image display section;

element selecting step (key input section 12, ten-key 12*b* in FIG. 1; step B4 in FIG. 7) of selecting an arbitrary growth element image from the plural kinds of the growth element images displayed by said growth element image display step;

growth element data storing step (RAM 14 in FIG. 1; registers 14*c*–14*e* in FIG. 4; step B5 in FIG. 7) of storing a value of the growth element data corresponding to the growth element image selected at said element selecting step;

designation data storing step (register M in FIG. 4; step B9 in FIG. 7) of storing designation data (M) for designating one of the plurality of living thing images for selectively displaying the designated living thing image;

determining step (CPU 11 in FIG. 1; step B7 in FIG. 7) of determining whether a value of the growth element data stored at said growth element data storing step matches a predetermined value (numeric data "3" indicates normal amount and "4" indicates large amount at step B7 in FIG. 7);

first display control step (CPU 11 in FIG. 1; steps B9, B10 in FIG. 7) of renewing (M+1) the designation data stored at said designation data storing step to designation data for designating the living thing image of a next growth step when it is determined at said determining step that the value of the growth element data stored at said growth element data storage step matches the predetermined value (step B7=YES in FIG. 7), and of accessing image storage means (ROM 13 in FIGS. 1, 3) storing a plurality of living thing images corresponding to the predetermined growth steps of the living thing to retrieve a living thing image of the next growth step designated by the renewed designation data from the plurality of living thing images previously stored in said image storage means so that the retrieved living thing image is displayed; and second display control step (CPU 11 in FIG. 1; step B10 in FIG. 7) of retaining the designation data stored by said designation data storing step so as not to be renewed to the designation data for designating the living thing image of the next growth step when it is determined at said determining step that the value of the growth element data stored at said growth element data storing step does not match the predetermined value (step B7=NO in FIG. 7), and of retrieving from the plurality of living thing images the living thing image designated by the currently stored designation data so that the retrieved living thing image is displayed.

17. An image display control method which sequentially and selectively displays a plurality of living thing images corresponding to predetermined growth steps of the living thing on an image display section (display section 16 in FIG. 1; steps B1, B10 in FIG. 7) in a portable electronic device, comprising the steps of:

display step (X8 in FIG. 12) of controlling living thing image storage means (ROM 23 in FIGS. 9, 10) having the plurality of living thing images prestored therein, and of selectively displaying one of the plurality of living thing images stored in said living thing storage means on said image display section;

clocking step (timer 21*a* in FIG. 9; step X9 in FIG. 12; clock register 24*c* in FIG. 11) of clocking a clock pulse signal to obtain clock data;

growth element data storing step (RAM 24 in FIGS. 9, 11; registers 24*d*, 24*e* in FIG. 11; step X13 in FIG. 12) of storing growth element data necessary for growth of the living thing when at least one kind of the growth element data is input (sensors 28, 29 in FIG. 9; "temperature data" at step X11, "illumination data" at step X12 in FIG. 12); and display control step (steps X17, X8 in FIG. 12) of determining (step X15 in FIG. 12) whether a value of the clock data obtained by said clock means matches a first predetermined value ("24 hours" in FIG. 12) and a value of the growth element data stored in said growth element data matches a second predetermined value ("constant accumulated value" in FIG. 12), and of retrieving from the plurality of living thing images stored in said living thing image storage means a living thing image whose growth step is next to that of the living thing image being displayed when matches are determined so that the retrieved living thing image is displayed instead of the living thing image being displayed.

18. The image display control method according to claim 17, further including a clearing step (CPU 21 in FIG. 9; step X20 in FIG. 12) of clearing the value of the growth element data stored at said growth element storing step every time the living thing image of the next growth step is displayed by said display control step.

19. A recording medium (ROM 13 in FIG. 1) storing a computer readable image display control program for sequentially and selectively displaying a plurality of living thing images corresponding to predetermined growth steps of the living thing on an image display section (display section 16 in FIG. 1; steps B1, B10 in FIG. 7) in a portable electronic device wherein said image display control program causes a computer (CPU 11 in FIG. 1) to:

control storage means (ROM 13 in FIGS. 1, 3) having the plurality of living thing images prestored therein, and selectively display (steps B1, B10 in FIG. 7; FIGS. 8A, 8C) one of the plurality of living thing images stored in said storage means on said image display section;

determine (steps B4, B5, B7 in FIG. 7) whether a value of growth element data matches a predetermined value when the growth element data for the living thing image being displayed is input by a user with a key operation (key input section 12, ten-key 12*b* in FIG. 1; step B4 in FIG. 7; ten-key 12*b* of FIG. 8B), and retrieve from the plurality of living thing images a living thing image whose growth step is next to that of the living thing image being displayed when it is determined that the input value of the growth element data matches the predetermined value (B7=YES in FIG. 7) so that the retrieved living thing image is displayed on said image display section instead of the living thing image being displayed thereon (steps B9, B10 in FIG. 7).

20. A recording medium (ROM 13 in FIG. 1) storing a computer readable image display control program for sequentially and selectively displaying a plurality of living thing images corresponding to predetermined growth steps of the living thing on an image display section (display section 16 in FIG. 1; steps B1, B10 in FIG. 7) in a portable electronic device wherein said image display control program causes a computer (CPU 11 in FIG. 1) to:

display (step B3 in FIG. 7) plural kinds of growth element images for growing the living thing on said image display section;

store (RAM 14 in FIG. 1; registers 14*c*–14*e* in FIG. 4; step B4 in FIG. 7) a value growth element data corresponding to an arbitrary growth element image when the arbitrary growth element image is selected (key input section 12 in FIG. 1; ten-key 12*b* in FIG. 1; step B4 in FIG. 7) from the displayed plural kinds of growth element images;

store (register M in FIG. 4; step B9 in FIG. 7) designation data (M) for designating one of the plurality of living thing images for selectively displaying the designated living thing image;

determine (CPU 11: step B7 in FIG. 7) whether the stored value of the growth element data matches a predetermined value (numeric data "3" indicates normal amount and "4" indicates large amount, at step B7 in FIG. 7), and renew (M+1) the stored designation data to designation data for designating a living thing image of the next growth step when it is determined that the value of the stored growth element data matches the predetermined value (step B7=YES in FIG. 7), then access image storage means (ROM 13 in FIGS. 1, 3) storing a plurality of living thing images corresponding to the predetermined growth steps of the living thing to retrieve the living thing image of the next growth step from the plurality of living thing images previously stored in said image storage means so that the retrieved living thing image is displayed (steps B9, B10 in FIG. 7); and not to renew the stored designation data to designation data of the next growth step when it is determined that the value of the growth element data does not match the predetermined value (step B7=NO in FIG. 7), and retrieve from the plurality of living thing images stored in said image storage means the image of living thing whose growth step is designated by the currently stored designation data so that the retrieved living thing image is displayed (step B10 in FIG. 7).

21. A recording medium (ROM 23 in FIG. 9) storing a computer readable image display control program for sequentially and selectively displaying a plurality of living thing images corresponding to predetermined growth steps of the living thing on an image display section (display section 26 in FIG. 9) in a portable electronic device wherein said image display control program causes a computer (CPU 21 in FIG. 9) to:

control living thing image storage means (ROM 23 in FIGS. 9, 10) having living thing images prestored therein corresponding to the predetermined growth steps of the living thing, and selectively display one of the plurality of living thing images stored in said living thing image storage means;

clock a clock pulse signal to obtain clock data (timer 21*a* in FIG. 9; step X9 in FIG. 12; clock register 24*c* in FIG. 11);

store (RAM 24 in FIGS. 9, 11; registers 24*d*, 24*e* in FIG. 11; step X13 in FIG. 12) growth element data necessary for growth of the living thing when at least one kind of the growth element data is input (sensors 28, 29 in FIG. 9; "temperature data" at step X11, "illumination data" at X12 in FIG. 12); and determine whether a value of the obtained clock data matches (step X14 in FIG. 12) a first predetermined value ("24 hours" in FIG. 12) and the stored value of the growth element data matches (step X15 in FIG. 12) a second predetermined value ("constant accumulated value" in FIG. 12), and retrieve from the plurality of living thing images stored in said living thing image storage means a living thing image whose growth step is next to that of the living thing image being displayed when the matches are determined (step X15=YES in FIG. 12) so that the retrieved living thing image is displayed on said image display section instead of the living thing image being displayed thereon.

22. A portable electronic device for sequentially displaying images of a living thing in accordance with growth steps as though the living thing is growing, said electronic device comprising:

display means (16 in FIG. 1; steps B1, B10 in FIG. 7; FIGS. 8A, 8C) for displaying the images of the living thing;

key input means (12, 12*b* in FIG. 1; step B4 in FIG. 7; 12*b* in FIG. 8B) for inputting, by a key operation, growth conditions necessary for the living thing; and display control means (11 in FIG. 1; steps B6, B10 in FIG. 7) for causing said display means to sequentially display, as though the living thing is growing, the images of the living thing from one image showing an initial growth step to another image showing an initial growth step in accordance with the growth conditions input by the key operation of said key input means.

23. The portable electronic device according to claim 22, wherein:

said display means includes living thing image display means (16 in FIG. 1; steps B1, B10 in FIG. 7; FIGS. 8A, 8B) for displaying the images of the living thing on a screen, and list display means (16 in FIGS. 1, 8B; step B3 in FIG. 7) for displaying a list of the growth conditions on said screen in place of the images of the living thing;

said key input means includes selecting means (12*b* in FIGS. 1, 8B; step B4 in FIG. 7) for selecting a given growth condition upon the key operation from the list of the growth conditions displayed on said screen; and said display control means includes living thing image display control means (11 in FIG. 1; steps B9, B10 in FIG. 7) for causing said display means to display the images of the living thing sequentially from one image showing the initial growth step to another image showing the next growth step in accordance with the given growth condition selected by said selecting means.

24. The portable electronic device according to claim 22, wherein:

said display control means includes an internal memory (13 in FIGS. 1, 3), connected to said key input means and said display means in said portable electronic device, for prestoring images of the living thing each of which shows one of predetermined steps of the growth of the living thing, and control means (11 in FIG. 1) for sequentially reading the images of the living thing from said internal memory and causing said display means to display the read images in accordance with the growth conditions input by the key operation of said key input means and in the order of said predetermined steps of the growth the living thing.

25. The portable electronic device according to claim 22, further comprising:

data input means (12a, 12b in FIG. 1; steps A1, A2 in FIG. 6) for inputting data;

switching means (12c in FIG. 1) for performing switching between an image display mode (SB in FIG. 5) in which the images of the living thing are displayed and a data display mode (SA in FIG. 5) in which the data input by said data input means is displayed; and means (steps B1, B10 in FIG. 7; step A3 in FIG. 6) for displaying only the images of the living thing on said display means while said display means is in the image display mode as a result of the switching performed by said switching means, and for displaying only said data on said display means while said display means is in the data display mode as a result of the switching performed by said switching means.

26. A portable electronic device for sequentially displaying images of a living thing in accordance with growth steps as though the living thing is growing, said electronic device comprising:

key input means (12, 12b in FIG. 1; step B4 in FIG. 7; 12b in FIG. 8B), which is operated by a user, for inputting, by a key operation, growth conditions necessary for the living thing;

living thing image display means (16 in FIG. 1; steps B1, B10 in FIG. 7; FIGS. 8A, 8C) having a living thing image display area for displaying the images of the living thing;

list display means (16 in FIGS. 1, 8B; step B3 in FIG. 7) having a list display area for displaying a list of the growth conditions necessary for the living thing;

external operation means (12d in FIGS. 1, 8B) having a key for being operated by the user in order to switch an image to be displayed;

first display control means (steps B1–B3 in FIG. 7) for, when the key of said external operation means is operated, performing switching from the display of the images of the living thing on said living thing image display area to the display of the list on said list display area, in response to the operation of the key of said external operation means; and second display control means (11 in FIG. 1, steps B6–B10 in FIG. 7) for, when the key operation of said key input means is performed, causing said display means to display, as though the living thing is growing, the images of the living thing sequentially from one image showing an initial growth step to another image showing a next growth step in response to said key operation and in accordance with the growth conditions input by said key operation, wherein said electronic device is equipped with said key input means, said living thing image display means, said list display means, said external operation means, said first display control means and said second display control means.

27. A portable electronic device for sequentially displaying images of a living thing in accordance with growth steps as though the living thing is growing, said electronic device comprising:

display means (26 in FIG. 9) for displaying the image of the living thing;

storing means (24, 24d, 24e in FIGS. 9, 11) for, each time growth conditions necessary for the living thing are input externally, storing the input growth conditions;

determining means (11 in FIG. 9; step X15 in FIG. 12) for determining whether the growth conditions stored in said storing means have satisfied predetermined growth conditions; and display control means (21 in FIG. 9; steps X18, X8 in FIG. 12) for causing said display means to display the images of the living thing sequentially from one image showing an initial growth step to another image showing a next growth step in accordance with the result of the determination performed by said determining means;

wherein said electronic device is portable and is equipped with said display means, said storing means and said display control means.

28. The portable electronic device according to claim 27, wherein:

said display control means includes an internal memory (23 in FIGS. 9, 10), connected to said key input means and said display means in said portable electronic apparatus, for prestoring images of the living thing each of which shows one of predetermined steps of the growth of the living thing, and control means (11 in FIG. 1) for sequentially reading the images of the living thing from said internal memory and for causing said display means to sequentially display the read images in accordance with the growth conditions stored in said internal memory and to in the order of said predetermined steps of the growth of the living thing.

29. The portable electronic device according to claim 27, further comprising:

data input means (12a, 12b in FIG. 1; steps A1, A2 in FIG. 6), for inputting data;

switching means (12c in FIG. 1) for performing switching between an image display mode (SB in FIG. 5) in which the images of the living thing are displayed and a data display mode (SA in FIG. 5) in which the data input by said data input means is displayed; and means (steps B1, B10 in FIG. 7; step A3 in FIG. 6) for displaying only the images of the living thing on said display means while said display means is in the image display mode as a result of the switching performed by said switching means, and for displaying only said data on said display means while said display means is in the data display mode as a result of the switching performed by said switching means.

30. A portable electronic device for sequentially displaying images of a living thing in accordance with growth steps as though the living thing is growing, said electronic device comprising:

display means (26 in FIG. 9) for displaying the images of the living thing;

storing means (24 shown in FIGS. 9, 11; 24d, 24e in FIG. 11; step X13 in FIG. 12) for, each time growth conditions necessary for the living thing are input externally, storing the input growth conditions;

time counting means (21a in FIG. 9; step X8 in FIG. 12) for counting a time;

determining means (steps X14, X15 in FIG. 12) for determining whether the time counted by said time counting means and the growth conditions stored in said storing means have satisfied predetermined conditions; and display control means (21 in FIG. 9; steps X16–X20, X8 in FIG. 12) for causing said display means to display the images of the living thing sequentially from one image showing an initial growth step to another image showing a next growth step in accordance with the result of the determination performed by said determining means;

wherein said electronic device is portable and is equipped with said display means, said storing means, said time counting means, said determining means and said display control means.

31. The portable electronic device according to claim 30, wherein:

said growth conditions include externally input amounts of growth elements necessary to grow the living thing;

said predetermined conditions are that the amounts of growth elements are larger than predetermined certain values and that the time counted by said time counting means has exceeded a predetermined time; and said determining means includes means (steps X14, X15 in FIG. 12) for determining whether the amounts of growth elements have become larger than said predetermined certain values at the point when the time counted by said time counting means has exceeded said predetermined time.

32. The portable electronic device according to claim 30, wherein:

said display control means includes an internal memory (23 in FIGS. 9, 10), connected to said key input means and said display means in said portable electronic device, for prestoring images of the living thing each of which shows one of predetermined steps of the growth of the living thing, and control means (21 in FIG. 9) for sequentially reading the images of the living thing from said internal memory and for causing said display means to sequentially display the read images in accordance with growth conditions stored in said internal memory and in the order of said predetermined steps of the growth of the living thing.

33. The portable electronic device according to claim 30, further comprising:

data input means (12a, 12b in FIG. 1; steps A1, A2 in FIG. 6) for inputting data;

switching means (12c in FIG. 1) for performing switching between an image display mode (SB in FIG. 5) in which the images of the living thing are displayed and a data display mode (SA in FIG. 5) in which the data input by said data input means is displayed; and means (steps B1, B10 in FIG. 7; step A3 in FIG. 6) for displaying only the images of the living thing on said display means while said display means is being in the image display mode as a result of the switching performed by said switching means, and for displaying only said data on said display means while said display means is in the data display mode as a result of the switching performed by said switching means.

34. A portable electronic device for sequentially displaying images of a living thing in accordance with growth steps as though the living thing is growing, said electronic apparatus comprising:

living thing display means (16 in FIG. 1) for displaying the images of the living thing;

growth element display means (16 in FIGS. 1, 8B; step B3 in FIG. 7) for displaying, at a time and as a list, growth elements necessary to control the growth of the living thing;

selecting means (12b in FIGS. 1, 8B; step B4 in FIG. 7) for selecting the growth elements displays as the list on said growth element display means; and display control means (11 in FIG. 1; step B9 in FIG. 7; FIGS. 8A, 8C) for causing said display means to display the images of the living thing sequentially from one image showing an initial growth step to another image showing a next growth step, in accordance with the growth elements selected by said selecting means;

wherein said portable electronic device is equipped with said living thing display means, said growth element display means said selecting means and said display control means.

35. The portable electronic device according to claim 34, wherein:

said growth elements are element images having different shapes;

said growth element display means includes an internal memory (13 in FIGS. 1, 2; FIG. 8B) for prestoring said element images, external operation means (12d in FIGS. 1, 8B) having a key for being operated by a user, and element image display means (11 in FIG. 1; step B3 in FIG. 7; FIG. 8B) for, when the key of said external operation means is operated, retrieving said element images from said internal memory in response to the operation of the key of said external operation means and for causing the retrieved element images to be displayed at a time as the list.

36. The portable electronic device according to claim 34, wherein:

said selecting means includes element selecting means (12b in FIGS. 1, 8B, step B4 in FIG. 7) for manually selecting one of the growth elements displayed as the list on said growth element display means; and said display control means includes means (11 in FIG. 1; steps B9, B10 in FIG. 7; FIGS. 8A, 8C) for causing said living thing display means to display the images of the living thing sequentially from one image showing the initial growth step to another image showing the next growth step in accordance with said one growth element selected by said element selecting means.

37. The portable electronic device according to claim 34, further comprising:

data input means (12a, 12b in FIG. 1; steps A1, A2 in FIG. 6) for inputting data;

switching means (12c in FIG. 1) for performing switching between an image display mode (SB in FIG. 5) in which the images of the living thing are displayed and a data display mode (SA in FIG. 5) in which the data input by said data input means is displayed; and means (steps B1, B10 in FIG. 7; step A3 in FIG. 6) for displaying only the images of the living thing on said display means while said display means is in the image display mode as a result of the switching performed by said switching means, and for displaying only said data on said display means while said display means is in the data display mode as a result of the switching performed by said switching means.

* * * * *

UNITED STATES PATENT AND TRADEMARK OFFICE
CERTIFICATE OF CORRECTION

PATENT NO. : 6,037,952
DATED : March 14, 2000
INVENTOR(S) : Shinichiro Sato

It is certified that error appears in the above-identified patent and that said Letters Patent is hereby corrected as shown below:

<u>Title page,</u>
Item [54], change "IMAGE DISPLAYING APPARATUS" to -- APPARATUS FOR DISPLAYING IMAGES OF LIVING THINGS TO SHOW GROWTH AND/ OR MOVEMENT OF THE LIVING THINGS --;

Item [75], Inventors,
Line 1, delete "Yoshio Kawai, Higashiyamato;",
Lines 2-3, delete "Yuichi Kobayashi, Hamura;"
Line 3, after "Fussa" replace the semicolon with -- of Japan --,
Lines 3-4, delete "Jun Oshima, Akigawa, all of Japan".

Signed and Sealed this

Thirteenth Day of November, 2001

Attest:

*Nicholas P. Godici*

NICHOLAS P. GODICI
*Acting Director of the United States Patent and Trademark Office*

*Attesting Officer*